United States Patent
Kondo et al.

(10) Patent No.: US 6,263,108 B1
(45) Date of Patent: *Jul. 17, 2001

(54) APPARATUS AND METHOD FOR RECOVERY OF LOST/DAMAGED DATA IN A BITSTREAM OF DATA BASED ON COMPATIBILITY OF ADJACENT BLOCKS OF DATA

(75) Inventors: Tetsujiro Kondo, Kanagawa-Prefecture (JP); James J. Carrig, San Jose, CA (US); Yasuhiro Fujimori, Cupertino, CA (US); Sugata Ghosal, San Jose, CA (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,358

(22) Filed: Jul. 6, 1998

Related U.S. Application Data

(63) Continuation of application No. 09/016,083, filed on Jan. 30, 1998, which is a continuation-in-part of application No. 09/002,547, filed on Jan. 2, 1998, and a continuation-in-part of application No. 09/002,470, filed on Jan. 2, 1998, and a continuation-in-part of application No. 09/002,553, filed on Jan. 2, 1998, each is a continuation-in-part of application No.08/956,632, filed on Oct. 23, 1997, and a continuation-in-part of application No. 08/957,555, filed on Oct. 23, 1997, and a continuation-in-part of application No. 08/956,870, filed on Oct. 23, 1997.

(51) Int. Cl.$^7$ ........................................... G06K 9/36
(52) U.S. Cl. ............................................. 382/232; 382/233
(58) Field of Search .................................... 382/254, 266, 382/233, 232; 348/699; 371/43

(56) References Cited

U.S. PATENT DOCUMENTS

| | | | |
|---|---|---|---|
| 4,361,853 | 11/1982 | Remy et al. | 358/167 |
| 4,381,519 | 4/1983 | Wilkinson et al. | 358/21 R |

(List continued on next page.)

FOREIGN PATENT DOCUMENTS

| | | | |
|---|---|---|---|
| 0 398 741 | 11/1990 | (EP) | H04N/7/13 |
| 0 527 611 | 8/1992 | (EP) | H04N/9/80 |

(List continued on next page.)

OTHER PUBLICATIONS

International Search Report, PCT/US98/22412, Oct. 5, 1999, 5 pgs.

Kondo, et al., "Adaptive Dynamic Range Coding Scheme for Future HDTV Digital VTR", Fourth International Workshop on HDTV and Beyond, Sep. 4–6, Turin, Italy.

(List continued on next page.)

*Primary Examiner*—David Moore
*Assistant Examiner*—Anh Hong Do
(74) *Attorney, Agent, or Firm*—Blakely, Sokoloff, Taylor & Zafman LLP

(57) ABSTRACT

A system and method for receiving damage data in a bitstream of encoded data is disclosed. A plurality of candidate decodings for a plurality of blocks are generated. A measure is generated for each block based upon at least an image portion of the candidate decodings. Compatibility is determined between adjacent blocks of the plurality of blocks. A candidate decoding is selected based upon the measure and the compatibility of adjacent blocks. In one embodiment, this is used in the transmission of video signals over a potentially lossy communications channel.

82 Claims, 44 Drawing Sheets

U.S. PATENT DOCUMENTS

| | | | |
|---|---|---|---|
| 4,419,693 | 12/1983 | Wilkinson et al. | 358/167 |
| 4,532,628 | 7/1985 | Matthews | 371/13 |
| 4,574,393 | 3/1986 | Blackwell et al. | 382/17 |
| 4,703,351 | 10/1987 | Kondo | 358/135 |
| 4,703,352 | 10/1987 | Kondo | 358/135 |
| 4,710,811 | 12/1987 | Kondo | 358/135 |
| 4,722,003 | 1/1988 | Kondo | 358/135 |
| 4,729,021 | 3/1988 | Kondo | 358/135 |
| 4,772,947 | 9/1988 | Kono | 358/135 |
| 4,788,589 | 11/1988 | Kondo | 358/133 |
| 4,815,078 | 3/1989 | Shimura | 370/30 |
| 4,845,560 | 7/1989 | Kondo et al. | 358/133 |
| 4,890,161 | 12/1989 | Kondo | 358/135 |
| 4,924,310 | 5/1990 | Von Brandt | 358/136 |
| 4,953,023 | 8/1990 | Kondo | 358/135 |
| 5,023,710 | 6/1991 | Kondo et al. | 358/133 |
| 5,086,489 | 2/1992 | Shimura | 382/56 |
| 5,093,872 | 3/1992 | Tutt | 382/56 |
| 5,101,446 | 3/1992 | Resnikoff et al. | 382/56 |
| 5,122,873 | 6/1992 | Golin | 358/133 |
| 5,134,479 | 7/1992 | Ohishi | 358/140 |
| 5,142,537 | 8/1992 | Kutner et al. | 371/31 |
| 5,150,210 | 9/1992 | Hoshi et al. | 358/135 |
| 5,159,452 | 10/1992 | Kinoshita et al. | 358/141 |
| 5,166,987 | 11/1992 | Kageyama | 382/56 |
| 5,177,797 | 1/1993 | Takenaka et al. | 382/56 |
| 5,185,746 | 2/1993 | Tanaka et al. | 371/40.1 |
| 5,196,931 | 3/1993 | Kondo | 358/133 |
| 5,208,816 * | 5/1993 | Seshardi et al. | 371/43 |
| 5,237,424 | 8/1993 | Nishino et al. | 358/310 |
| 5,241,381 | 8/1993 | Kondo | 358/133 |
| 5,243,428 | 9/1993 | Challapali et al. | 358/167 |
| 5,258,835 | 11/1993 | Kato | 358/135 |
| 5,307,175 | 4/1994 | Seachman | 358/401 |
| 5,327,502 | 7/1994 | Katata et al. | 382/56 |
| 5,337,087 | 8/1994 | Mishima | 348/405 |
| 5,359,694 | 10/1994 | Concordel | 358/445 |
| 5,379,072 | 1/1995 | Kondo | 348/441 |
| 5,398,078 * | 3/1995 | Masuda et al. | 348/699 |
| 5,406,334 | 4/1995 | Kondo et al. | 348/581 |
| 5,416,651 | 5/1995 | Uetake et al. | 360/48 |
| 5,416,847 | 5/1995 | Boze | 381/94 |
| 5,428,403 | 6/1995 | Andrew et al. | 348/699 |
| 5,434,716 | 7/1995 | Sugiyama et al. | 360/32 |
| 5,438,369 | 8/1995 | Citta et al. | 348/470 |
| 5,446,456 | 8/1995 | Seo | 341/118 |
| 5,455,629 | 10/1995 | Sun et al. | 348/466 |
| 5,469,216 | 11/1995 | Takahashi et al. | 348/441 |
| 5,469,474 | 11/1995 | Kitabatake | 375/243 |
| 5,471,501 | 11/1995 | Parr et al. | 375/354 |
| 5,473,479 | 12/1995 | Takahura | 360/48 |
| 5,481,554 | 1/1996 | Kondo | 371/53 |
| 5,481,627 * | 1/1996 | Kim | 382/254 |
| 5,495,298 | 2/1996 | Uchida et al. | 348/615 |
| 5,499,057 | 3/1996 | Kondo et al. | 348/607 |
| 5,528,608 | 6/1996 | Shimizume | 371/40.3 |
| 5,557,420 | 9/1996 | Yanagihara et al. | 358/335 |
| 5,557,479 | 9/1996 | Yanagihara | 360/32 |
| 5,577,053 | 11/1996 | Dent | 371/37.4 |
| 5,594,807 | 1/1997 | Liu | 382/128 |
| 5,598,214 | 1/1997 | Kondo et al. | 348/414 |
| 5,617,333 | 4/1997 | Oyamada et al. | 364/514 R |
| 5,625,715 | 4/1997 | Trew et al. | 382/236 |
| 5,636,316 | 6/1997 | Oku et al. | 386/112 |
| 5,649,053 | 7/1997 | Kim | 395/2.38 |
| 5,663,764 | 9/1997 | Kondo et al. | 348/414 |
| 5,673,357 | 9/1997 | Shima | 386/94 |
| 5,677,734 | 10/1997 | Oikawa et al. | 348/405 |
| 5,689,302 | 11/1997 | Jones | 348/218 |
| 5,699,475 | 12/1997 | Oguro et al. | 386/109 |
| 5,703,889 | 12/1997 | Shimoda et al. | 371/55 |
| 5,724,099 | 3/1998 | Hamdi et al. | 348/419 |
| 5,724,369 | 3/1998 | Brailean et al. | 371/31 |
| 5,737,022 | 4/1998 | Yamaguchi et al. | 348/416 |
| 5,751,361 | 5/1998 | Kim | 348/409 |
| 5,751,743 | 5/1998 | Takizawa | 371/41 |
| 5,751,862 | 5/1998 | Williams et al. | 382/260 |
| 5,786,857 | 7/1998 | Yamaguchi | 348/405 |
| 5,790,195 | 8/1998 | Ohsawa | 348/419 |
| 5,796,786 | 8/1998 | Lee | 375/326 |
| 5,805,762 | 9/1998 | Boyce et al. | 386/68 |
| 5,809,231 | 9/1998 | Yokoyama et al. | 395/200.3 |
| 5,852,470 | 12/1998 | Kondo et al. | 348/448 |
| 5,861,922 | 1/1999 | Murashita et la. | 348/420 |
| 5,878,183 | 3/1999 | Sugiyama et al. | 386/96 |
| 5,903,481 | 5/1999 | Kondo et al. | 364/724.1 |
| 5,936,674 | 8/1999 | Kim | 348/420 |
| 5,938,318 | 7/1999 | Araki | 708/650 |
| 5,946,044 | 8/1999 | Kondo et al. | 348/458 |
| 6,067,636 | 5/2000 | Yao et al. | 714/15 |

FOREIGN PATENT DOCUMENTS

| | | | |
|---|---|---|---|
| 0 558 016 | 2/1993 | (EP) | H04N/7/133 |
| 0 566 412 A2 | 4/1993 | (EP) | H04N/5/21 |
| 0 571 180 A2 | 5/1993 | (EP) | H04N/7/137 |
| 0 592 196 A2 | 10/1993 | (EP) | H04N/5/21 |
| 0 596 826 | 11/1993 | (EP) | H04N/5/92 |
| 0 605 209 A2 | 12/1993 | (EP) | H04N/7/13 |
| 0 610 587 | 12/1993 | (EP) | . |
| 0 597 576 | 5/1994 | (EP) | H04N/7/13 |
| 0 651 584 A2 | 10/1994 | (EP) | H04N/7/54 |
| 0 680 209 | 4/1995 | (EP) | H04N/5/91 |
| 0 746 157 A2 | 5/1996 | (EP) | H04N/7/101 |
| 0 851 679 A2 | 12/1997 | (EP) | H04N/5/913 |
| 0 833 517 | 4/1998 | (EP) | H04N/7/30 |
| 2 320 836 | 11/1997 | (GB) | H04N/7/68 |
| 7-67028 | 3/1995 | (JP) | H04N/5/235 |
| WO96/07987 | 9/1995 | (WO) | G06T/1/00 |
| WO 99/21285 | 10/1998 | (WO) | H03M/13/00 |
| 99 21090 | 4/1999 | (WO) | G06F/11/00 |
| WO 99 21369 | 4/1999 | (WO) | H04N/7/26 |

OTHER PUBLICATIONS

Kondo, et al., "A New Concealment Method for Digital VCR's", IEEE Visual Signal Processing and Communication, pp. 20–22, 9/93, Melbourne, Australia.

Park, et al., "A Simple Concealment for ATM Bursty Cell Loss", IEEE Transactions on Consumer Electronics, No. 3, Aug. 1993, pp. 704–709.

Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.

NHK Laboratories Note, "Error Correction, Concealment and Shuffling", No. 424, Mar. 1994, pp. 29–44.

Translation of Japanese Patent #7–67028, 30 pgs.

Kondo, et al., "Adaptive Dynamic Range Coding Scheme for Future Consumer Digital VTR", pp. 219–226.

Kim, et al., "Bit Rate Reduction Algorithm for a Digital VCR", IEEE Transactions on Consumer Electronics, vol. 37, No. 3, Aug. 1, 1992, pp. 267–274.

R.C. Gonzalez, et al., "Digital Image Processing", Addison Wesley Publishing Company, Inc., 1992, pp. 346–348.

R. Aravind, et al., "Image and Video Coding Standards", AT&T Technical Journal, Jan./Feb. 1993, pp. 67–88.

Zhu, et al., "Coding and Cell–Loss Recovery in DCT–Based Packet Video", IEEE Transactions on Circuits and Systems for Video Technology, Jun. 3, 1993, No. 3, NY.

International Search Report, PCT/US98/22347, Mar. 16, 1999, 2pgs.
International Search Report, PCT/US95/22531, Apr. 1, 1999, 1pg.
International Search Report, PCT/US98/22411, Feb. 25, 1999, 1 pg.
Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.
Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.
International Search Report PCT/US00/03508, Feb. 9, 2000, 8 pgs.

Chu, et al., "Detection and Concealment of Transmission Errors in H.261 Images", XP–000737027, pp. 74–84, IEEE 1998.
Park, et al., "Recovery of Block–coded Images From Channel Errors", XP–000371122, pp. 396–400, Pub. Date May 23, 1993.
Jeng, et al., "Concealment Of Bit Error And Cell Loss In Inter–Frame Coded Video Transmission", 1991 IEEE, 17.4.1–17.4.5.
Monet, et al., "Block Adaptive Quantization Of Images", IEEE 1993, pp. 303–306.
International Search Report PCT/US00/03439, Feb. 9, 2000, 8 pgs.
International Search Report PCT/US00/03595, Feb. 10, 2000, 6 pgs.
International Search Report PCT/US00/03611, Feb. 10, 2000, 8 pgs.
International Search Report PCT/US00/03599, Feb. 10, 2000, 4 pgs.
International Search Report PCT/US00/03742, Feb. 11, 2000, 5 pgs.
International Search Report PCT/US00/03654, Feb. 10, 2000, 4 pgs.
International Search Report PCT/US00/03299, Feb. 9, 2000, 5 pgs.
Meguro, et al., "An Adaptive Order Statistics Filter Based On Fuzzy Rules For Image Processing", pp. 70–80, XP–00755627, 1997 Scripta Technica, Inc.
International Search Report PCT/US00/03738, Feb. 11, 2000, 9 pgs.
Stammnitz, et al., "Digital HDTV Experiment System", pp. 535–542.
International Search Report PCT/US00/03743, 4 pgs., Feb. 11, 2000.
International Search Report PCT/US00/14331, 7 pgs., May 24, 2000.
International Search Report PCT/US00/14245, 9 pgs., May 24, 2000.
Chan, et al., "Block Shuffling On Top Of Error Concealment For Wireless Image Transmissions", vol. 3, Oct. 15, 1996, pp. 977–981.
Huifang Sun, et al., "Error Concealment Algorithms For Robust Decoding MPEG Compressed Video", Sep. 1, 1997, p. 249–268.
Brush: "Video Data Shuffling For The 4:2:2 DVTR", Oct. 1, 1986, p. 1009–1016.

* cited by examiner

IMAGE 560

IMAGE 570

TILE 565

TILE 575

FIG. 6

INTRA FRAME-SET BLOCK SHUFFLING
SEGMENT DEFINITION: Y-BLOCKS

INTRA FRME-SET BLOCK SHUFFLING

INTRA GROUP VL-DATA SHUFFLING

FIRST ERROR: BIT 0

FIRST ERROR: BIT 2

FIRST ERROR: BIT 4

INTER SEGMENT FL-DATA SHUFFLING

ORIGNAL

| | ←—FL-DATA—→ | | | ←—VL-DATA—→ |
|---|---|---|---|---|
| SEGMENT 0 | DR | Motion Flag | MIN | |
| SEGMENT 1 | DR | Motion Flag | MIN | |
| SEGMENT 2 | DR | Motion Flag | MIN | |
| SEGMENT 3 | DR | Motion Flag | MIN | |
| SEGMENT 4 | DR | Motion Flag | MIN | |
| SEGMENT 5 | DR | Motion Flag | MIN | |

MIN Shuffling 1300

| | ←—FL-DATA—→ | ←—VL-DATA—→ |
|---|---|---|
| SEGMENT 0 | MIN | |
| SEGMENT 1 | MIN | |
| SEGMENT 2 | MIN | |
| SEGMENT 3 | MIN | |
| SEGMENT 4 | MIN | |
| SEGMENT 5 | MIN | |

Original    Shuffled

Segment 0 --> Segment 2
Segment 2 --> Segment 4
Segment 4 --> Segment 0
Segment 1 --> Segment 3
Segment 3 --> Segment 5
Segment 5 --> Segment 1

FIG. 13

Motion Flag Shuffling

Original → Shuffled
Segment 0 --> Segment 4
Segment 2 --> Segment 0
Segment 4 --> Segment 2
Segment 1 --> Segment 5
Segment 3 --> Segment 1
Segment 5 --> Segment 3

After FL-Data Shuffling
FL-Data Loss Pattern for Segment 0

| SEGMENT \ BLOCK# | 0 | 1 | 2 | 3 | 4 | 5 | ••• | 879 |
|---|---|---|---|---|---|---|---|---|
| 0 | DR | DR | DR | DR | DR | DR | ••• | |
| 1 | | | | | | | ••• | |
| 2 | M | M | M | M | M | M | ••• | |
| 3 | | | | | | | ••• | |
| 4 | MIN | MIN | MIN | MIN | MIN | MIN | ••• | |
| 5 | | | | | | | | |

LOSS PATTERN 1310

M: MOTION FLAG

FIG. 14

Modular Shuffle Result 1416

| BLOCK# | 0 | 1 | 2 | 3 | 4 | 5 | ••• | 879 |
|---|---|---|---|---|---|---|---|---|
| COUNT | 0 | 1 | 2 | 0 | 1 | 2 | ••• | |
| DATA DR | 0 | 2 | 4 | 0 | 2 | 4 | ••• | |
| MIN | 2 | 4 | 0 | 2 | 4 | 0 | ••• | |
| M | 4 | 0 | 2 | 4 | 0 | 2 | ••• | |

Loss Pattern 1415

| BLOCK# | 0 | 1 | 2 | 3 | 4 | 5 | ••• | 879 |
|---|---|---|---|---|---|---|---|---|
| COUNT | 0 | 1 | 2 | 0 | 1 | 2 | ••• | |
| SEGMENT# 0 | DR | M | MIN | DR | M | MIN | ••• | |
| 1 | | | | | | | ••• | |
| 2 | MIN | DR | M | MIN | DR | M | ••• | |
| 3 | | | | | | | ••• | |
| 4 | M | MIN | DR | M | MIN | DR | ••• | |
| 5 | | | | | | | | |

Spatial Loss Pattern 1417

| DR | | MIN | | M | | DR | | MIN | | M | |
| | M | | DR | | MIN | | M | | DR | | MIN |
| DR | | MIN | | M | | DR | | MIN | | M | |
| | M | | DR | | MIN | | M | | DR | | MIN |
| DR | | MIN | | M | | DR | | MIN | | M | |
| | M | | DR | | MIN | | M | | DR | | MIN |
| DR | | MIN | | M | | DR | | MIN | | M | |
| | M | | DR | | MIN | | M | | DR | | MIN |
| DR | | MIN | | M | | DR | | MIN | | M | |
| | M | | DR | | MIN | | M | | DR | | MIN |

FIG. 14a

MODULAR SHUFFLE RESULT 1421

| BLOCK# COUNT | 0 | 1 | 2 | 3 | 4 | 5 | 6 | 7 | ••• 879 |
|---|---|---|---|---|---|---|---|---|---|
| DATA | 0 | 1 | 2 | 3 | 4 | 5 | 0 | 1 | ••• |
| DR | 0 | 1 | 2 | 3 | 4 | 5 | 0 | 1 | ••• |
| MIN | 2 | 3 | 4 | 5 | 0 | 1 | 2 | 3 | ••• |
| M | 4 | 5 | 0 | 1 | 2 | 3 | 4 | 5 | ••• |

LOSS PATTERN 1420

| BLOCK# COUNT SEGMENT# | 0 | 1 | 2 | 3 | 4 | 5 | 6 | 7 | ••• 879 |
|---|---|---|---|---|---|---|---|---|---|
|  | 0 | 1 | 2 | 3 | 4 | 5 | 0 | 1 | ••• |
| 0 | DR |  | M |  | MIN |  | DR |  | ••• |
| 1 |  | DR |  | M |  | MIN |  | DR | ••• |
| 2 | MIN |  | DR |  | M |  | MIN |  | ••• |
| 3 |  | MIN |  | DR |  | M |  | MIN | ••• |
| 4 | M |  | MIN |  | DR |  | M |  | ••• |
| 5 |  | M |  | MIN |  | DR |  | M | ••• |

FIG. 14b

MODULAR SHUFFLE RESULT 1426

| BLOCK# / COUNT | 0 | 1 | 2 | 3 | 4 | 5 | 6 | 7 | • • • | 879 |
|---|---|---|---|---|---|---|---|---|---|---|
| DATA | 0 | 1 | 2 | 3 | 4 | 5 | 0 | 1 | • • • | |
| DR | 0 | 1 | 2 | 3 | 4 | 5 | 0 | 1 | • • • | |
| MIN | 0 | 1 | 2 | 3 | 4 | 5 | 0 | 1 | • • • | |
| M | 0 | 1 | 2 | 3 | 4 | 5 | 0 | 1 | • • • | |

LOSS PATTERN 1425

| BLOCK# / COUNT | 0 | 1 | 2 | 3 | 4 | 5 | 6 | 7 | • • • | 879 |
|---|---|---|---|---|---|---|---|---|---|---|
| SEGMENT# | 0 | 1 | 2 | 3 | 4 | 5 | 0 | 1 | • • • | |
| 0 | D,M,MIN | | | | | | D,M,MIN | | • • • | |
| 1 | | D,M,MIN | | | | | | D,M,MIN | • • • | |
| 2 | | | D,M,MIN | | | | | | • • • | |
| 3 | | | | D,M,MIN | | | | | • • • | |
| 4 | | | | | D,M,MIN | | | | • • • | |
| 5 | | | | | | D,M,MIN | | | • • • | |

D: DR
M: MOTION FLAG

FIG. 14c

POSSIBLE CASES FOR $(m_i, q_i)$ (x indicates unknown)

| $(m_i, q_i)$ | Possible values of $d_i$ | Number of possibilities $(n_j)$ |
|---|---|---|
| $(m_i = m, q_i = q)$ | $\{5m + q\}$ | 1 |
| $(m_i = x, q_i = 0)$ | $\{0\}$ | 1 |
| $(m_i = x, q_i > 0)$ | $\{q_i, 5 + q_i\}$ | 2 |
| $(m_i = 0, q_i = x)$ | $\{0, 1, 2, 3, 4\}$ | 5 |
| $(m_i = 1, q_i = x)$ | $\{6, 7, 8, 9\}$ | 4 |
| $(m_i = x, q_i = x)$ | $\{0, 1, 2, 3, 4, 6, 7, 8, 9,\}$ | 9 |

- GENERATE ALL $M = n_2 \times n_1 \times n_0$ POSSIBLE KEYS

FIG. 19

MEASUREMENTS: SQUARE ERROR $$S.E. = \sum_i \sum_j (x_i - y_{i,j})^2 \;*$$

where  $x_i$ is the (candidate) decoded value of pixel i
$y_{ij}$ is a horizontal or vertical neighbor of $x_i$

*NOTE: Current implementation discards 3 largest terms, i.e., $(x_i - y_{i,j})^2$

FIG. 20a

MEASUREMENTS: TEMPORAL ACTIVITY

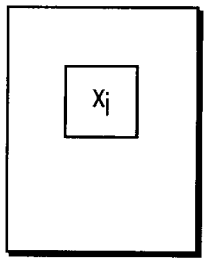
FRAME 0

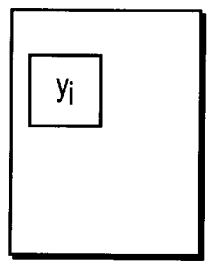
FRAME 1

$x_i$ and $y_i$ are corresponding pixels in block j frame 0 and block j frame 1

$$T.A. = \max_{i \text{ in block } j} |y_i - x_i|$$

FIG. 20b

PROBABILITY FUNCTION

S.E. Probabilities (Measured 9/97)

| S.E. Probability | S.E. <=2^(9) | 2^(9) < S.E. <= 2^(11) | 2^(11) < S.E. <= 2^(13) | 2^(13) < S.E. <= 2^(15) |
|---|---|---|---|---|
| conf = 0 | 0.400607 | 0.486165 | 0.497679 | 0.499834 |
| 0 < conf <= 0.1 | 0.108873 | 0.097436 | 0.089769 | 0.102244 |
| 0.1 < conf <= 0.2 | 0.044734 | 0.014264 | 0.014457 | 0.004728 |
| 0.2 < conf <= 0.3 | 0.016635 | 0.001637 | 0.001385 | 0.001193 |
| 0.3 < conf <= 0.4 | 0.007419 | 0.000513 | 0.000001 | 0.000001 |
| 0.4 < conf <= 0.5 | 0.001317 | 0.000018 | 0.000022 | 0.000001 |
| 0.5 < conf <= 0.6 | 0.000264 | 0.000026 | 0.000001 | 0.000008 |
| 0.6 < conf <= 0.7 | 0.000141 | 0.000031 | 0.000001 | 0.000001 |
| 0.7 < conf <= 0.8 | 0.000078 | 0.000001 | 0.000001 | 0.000001 |
| 0.8 < conf <= 0.9 | 0.000001 | 0.000001 | 0.000001 | 0.000001 |
| 0.9 < conf <= 1 | 0.000001 | 0.000001 | 0.000001 | 0.000001 |

| S.E. Probability | 2^(15) < S.E. <= 2^(17) | 2^(17) < S.E. <= 2^(19) | 2^(19) < S.E. |
|---|---|---|---|
| conf = 0 | 0.499842 | 0.499689 | 0.498521 |
| 0 < conf <= 0.1 | 0.093066 | 0.091473 | 0.085688 |
| 0.1 < conf <= 0.2 | 0.003602 | 0.003743 | 0.003322 |
| 0.2 < conf <= 0.3 | 0.000001 | 0.000189 | 0.000192 |
| 0.3 < conf <= 0.4 | 0.000001 | 0.000075 | 0.000001 |
| 0.4 < conf <= 0.5 | 0.000001 | 0.000034 | 0.000001 |
| 0.5 < conf <= 0.6 | 0.000001 | 0.000001 | 0.000001 |
| 0.6 < conf <= 0.7 | 0.000001 | 0.000001 | 0.000001 |
| 0.7 < conf <= 0.8 | 0.000001 | 0.000001 | 0.000001 |
| 0.8 < conf <= 0.9 | 0.000001 | 0.000001 | 0.000001 |
| 0.9 < conf <= 1 | 0.000001 | 0.000001 | 0.000001 |

FIG. 21

APPARATUS AND METHOD FOR RECOVERY OF LOST/DAMAGED DATA IN A BITSTREAM OF DATA BASED ON COMPATIBILITY OF ADJACENT BLOCKS OF DATA

RELATED APPLICATIONS

This application is a continuation of U.S. patent application Ser. No. 09/016,083, filed Jan. 30, 1998, entitled "Source Coding to Provide for Robust Error Recovery During Transmission Losses"; which is a continuation-in-part of application Ser. No. 09/002,547, filed Jan. 2, 1998, entitled "Image-to-Block Mapping to Provide for Robust Error Recovery During Transmission Losses", application Ser. No. 09/002,470, filed Jan. 2, 1998, entitled "Source Coding to Provide for Robust Error Recovery During Transmission Losses"; application Ser. No. 09/002,553, filed Jan. 2, 1998, entitled "Multiple Block Based Recovery Method to Provide for Robust Error Recovery During Transmission Losses"; which are continuations-in-part of application Ser. No. 08/956,632, filed Oct. 23, 1997, entitled "Image-to-Block Mapping to Provide for Robust Error Recovery During Transmission Losses"; application Ser. No. 08/957,555, filed Oct. 23, 1997 entitled "Source Coding to Provide for Robust Error Recovery During Transmission Losses"; and application Ser. No. 08/956,870, filed Oct. 23, 1997, entitled "Multiple Block Based Recovery Method to Provide for Robust Error Recovery During Transmission Losses". application Ser. No. 09/016,083, filed Jan. 30, 1998, application Ser. No. 09/002,547, filed Jan. 2, 1998, application Ser. No. 09/002,470, filed Jan. 2, 1998, application Ser. No. 09/002,553, filed Jan. 2, 1998, application Ser. No. 08/956,632, filed Oct. 23, 1997, application Ser. No. 08/957,555, filed Oct. 23, 1997 and application Ser. No. 08/956,870, filed Oct. 23, 1997 are herein incorporated by reference.

BACKGROUND OF THE INVENTION

1. Field of the Invention

The present invention relates to providing a robust error recovery due to data losses incurred during transmission of signals.

2. Art Background

A number of techniques exist for reconstructing lost data due to random errors that occur during signal transmission. However, these techniques cannot handle the loss of consecutive packets of data. Consecutive loss of packets of data is described in the art as burst error. Burst errors result in a reconstructed signal with such a degraded quality that it is easily apparent to the end user. Additionally, compression methodologies used to facilitate high speed communications compound the signal degradation caused by burst errors, thus adding to the degradation of the reconstructed signal. An example of burst error loss affecting transmitted and/or stored signals is seen in high definition television ("HDTV") signals and mobile telecommunication applications wherein compression methodologies play an important role.

The advent of HDTV has led to television systems with a much higher resolution than the current standards proposed by the National Television Systems Committee ("NTSC"). Proposed HDTV signals are predominantly digital. Accordingly, when a color television signal is converted for digital use it is common that the luminance and chrominance signals are digitized using eight bits. Digital transmission of color television requires a nominal bit rate of two hundred and sixteen megabits per second. The transmission rate is greater for HDTV which would nominally require about 1200 megabits per second. Such high transmission rates are well beyond the bandwidths supported by current wireless standards. Accordingly, an efficient compression methodology is required.

Compression methodologies also play an important role in mobile telecommunication applications. Typically, packets of data are communicated between remote terminals in mobile telecommunication applications. The limited number of transmission channels in mobile communications requires an effective compression methodology prior to the transmission of packets. A number of compression techniques are available to facilitate high transmission rates.

Adaptive Dynamic Range Coding ("ADRC") and the discrete cosine transform ("DCT") coding provide image compression techniques known in the art. Both techniques take advantage of the local correlation within an image to achieve a high compression ratio. However, an efficient compression algorithm results in compounded error propagation because errors in an encoded signal are more prominent when subsequently decoded. This error multiplication results in a degraded video image that is readily apparent to the user.

SUMMARY OF THE INVENTION

A method for source coding a signal is described. In particular, a signal comprising multiple signal elements is processed. Each signal element is encoded to form a bitstream. The bits within a given bitstream are distributed across different bitstreams. Thus, the parameters describing components of the segment elements are distributed across the different bitstreams. The distributing steps result in error distribution across multiple levels. Therefore, when the distributing steps are reversed by the decoder, a burst transmission error becomes a distributed set of localized losses.

Another method is also described for a multiple level shuffling process. A signal is defined as multiple levels wherein each level comprises a plurality of frames, a plurality of pixels, and a plurality of bits. In one embodiment, shuffling occurs on each level and between levels. Multiple level shuffling causes burst error loss to be distributed across multiple levels thereby facilitating image reconstruction of those areas of the image in which the loss occurred.

BRIEF DESCRIPTION OF THE DRAWINGS

The objects, features and advantages of the present invention will be apparent to one skilled in the art in light of the following detailed description in which:

FIG. 6 is an illustration of exemplary complementary and interlocking block structures.

FIG. 13 illustrates one embodiment of MIN shuffling in accordance with the teachings of the present invention.

Figure 14:
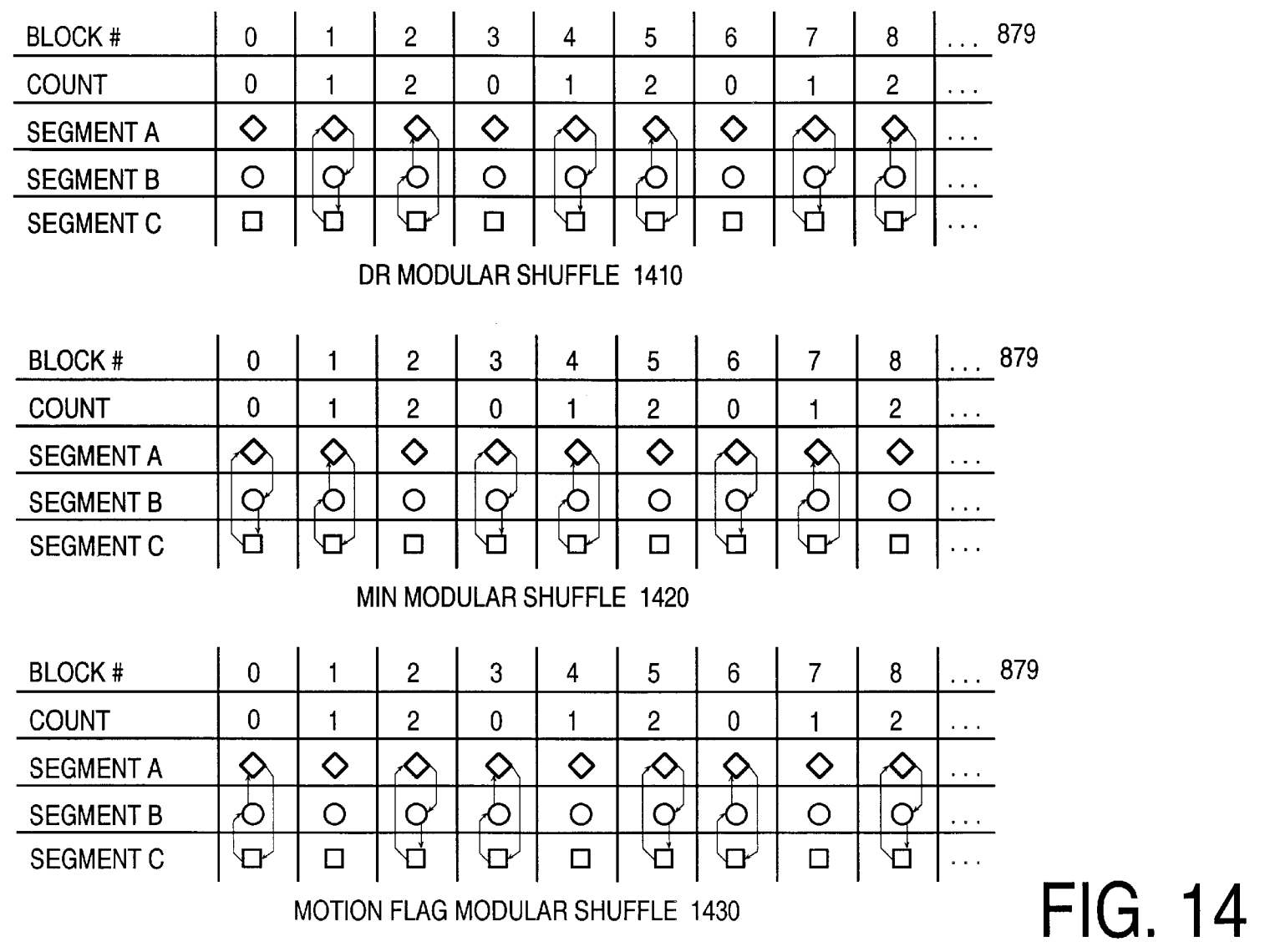

FIG. 14 illustrates one embodiment of a modular shuffling.

FIG. 14a illustrates one embodiment of a modular shuffling result and the fixed length data loss associated with the modular shuffling.

FIG. 14b illustrates an alternate embodiment of a modular shuffling result and the fixed length data loss associated with the modular shuffling.

FIG. 14c illustrates an alternate embodiment of a modular shuffling result and the fixed length data loss associated with the modular shuffling.

FIG. 19 is a table illustrating one embodiment of candidate decodings.

FIGS. 20a, 20b, 20c, 20d illustrate embodiments of measurements utilized in the Qbit and Motion Flag recovery process of FIG. 18.

FIG. 21 illustrates one embodiment of a table used to determine a square error probability function utilized in the Qbit and Motion Flag recovery process of FIG. 18.

DETAILED DESCRIPTION

The present invention provides a method for coding and arranging a signal stream to provide for a robust error recovery. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The signal processing methods and structures are described from the perspective of one embodiment in which the signals are video signals. However, it is contemplated that the methods and apparatus described herein are applicable to a variety of types of signals including audio signals or other digital bitstreams of data, wherein each signal is composed of multiple signal elements. Furthermore the embodiment of the process described herein utilizes the Adaptive Dynamic Range Coding ("ADRC") process to compress data; however a variety of coding techniques and algorithms may be used. For a more detailed discussion on ADRC, see "Adaptive Dynamic Range Coding Scheme for Future. HDTV Digital VTR", Kondo, Fujimori and Nakaya, Fourth International Workshop on HDTV and Beyond, Sep. 4–6, 1991, Turin, Italy.

In the above paper, three different kinds of ADRC are explained. These are achieved according to the following equations: Non-edge-matching ADRC:

$$DR = MAX - MIN + 1$$

$$q = \left\lfloor \frac{(x - MIN + 0.5) \cdot 2^Q}{DR} \right\rfloor$$

$$\tilde{x} = \left\lfloor \frac{(q + 0.5) \cdot DR}{2^Q} + MIN \right\rfloor$$

Edge-matching ADRC:

$$DR = MAX - MIN$$

$$q = \left\lfloor \frac{(x - MIN) \cdot (2^Q - 1)}{DR} + 0.5 \right\rfloor$$

$$\tilde{x} = \left\lfloor \frac{q \cdot DR}{2^Q - 1} + MIN + 0.5 \right\rfloor$$

Multi-stage ADRC:

$$DR = MAX - MIN + 1$$

$$q = \left[\frac{(x - MIN + 0.5) \cdot 2^Q}{DR}\right]$$

$$\tilde{x} = \left[\frac{(q + 0.5) \cdot DR}{2^Q} + MIN\right]$$

Where MAX' is the averaged value of in the case of $q=2^Q-1$; MIN' is the averaged value of $\tilde{x}$ in the case of $q=0$; and $$DR' = MAX' - MIN'$$

$$q = \left[\frac{(x - MIN') \cdot (2^Q - 1)}{DR'} + 0.5\right]$$

$$\tilde{x} = \left[\frac{q \cdot DR'}{(2^Q - 1)} + MIN' + 0.5\right]$$

where MAX represents the maximum level of a block, MIN represents the minimum level of a block, x represents the signal level of each sample, Q represents the number of quantization bits, q represents the quantization code (encoded data), $\tilde{x}$ represents the decoded level of each sample, and the square brackets [ ] represent a truncation operation performed on the value within the square brackets.

Figure 1:
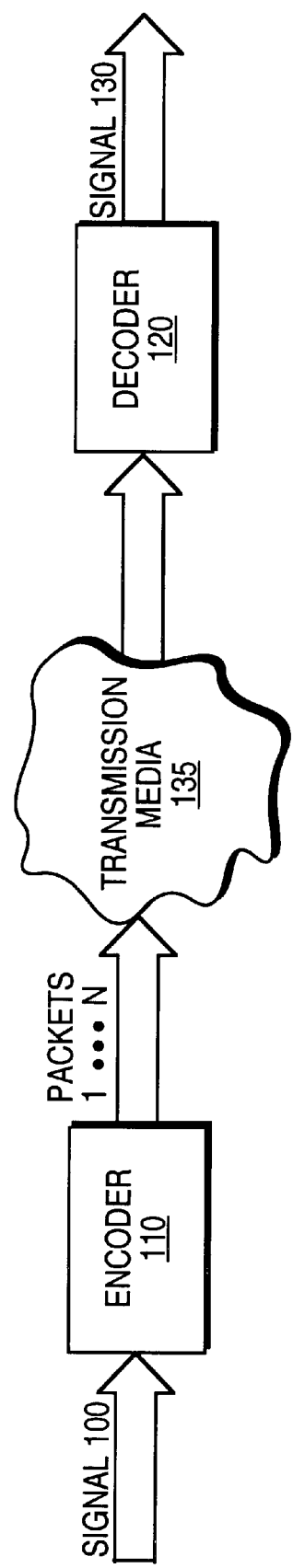
FIG. 1 generally illustrates the processes of signal encoding, transmission, and decoding.

The signal encoding, transmission, and subsequent decoding processes are generally illustrated in FIG. 1. Signal 100 is a data stream input to Encoder 110. Encoder 110 follows the Adaptive Dynamic Range Coding ("ADRC") compression algorithm and generates Packets 1, . . . N for transmission along Transmission Media 135. Decoder 120 receives Packets 1, . . . N from Transmission Media 135 and generates Signal 130. Signal 130 is a reconstruction of Signal 100.

Encoder 110 and Decoder 120 can be implemented a variety of ways to perform the functionality described herein. In one embodiment, Encoder 110 and/or Decoder 120 are embodied as software stored on media and executed by a general purpose or specifically configured computer system, typically including a central processing unit, memory and one or more input/output devices and co-processors. Alternately, the Encoder 110 and/or Decoder 120 may be implemented as logic to perform the functionality described herein. In addition, Encoder 110 and/or Decoder 120 can be implemented as a combination of hardware, software or firmware.

In the present embodiment Signal 100 is a color video image comprising a sequence of video frames, each frame including information representative of an image in an interlaced video system. Each frame is composed of two fields, wherein one field contains data of the even lines of the image and the other field containing the odd lines of the image. The data includes pixel values which describe the color components of a corresponding location in the image. For example, in the present embodiment, the color components consist of the luminance signal Y, and color difference signals U, and V. It is readily apparent the process of the present invention can be applied to signals other than interlaced video signals. Furthermore, it is apparent that the present invention is not limited to implementations in the Y, U, V color space, but can be applied to images represented in other color spaces.

Referring back to FIG. 1, Encoder 110 divides the Y, U, and V signals and processes each group of signals independently in accordance with the ADRC algorithm. The following description, for purposes of simplifying the discussion, describes the processing of the Y signal; however, the encoding steps are replicated for the U and V signals.

In the present embodiment, Encoder 110 groups Y signals across two subsequent frames, referred to herein as a frame pair, of Signal 100 into three dimensional blocks ("3D") blocks. For one embodiment, a 3D block is generated from grouping two 2D blocks from the same localized area across a given frame pair, wherein a two dimensional 2D block is created by grouping localized pixels within a frame or a field. It is contemplated that the process described herein can be applied to different block structures. The grouping of signals will be further described in the image-to-block mapping section below.

Continuing with the present embodiment, for a given 3D block, Encoder 110 calculates whether there is a change in pixel values between the 2D blocks forming the 3D block. A Motion Flag is set if there are substantial changes in values. As is known in the art, use of a Motion Flag allows Encoder 110 to reduce the number of quantization codes when there is localized image repetition within each frame pair. Encoder 110 also detects the maximum pixel intensity value ("MAX") and the minimum pixel intensity value ("MIN") within a 3D block. Using values MAX and MIN, Encoder 110 calculates the dynamic range ("DR") for a given 3D block of data. For one embodiment DR=MAX−MIN+1 in the case of non-edge-matching ADRC. For edge-matching ADRC, DR=MAX−MIN. In an alternative embodiment, Encoder 110 encodes signals on a frame by frame basis for a stream of frames representing a sequence of video frames. In another embodiment, Encoder 110 encodes signals on a field by field basis for a stream of fields representing a sequence of video fields. Accordingly, Motion Flags are not used and 2D blocks are used to calculate the MIN, MAX, and DR values.

In the present embodiment, Encoder 110 references the calculated DR against a threshold table (not shown) to determine the number of quantization bits ("Qbits") used to encode pixels within the block corresponding to the DR. Encoding of a pixel results in a quantization code ("Q code"). The Q codes are the relevant compressed image data used for storage or transmission purposes.

In one embodiment, the Qbit selection is derived from the DR of a 3D block. Accordingly, all pixels within a given 3D block are encoded using the same Qbit, resulting in a 3D encoded block. The collection of Q codes, MIN, Motion Flag, and DR for a 3D encoded block is referred to as a 3D ADRC block. Alternately, 2D blocks are encoded and the collection of Q codes, MIN, and DR for a given 2D block results in 2D ADRC blocks.

A number of threshold tables can be implemented. In one embodiment, the threshold table consists of a row of DR threshold values. A Qbit corresponds to the number of quantization bits used to encode a range of DR values between two adjacent DRs within a row of the threshold table. In an alternative embodiment, the threshold table includes multiple rows and selection of a row depends on the desired transmission rate. Each row in the threshold table is identified by a threshold index. A detailed description of one embodiment of threshold selection is described below in the discussion of partial buffering. A further description of ADRC encoding and buffering is disclosed in U.S. Pat. No. 4,722,003 entitled "High Efficiency Coding Apparatus" and U.S. Pat. No. 4,845,560 also entitled "High Efficiency Coding Apparatus", assigned to the assignee of the present invention.

Here forth the Q codes are referred to as variable length data ("VL-data"). In addition, the DR, MIN, and Motion Flag are referred to as block attributes. The block attributes, together with the threshold index, constitute the fixed length data ("FL-data"). Furthermore, in view of the above discussion, the term block attribute describes a parameter associated with a component of a signal element, wherein a signal element includes multiple components.

In an alternate embodiment, the FL-data includes a Qbit code. The advantage is that the Qbit information does not have to be derived from the DR during the decoding process. Thus, if the DR information is lost or damaged, the Qbit information can still be determined from the Qbit code. Furthermore, if the Qbit code is lost or damaged, the Qbit information can be derived from DR. Thus the requirement to recover the DR and Qbit is reduced.

The disadvantage to including the Qbit code is the additional bits to be transmitted for each ADRC block. However, in one embodiment, Qbit codes for groups of ADRC blocks are combined, for example, in accordance with a function such as addition or concatenation. For example, if ADRC blocks are grouped in threes and if the Qbit values for each ADRC block are respectively 3, 4 and 4, the summed value that is encoded into the FL-data is 11. Thus the number of bits required to represent the sum is less than the number of bits required to represent each individual value and undamaged Qbit values of the group can be used to determine the Qbit value without performing a Qbit recovery process such as the one described subsequently.

Other embodiments are also contemplated. For example, Motion Flag data may also be encoded. A tag with Qbit and Motion Flag data can be generated and used to reference a table of codes. The configuration and function of the coding can vary according to application.

Frames, block attributes, and VL-data describe a variety of components within a video signal. The boundaries, location, and quantity of these components are dependent on the transmission and compression properties of a video signal. In the present embodiment, these components are varied and shuffled within a bitstream of the video signal to ensure a robust error recovery during transmission losses.

For illustrative purposes, the following description provides for a 1/6 consecutive packet transmission loss tolerance, pursuant to an ADRC encoding and shuffling of a video signal. Accordingly, the following definition and division of components exist for one embodiment. Other embodiments also are contemplated. A data set includes a partition of data of a video or other type of data signal. Thus, in one embodiment, a frame set is a type of data set that includes one or more consecutive frames. A segment includes a memory with the capacity to store a one-sixth division of the Q codes and block attributes included in a frame set. Further, a buffer includes a memory with the capacity to store a one-sixtieth division of the Q codes and block attributes included in a frame set. The shuffling of data is performed by interchanging components within segments and/or buffers. Subsequently, the data stored in a segment is used to generate packets of data for transmission. Thus, in the following description if a segment is lost all the packets generated from the segment are lost during transmission. Similarly, if a fraction of a segment is lost then a corresponding number of packets generated from the segment are lost during transmission.

Although, the following description refers to a 1/6 consecutive packet loss for data encoded using ADRC encoding, it is contemplated that the methods and apparatus described herein are applicable to a design of a 1/n consecutive packets loss tolerance coupled to a variety of encoding/decoding schemes.

Figure 2:
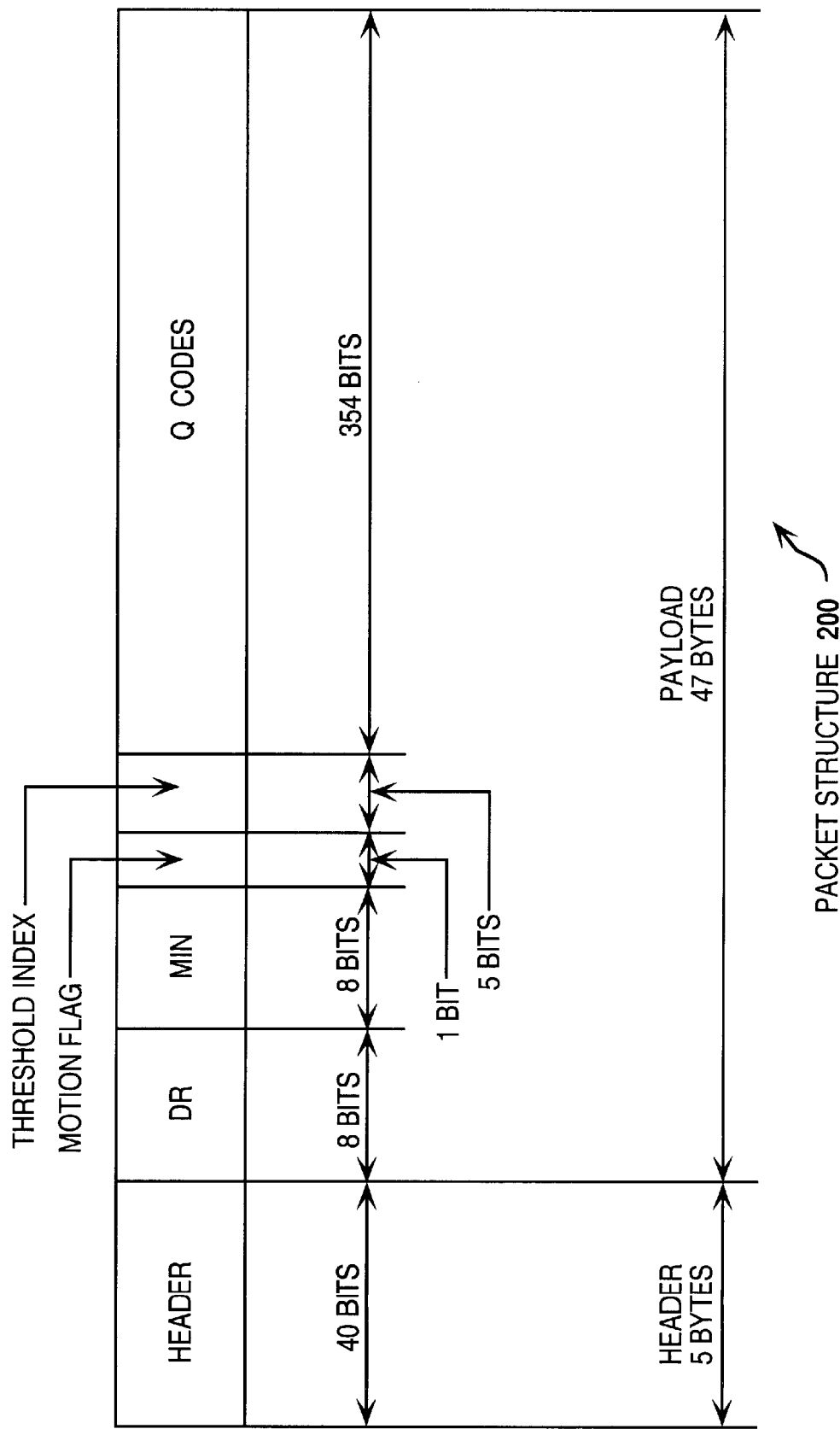
FIG. 2 illustrates one embodiment of a packet structure.

FIG. 2 illustrates one embodiment of Packet Structure 200 used for the transmission of the data across point-to-point connections as well as networks. Packet Structure 200 is generated by Encoder 110 and is transmitted across Transmission Media 135. For one embodiment, Packet Structure 200 comprises five bytes of header information, eight DR bits, eight MIN bits, a Motion Flag bit, a five bit threshold index, and 354 bits of Q codes. The packet structure described herein is illustrative and may typically be implemented for transmission in an asynchronous transfer mode ("ATM") network. However, the present invention is not limited to the packet structure described and a variety of packet structures that are used in a variety of networks can be utilized.

As noted earlier, Transmission Media (e.g., media) 135 is not assumed to provide error-free transmission and therefore packets may be lost or damaged. As noted earlier, conventional methods exist for detecting such loss or damage, but substantial image degradation will generally occur. The system and methods of the present invention therefore teach source coding to provide robust recovery from such loss or damage. It is assumed throughout the following discussion that a burst loss, that is the loss of several consecutive packets, is the most probable form of error, but some random packet losses might also occur.

To ensure a robust recovery for the loss of one or more consecutive packets of data, the system and methods of the present invention provide multiple level shuffling. In particular, the FL-data and the VL-data included in a transmitted packet comprise data from spatially and temporally disjointed locations of an image. Shuffling data ensures that any burst error is scattered and facilitates error recovery. As will be described below, the shuffling allows recovery of block attributes and Qbit values.

Data Encoding/Decoding

Figure 3:
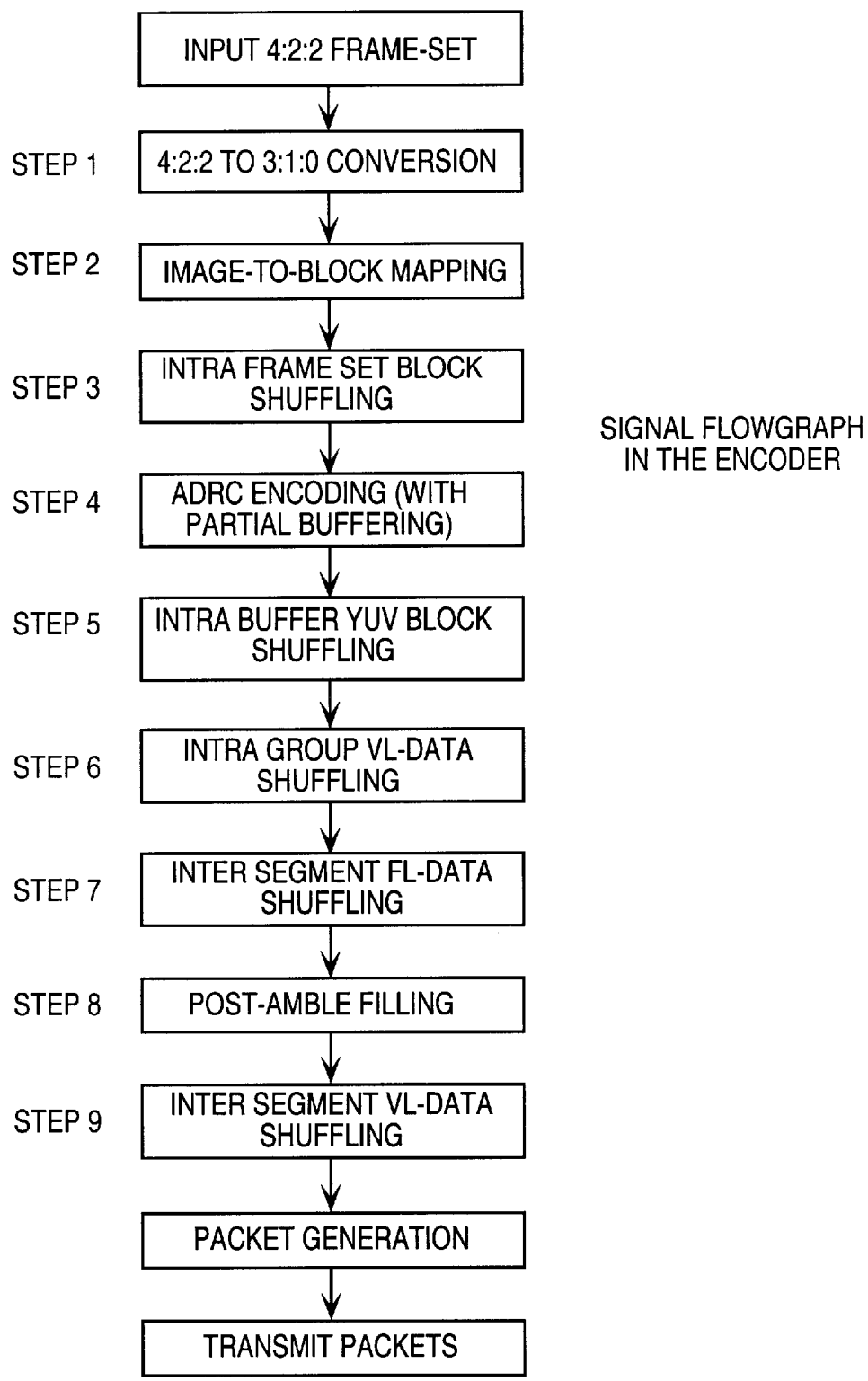
FIG. 3 is a flow diagram illustrating one embodiment of the encoding process in accordance with the teachings of the present invention.

FIG. 3 is a flow diagram illustrating one embodiment of the encoding process performed by Encoder 110. FIG. 3 further describes an overview of the shuffling process used to ensure against image degradation and to facilitate a robust error recovery.

In step one of FIG. 3, an input frame set, also referred to as a display component, is decimated to reduce the transmission requirements. The Y signal is decimated horizontally to three-quarters of its original width and the U and V signals are each decimated to one-half of their original height and one-half of their original width. This results in a 3:1:0 video format with 3960 Y blocks, 660 U blocks and 660 V blocks in each frame pair. As noted earlier, the discussion will describe the processing of Y signals; however, the process is applicable to the U and V signals. At step two, the two Y frame images are mapped to 3D blocks. At step three, 3D blocks are shuffled. At step four, ADRC buffering and encoding is used. At step five, encoded Y, U and V blocks are shuffled within a buffer.

At step six, the VL-data for a group of encoded 3D blocks and their corresponding block attributes are shuffled. At step seven, the FL-data is shuffled across different segments. At step eight, post-amble filling is performed in which variable space at the end of a buffer is filled with a predetermined bitstream. At step nine, the VL-data is shuffled across different segments.

For illustrative purposes the following shuffling description provides a method for manipulation of pixel data before and after encoding. For an alternative embodiment, independent data values are shuffled/deshuffled via hardware. In particular, the hardware maps the address of block values to different addresses to implement the shuffling/deshuffling process. However, address mapping is not possible for data dependent values because shuffling has to follow the processing of data. The intra group VL-data shuffling described below includes the data dependent values. Further, for illustrative purposes the following shuffling description occurs on discrete sets of data. However, for alternative embodiments a signal is defined based on multiple data levels ranging from bits, to pixels, and to frames. Shuffling is possible for each level defined in the signal and across different data levels of the signal.

Figure 4:
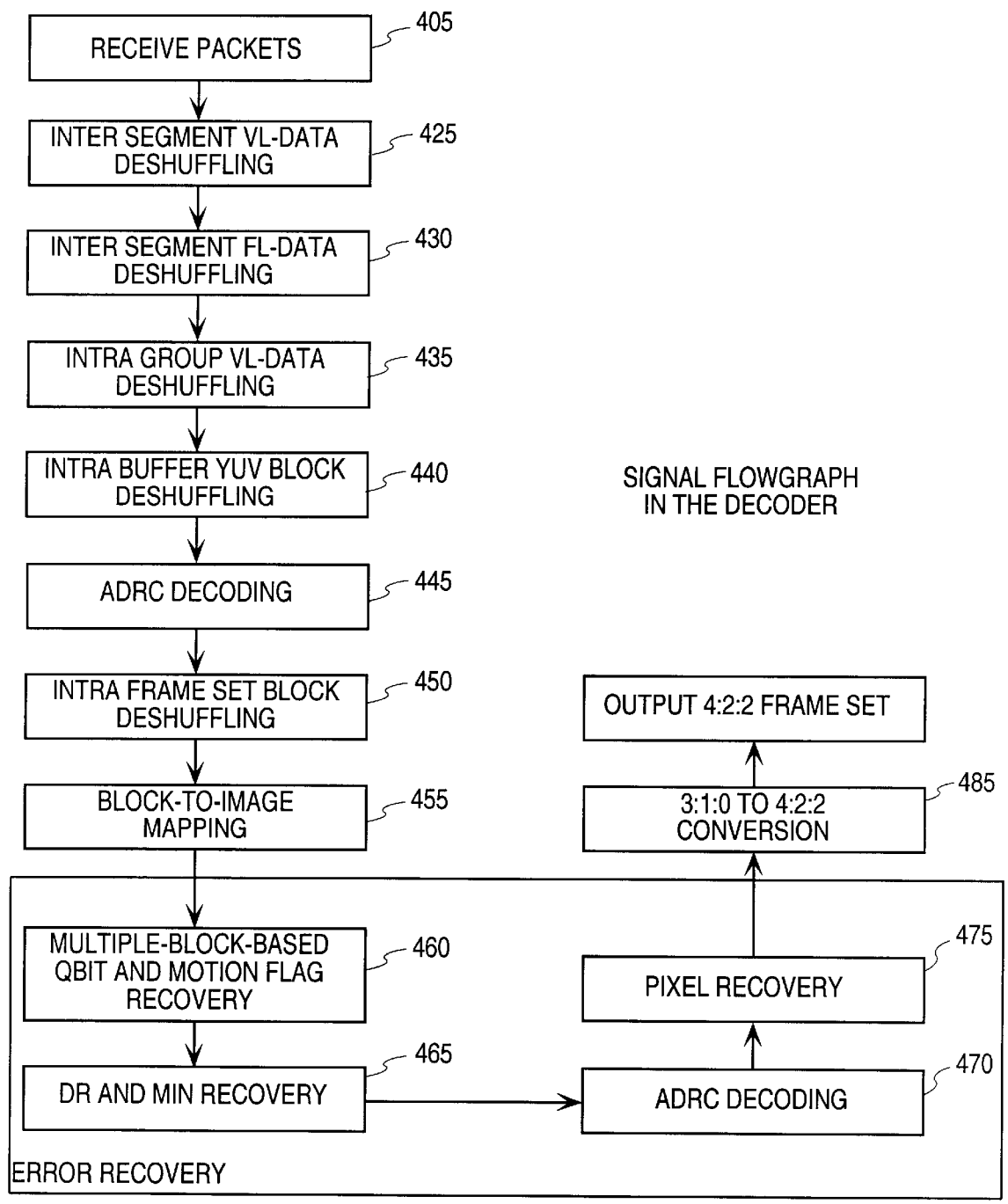
FIG. 4 is a flow diagram illustrating one embodiment of the decoding process in accordance with the teachings of the present invention.

FIG. 4 is a flow diagram illustrating one embodiment of decoding process performed by Decoder 120. Preferably, the conversion and de-shuffling processes are the inverse of the processes represented in FIG. 3. FIG. 4, further describes, in different combinations of Qbit, Motion Flag, DR, MIN and pixel data, an innovative process for error recovery. The error recovery process is described below in different combinations for different embodiments, Qbit, Motion Flag, DR, MIN and pixel recovery.

Image-to-Block Mapping

In the present embodiment, a single frame typically comprises 5280 2D blocks wherein each 2D block comprises 64 pixels. Thus, a frame pair comprises 5280 3D blocks as a 2D block from a first frame and a 2D block from a subsequent frame are collected to form a 3D block.

Image-to-block mapping is performed for the purpose of dividing a frame or frame set of data into 2D blocks or 3D blocks respectively. Moreover, image-to-block mapping includes using a complementary and/or interlocking pattern to divide pixels in a frame to facilitate robust error recovery during transmission losses. However, to improve the probability that a given DR value is not too large, each 2D block is constructed from pixels in a localized area.

Figure 5:
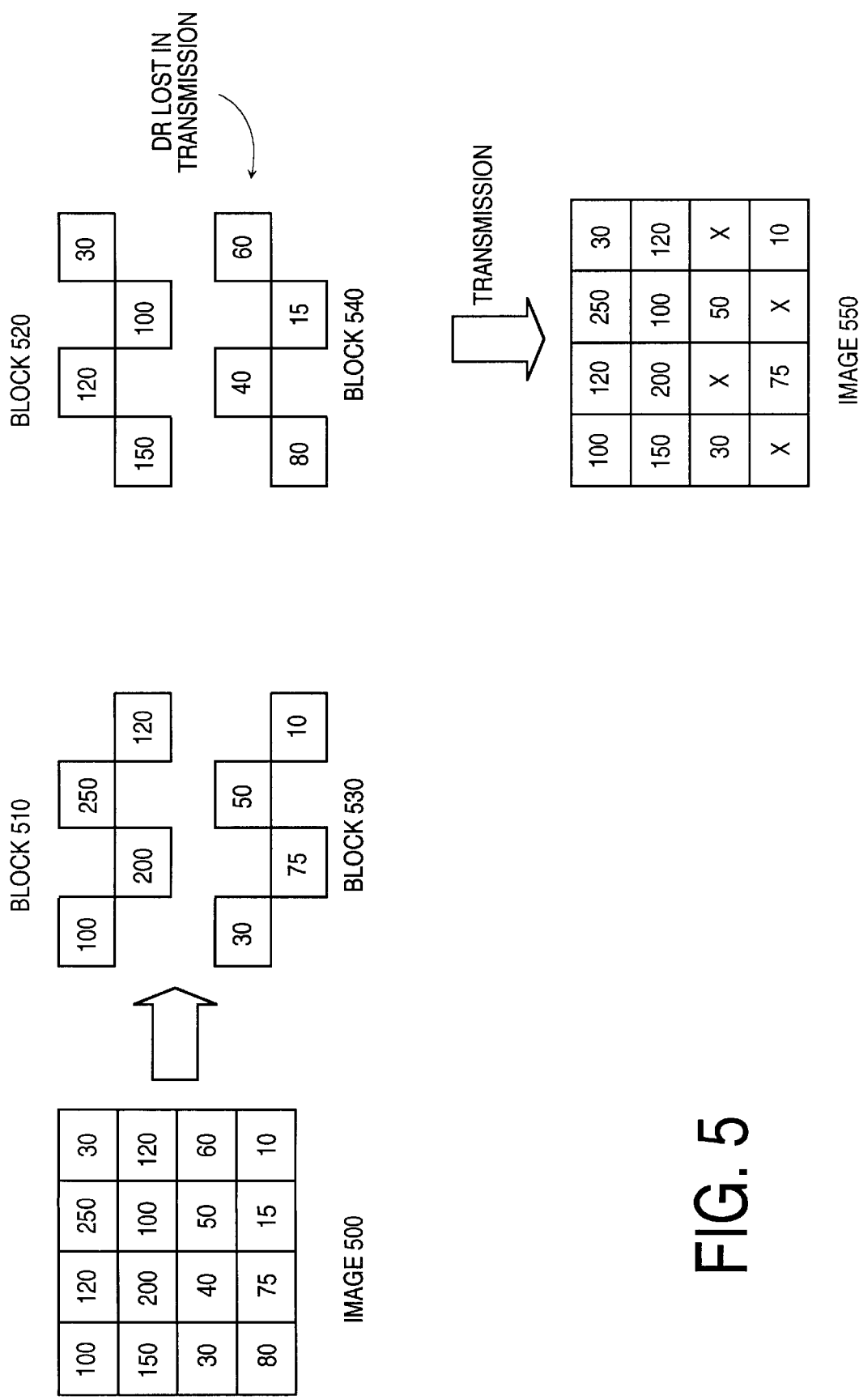
FIG. 5 illustrates one embodiment of image-to-block mapping in accordance with the teachings of the present invention.

FIG. 5 illustrates one embodiment of an image-to-block mapping process for an exemplary 16 pixel section of an image. Image 500 comprises 16 pixels forming a localized area of a single frame. Each pixel in Image 500 is represented by an intensity value. For example, the pixel in the top left hand side of the image has an intensity value equal to 100 whereas the pixel in the bottom right hand side of the image has an intensity value of 10.

In one embodiment, pixels from different areas of Image 500 are used to create 2D Blocks 510, 520, 530, and 540. 2D Blocks 510, 520, 530, and 540 are encoded, shuffled (as illustrated below), and transmitted. Subsequent to transmission, 2D Blocks 510, 520, 530, and 540 are recombined and used to form Image 550. Image 550 is a reconstruction of Image 500.

To ensure accurate representation of Image 500 despite a possible transmission loss, FIG. 5 is an interlocking complementary block structure, one embodiment of which is illustrated in FIG. 5, is used to reconstruct Image 550. In particular, the pixel selection used to create 2D Blocks 510, 520, 530, and 540 ensures that a complementary and/or interlocking pattern is used to recombine the blocks when Image 550 is reconstructed. Accordingly, when a particular 2D block's attribute is lost during transmission, contiguous sections of Image 550 are not distorted during reconstruction. For example, as illustrated in FIG. 5 the DR of 2D Block 540 is lost during data transmission. However, during reconstruction of Image 550, the decoder utilizes multiple neighboring pixels of neighboring blocks through which a DR can be recovered for the missing DR of 2D Block 540. In addition, as will be subsequently described, the combination of complementary patterns and shifting increases the number of neighboring pixels, preferably maximizing the number of neighboring pixels that originate from other blocks, significantly improving DR and MIN recovery.

Figure 5A:
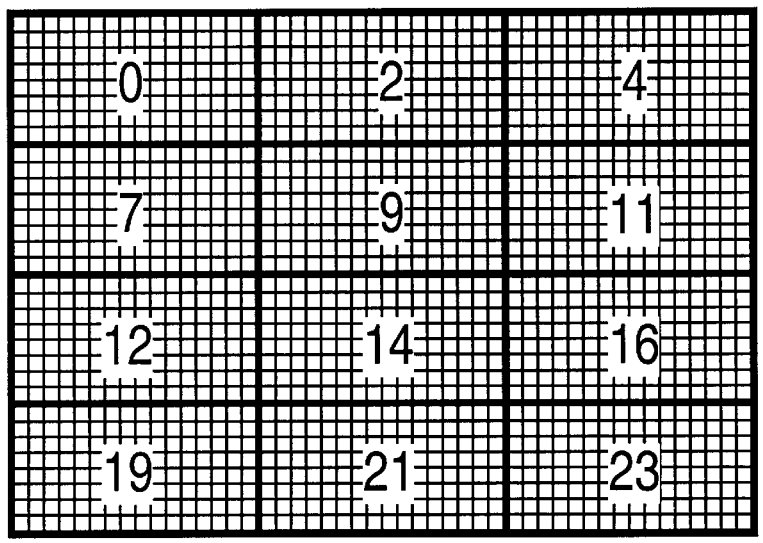
FIG. 5a illustrates one embodiment of a shuffling pattern used in image-to-block mapping.
Figure 5A:
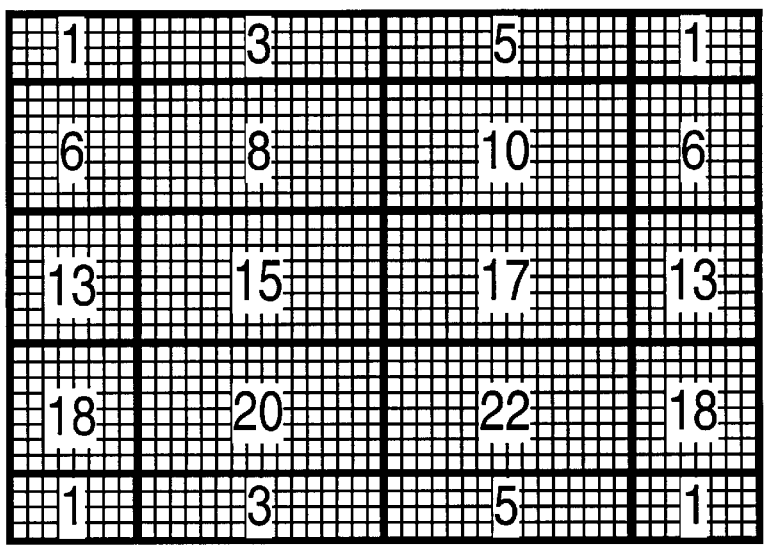

FIG. 5a illustrates one embodiment of a shuffling pattern used to form 2D blocks in one embodiment of the image-to-block mapping process. An image is decomposed into two sub-images, Sub-Image 560 and Sub-Image 570, based on alternating pixels. Rectangular shapes are formed in Sub-Image 560 to delineate the 2D block boundaries. For purposes of discussion, the 2D blocks are numbered 0, 2, 4, 7, 9, 11, 12, 14, 16, 19, 21, and 23. Tile 565 illustrates the pixel distribution for a 2D block within Sub-Image 560.

In Sub-Image 570, the 2D block assignment is shifted by eight pixels horizontally and four pixels vertically. This results in a wrap around 2D block assignment and overlap when Sub-Images 560 and 570 are combined during reconstruction. The 2D blocks are numbered 1, 3, 5, 6, 8, 10, 13, 15, 17, 18, 20, and 22. Tile 575 illustrates the pixel distribution for a 2D block within Sub-Image 570. Tile 575 is the complementary structure of Tile 565. Accordingly, when a particular block's attribute is lost during transmission, neighboring pixels through which a block attribute can be recovered for the missing 2D block exists. Additionally, an overlapping 2D block of pixels with a similar set of block attributes exist. Therefore, during reconstruction of the image the decoder has multiple neighboring pixels from adjacent 2D blocks through which a lost block attribute can be recovered.

Figure 6:
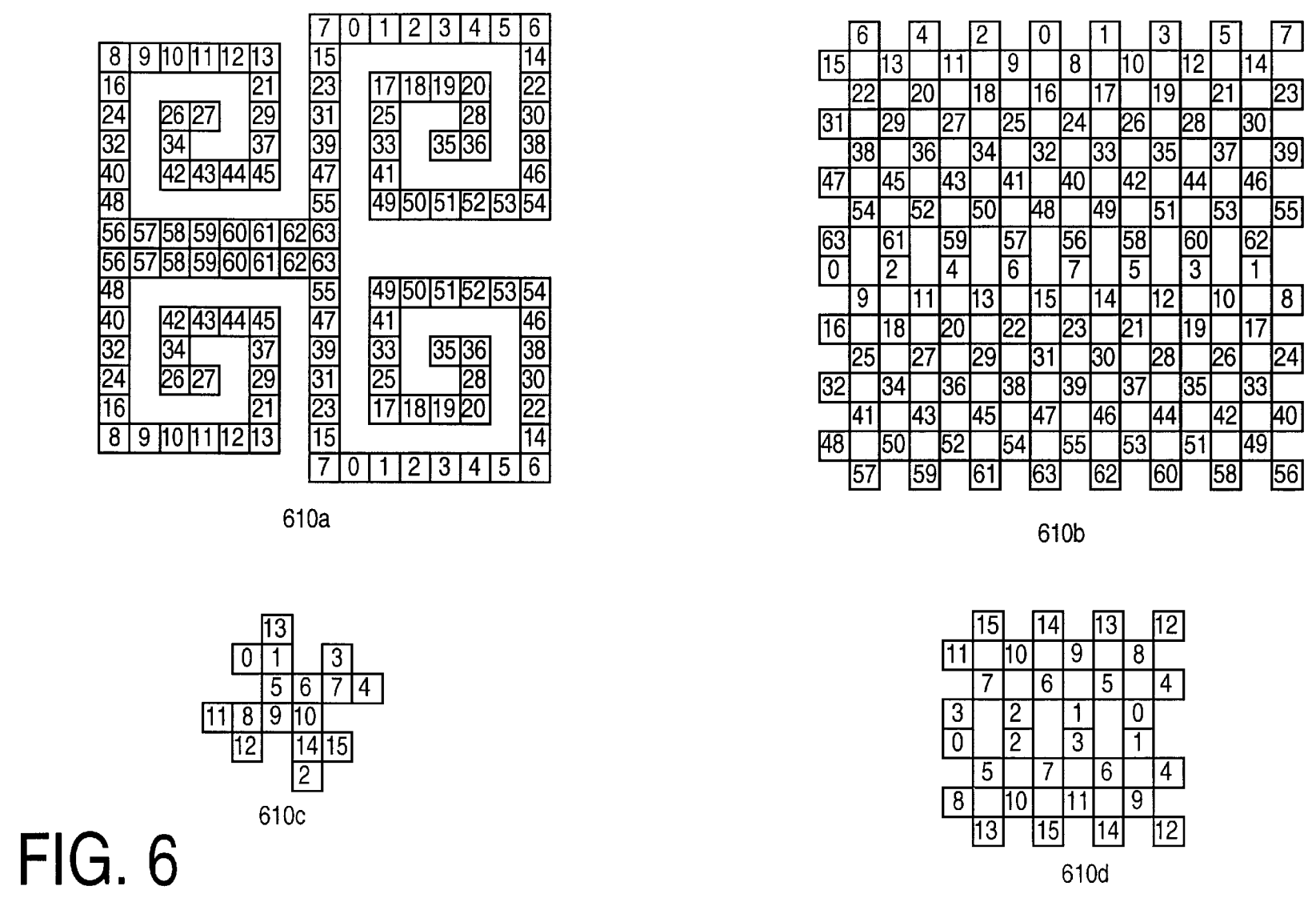

FIG. 6 illustrates other complementary and interlocking 2D block structures. Other structures may also be utilized. Similar to FIG. 5, these 2D block structures illustrated in FIG. 6, ensure surrounding 2D blocks are present despite transmission losses for a given 2D block. However, Patterns 610a, 610b, and 610d use horizontal and/or vertical shifting during the mapping of pixels to subsequent 2D blocks. Horizontal shifting describes shifting the tile structure in the horizontal direction a predetermined number of pixels prior to beginning a new 2D block boundary. Vertical shifting describes shifting the tile structure in the vertical direction a predetermined number of pixels prior to beginning a new 2D block boundary. In application, horizontal shifting only may be applied, vertical shifting may only be applied, or a combination of horizontal and vertical shifting may be applied.

Pattern 610a illustrates a spiral pattern used for image-to-block mapping. The spiral pattern follows a horizontal shifting to create subsequent 2D blocks during the image-to-block mapping process. Patterns 610b and 610d illustrate complementary patterns wherein pixel selection is moved by a horizontal and vertical shifting to create subsequent 2D blocks during the image-to-block mapping process. Further, Patterns 610b and 610d illustrate alternating offsets on pixels selection between 2D blocks. Pattern 610c illustrates using an irregular sampling of pixels to create a 2D block for image-to-block mapping. Accordingly, the image-to-block mapping follows any mapping structure provided a pixel is mapped to a 2D block only once.

FIG. 5, FIG. 5a and FIG. 6 describe image-to-block mapping for 2D block generation. It is readily apparent that the processes are applicable to 3D blocks. As described above, 3D block generation follows the same boundary definition as a 2D block, however the boundary division extends across a subsequent frame resulting in a 3D block. In particular, a 3D block is created by collecting the pixels used to define a 2D block in a first frame together with pixels from a 2D block in a subsequent frame. In one embodiment, both pixels in the 2D block from the first frame and the 2D block from the subsequent frame are from the exact same location.

Intra Frame Set Block Shuffling

The pixels values for a given image are closely related for a localized area. However, in another area of the same images the pixel values may have significantly different values. Thus, subsequent to encoding the DR and MIN values for spatially close 2D or 3D blocks in a section of an image have similar values, whereas the DR and MIN values for blocks in another section of the image may be significantly different. Accordingly, when buffers are sequentially filled with encoded data from spatially close 2D or 3D blocks of an image, a disproportionate usage of buffer space occurs. Intra frame set block shuffling occurs prior to ADRC encoding and includes shuffling the 2D or 3D blocks generated during the image-to-block mapping process. This shuffling process ensures an equalized buffer usage during a subsequent ADRC encoding.

FIGS. 7a–7d illustrate one embodiment of shuffling 3D Y-blocks. The 3D Y-blocks in FIGS. 7a–7d are generated from applying the image-to-block mapping process described above to a frame pair containing only Y signals. The 3D Y-blocks are shuffled to ensure that the buffers used to store the encoded frame pair contain 3D Y-blocks from different parts of the frame pair. This leads to similar DR distribution during ADRC encoding. A similar DR distribution within each buffer leads to consistent buffer utilization.

FIG. 7a–7d also illustrate 3D block shuffling using physically disjointed 3D blocks to ensure that transmission loss of consecutive packets results in damaged block attributes scattered across the image, as opposed to a localized area of the image.

The block shuffling is designed to widely distribute block attributes in the event of small, medium, or large, burst packet losses occur. In the present embodiment, a small burst loss is thought of as one where a few packets are lost; a medium loss is one in which the amount of data that can be held in one buffer is lost; and a large loss is one in which the amount of data that can be held in one segment is lost. During the 3D block shuffling each group of three adjacent blocks are selected from relatively remote parts of the image. Accordingly, during the subsequent intra group VL-data shuffling (to be detailed later), each group is formed from 3D blocks that have differing statistical characteristics. Distributed block attribute losses allow for a robust error recovery because a damaged 3D block is surrounded by undamaged 3D blocks and the undamaged 3D blocks can be used to recover lost data.

Figure 7A:
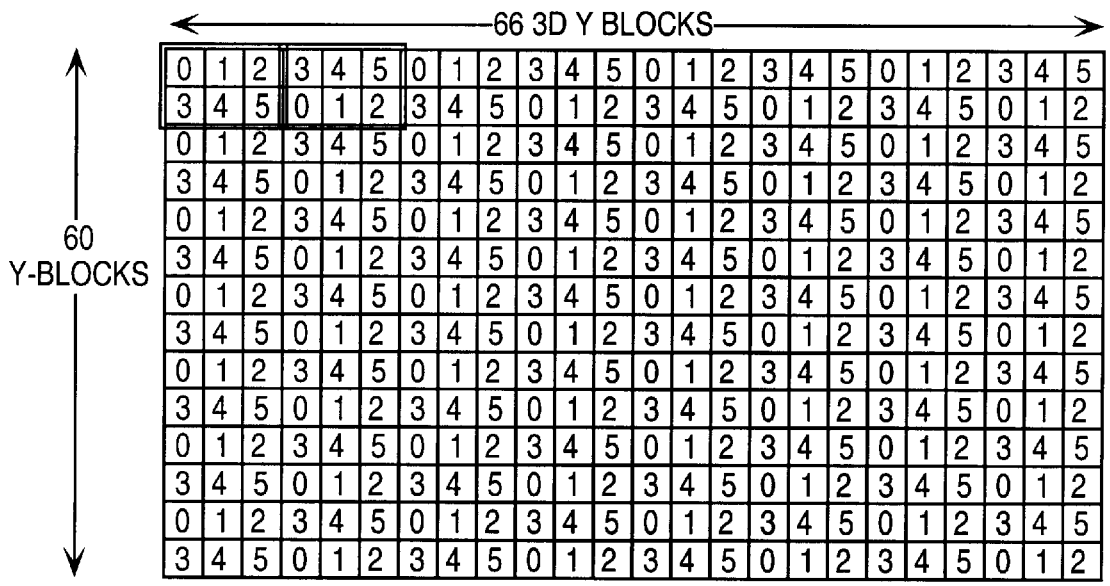
FIGS. 7a, 7b, 7c, 7d illustrate one embodiment of shuffling patterns for Y blocks within a frame set.

FIG. 7a illustrates a frame pair containing 66 3D Y-blocks in the horizontal direction and 60 3D Y-blocks in the vertical direction. The 3D Y-blocks are allocated into Segments 0–5. As illustrated, the 3D Y-block assignment follows a two by three column section such that one 3D Y-block from each section is associated with a segment. Thus, if no further shuffling is performed and a burst loss of the first 880 packets occurs, all the block attributes associated with Segment 0 are lost. However, as later described, FL-data shuffling is performed to further disperse block attribute losses.

Figure 7B:
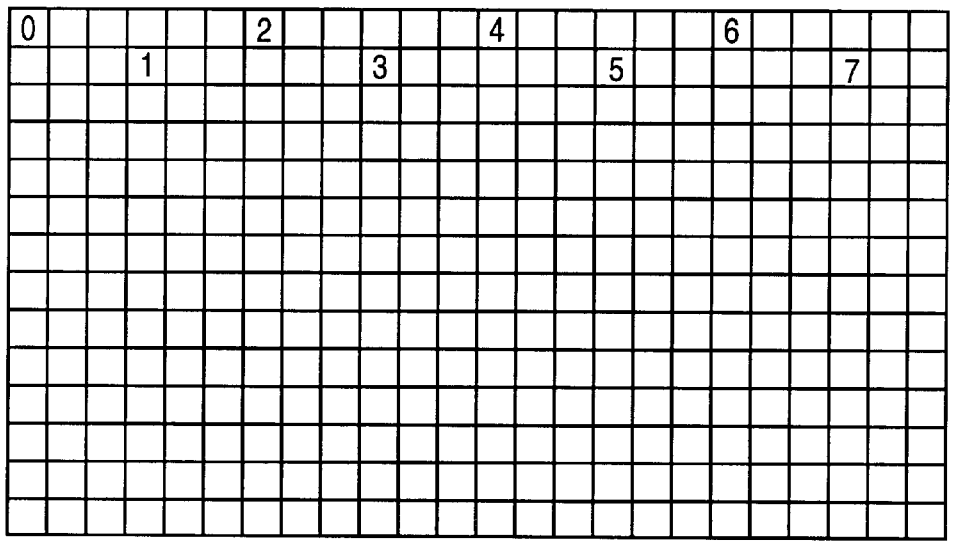

FIG. 7b illustrates the scanning order of 3D Y-blocks numbered "0" used to enter into Segment 0. Each "0"3D Y-block of FIG. 7a is numbered 0, 1, 2, 3, . . . , 659 to illustrate their location in the stream that is inputted into Segment 0. Using the block numbering to allocate segment assignment the remaining 3D Y-blocks are inputted into Segments 1–5, thus resulting in a frame pair shuffled across multiple segments.

Figure 7C:
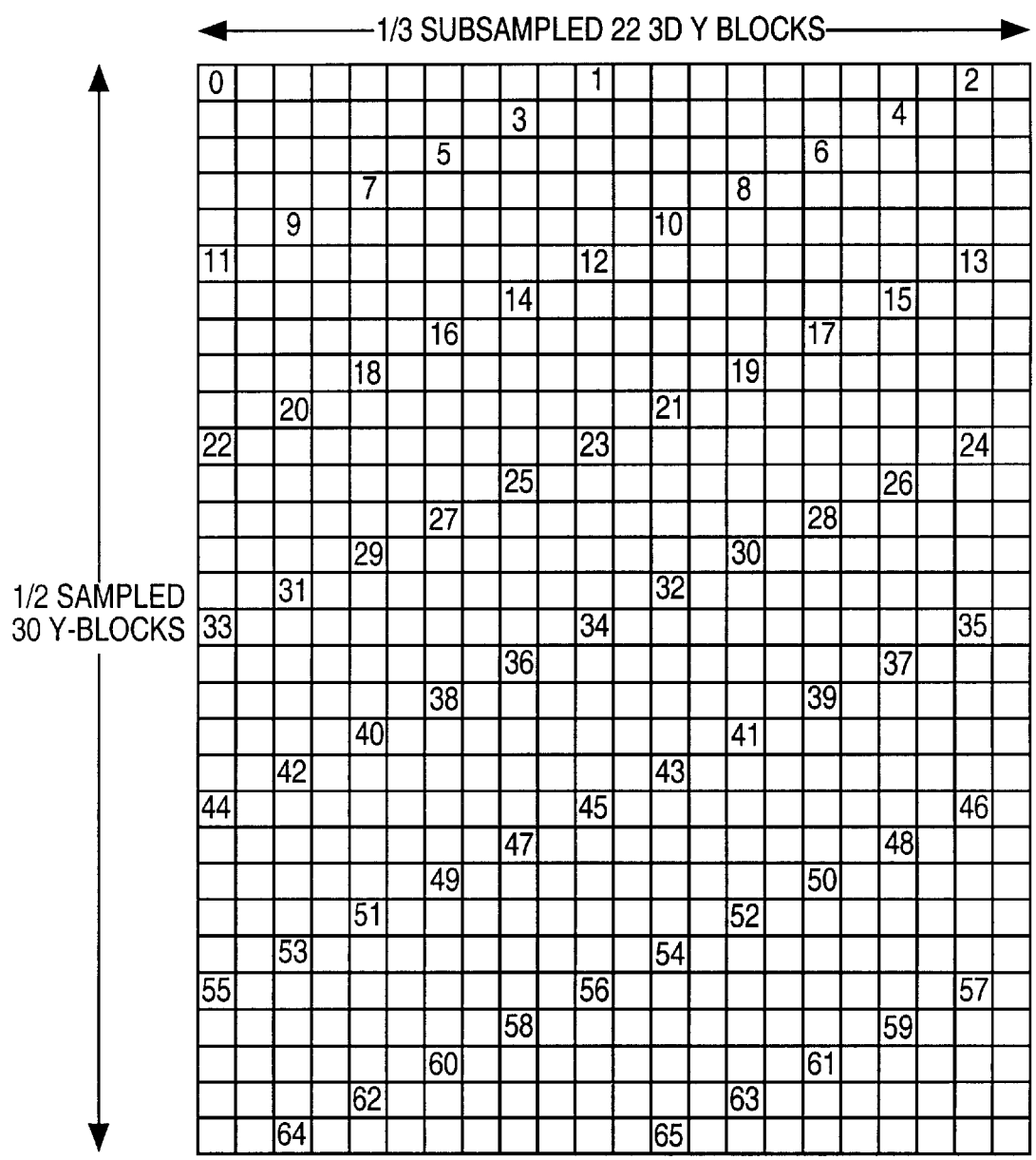

FIG. 7c illustrates the 660 3D Y-blocks comprising one segment. The 3D Y-blocks numbered 0–65 are inputted into Buffer 0. Similarly the 3D Y-blocks adjacent to the numbered 3D Y-blocks are inputted into Buffer 1. The process is repeated to fill Buffers 2–9. Accordingly, damage to a buffer during data transmission results in missing 3D Y-blocks from different parts of the image.

Figure 7D:
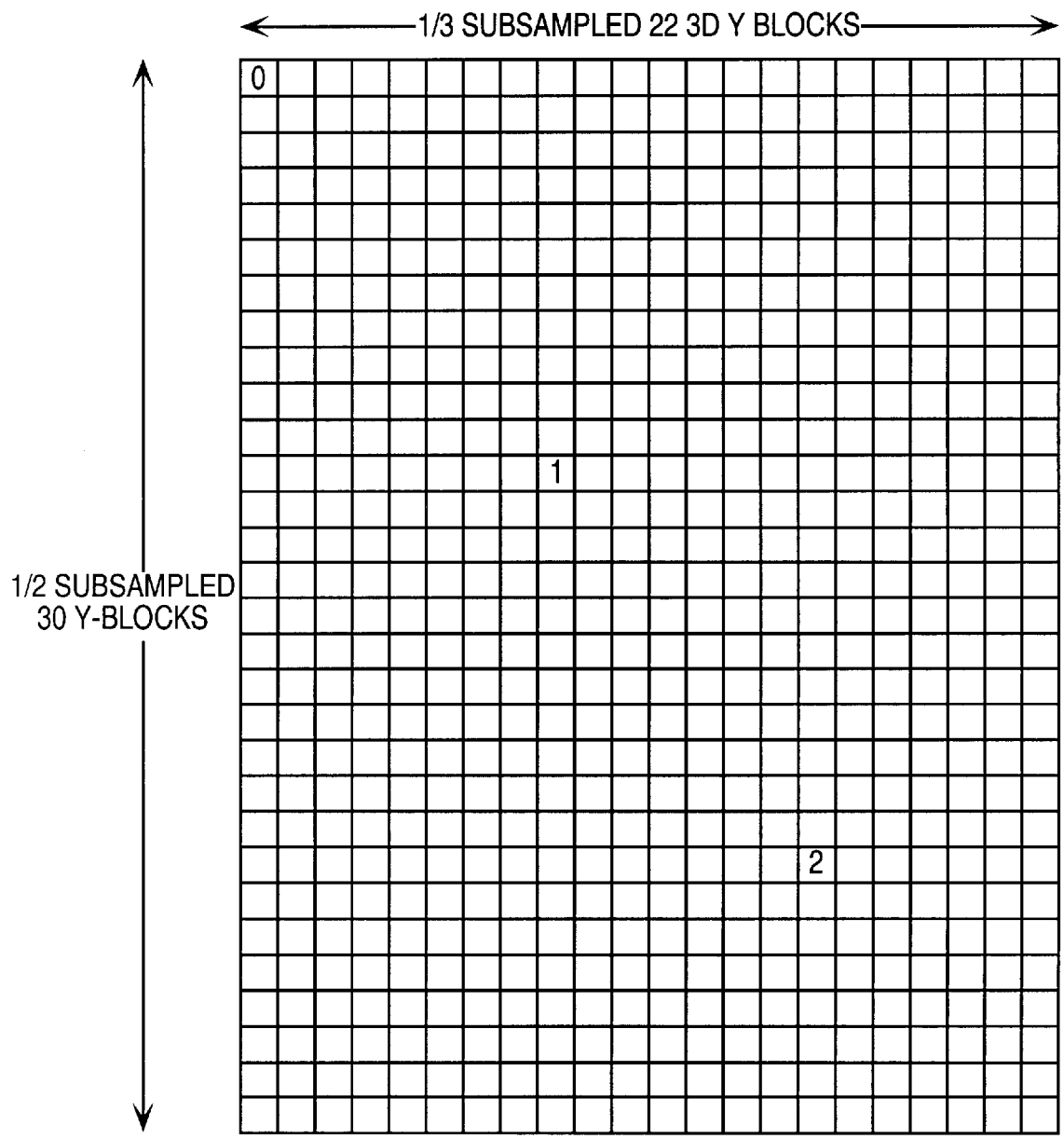

FIG. 7d illustrates the final ordering of the "0"3D Y-blocks across a buffer. 3D Y-blocks 0, 1, and 2 occupy the first three positions in the buffer. The process is repeated for the rest of the buffer. Accordingly, loss of three 3D Y-blocks during data transmission results in missing 3D Y-blocks from distant locations within the image.

FIGS. 7a–d illustrate one embodiment of 3D block distributions for 3D Y-blocks of a frame set. In alternative embodiments, however, 3D block distributions for 3D U-blocks and 3D V-blocks are available. The 3D U-blocks are generated from applying the image-to-block mapping process, described above, to a frame set containing only U signals. Similarly, 3D V-blocks are generated from applying the image-to-block mapping process to a frame set containing only V signals. Both the 3D U-block and the 3D V-block follow the 3D Y-block distribution described above. However, as previously described, the number of 3D U-blocks and 3D V-blocks each have a 1:6 proportion to 3D Y-blocks.

FIGS. 7a–d are used to illustrate one embodiment of intra frame set block shuffling for a Y signal such that burst error of up to 1/6 of the packets lost during transmission is tolerated and further ensures equalized buffer use. It will be appreciated by one skilled in the art that segment, buffer, and ADRC block assignments can be varied to ensure against 1/n burst error loss or to modify buffer utilization.

Partial Buffering

As illustrated in FIG. 3, the ADRC encoding and buffering processes occur in step four. Dependent on the encoding technique, 2D or 3D blocks generated during the image-to-block mapping process are encoded resulting in 2D or 3D ADRC blocks. A 3D ADRC block, contains Q codes, a MIN value, a Motion Flag, and a DR. Similarly, a 2D ADRC block contains Q codes, a MIN, and a DR. A 2D ADRC block, however, does not include a Motion Flag because the encoding is performed on a single frame or a single field.

A number of buffering techniques are found in the prior art (see for example, High Efficiency Coding Apparatus, U.S. Pat. No. 4,845,560 of Kondo et. al. and High Efficiency Coding Apparatus, U.S. Pat. No. 4,722,003 of Kondo). Both High Efficiency Coding Apparatus patents are hereby incorporated by reference.

The partial buffering process set forth below, describes an innovative method for determining the encoding bits used in ADRC encoding. In particular, partial buffering describes a method of selecting threshold values from a threshold table designed to provide a constant transmission rate between remote terminals while restricting error propagation. In an alternative embodiment, the threshold table is further designed to provide maximum buffer utilization. In one embodiment, a buffer is a memory that stores a one-sixtieth division of encoded data from a given frame set. The threshold values are used to determine the number of Qbits used to encode the pixels in 2D or 3D blocks generated from the image-to-block mapping process previously described.

The threshold table includes rows of threshold values, also referred to as a threshold set, and each row in the threshold table is indexed by a threshold index. In one embodiment, the threshold table is organized with threshold sets that generate a higher number of Q code bits located in the upper rows of the threshold table. Accordingly, for a given buffer having a predetermined number of bits available, Encoder 110 moves down the threshold table until a threshold set that generates less than a predetermined number of bits is encountered. The appropriate threshold values are used to encode the pixel data in the buffer.

In one embodiment, a transmission rate of no more than 30 Mbps is desired. The desired transmission rate results in 31,152 bits available for VL-data storage in any given buffer. Accordingly, for each buffer a cumulative DR distribution is computed and a threshold set is selected from the threshold table to encode the pixels in 3D or 2D blocks into VL-data.

Figure 8:
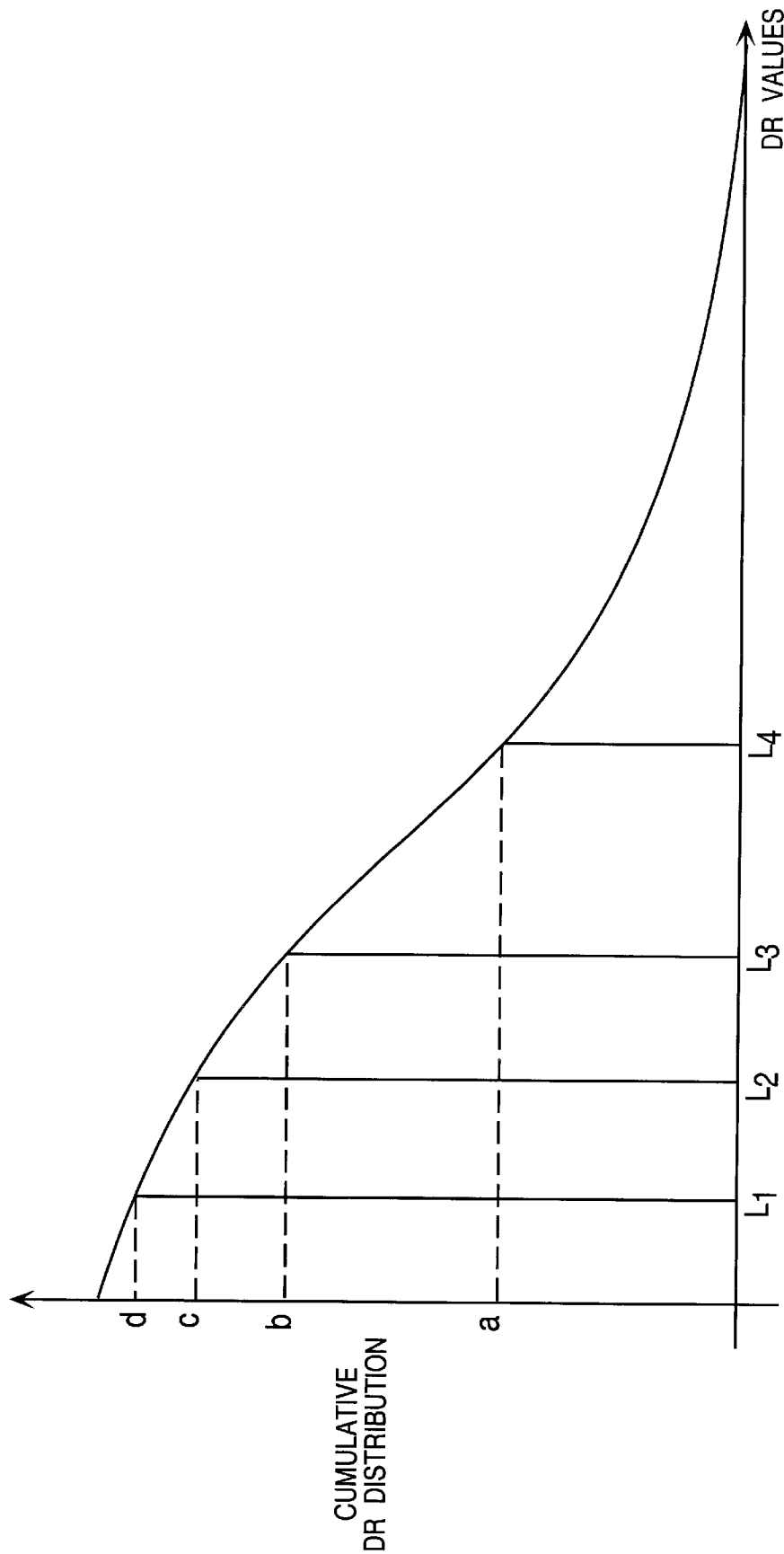
FIG. 8 is an illustration of one embodiment of cumulative DR distribution for Buffer 0.

FIG. 8 illustrates one embodiment of selected threshold values and the DR distribution for Buffer 0. The vertical axis of FIG. 8 includes the cumulative DR distribution. For example, the value "b" is equal to the number of 3D or 2D blocks whose DR is greater than or equal to $L_3$. The horizontal axis includes the possible DR values. In one embodiment, DR values range from 0 to 255. Threshold values $L_4$, $L_3$, $L_2$, and $L_1$ describe a threshold set used to determine the encoding of a buffer.

In one embodiment, all blocks stored in Buffer 0 are encoded using threshold values $L_4$, $L_3$, $L_2$, and $L_1$. Accordingly, blocks with DR values greater than $L_4$ have their pixel values encoded using four bits. Similarly, all pixels belonging to blocks with DR values between $L_3$ and $L_4$ are encoded using three bits. All pixels belonging to blocks with DR values between $L_2$ and $L_3$ are encoded using two bits. All pixels belonging to blocks with DR values between $L_1$ and $L_2$ are encoded using one bit. Finally, all pixels belonging to blocks with DR values smaller than $L_1$ are encoded using zero bits. $L_4$, $L_3$, $L_2$, and $L_1$ are selected such that the total number of bits used to encode all the blocks in Buffer 0 is as close as possible to a limit of 31,152 bits without exceeding the limit of 31,152.

Figure 8A:
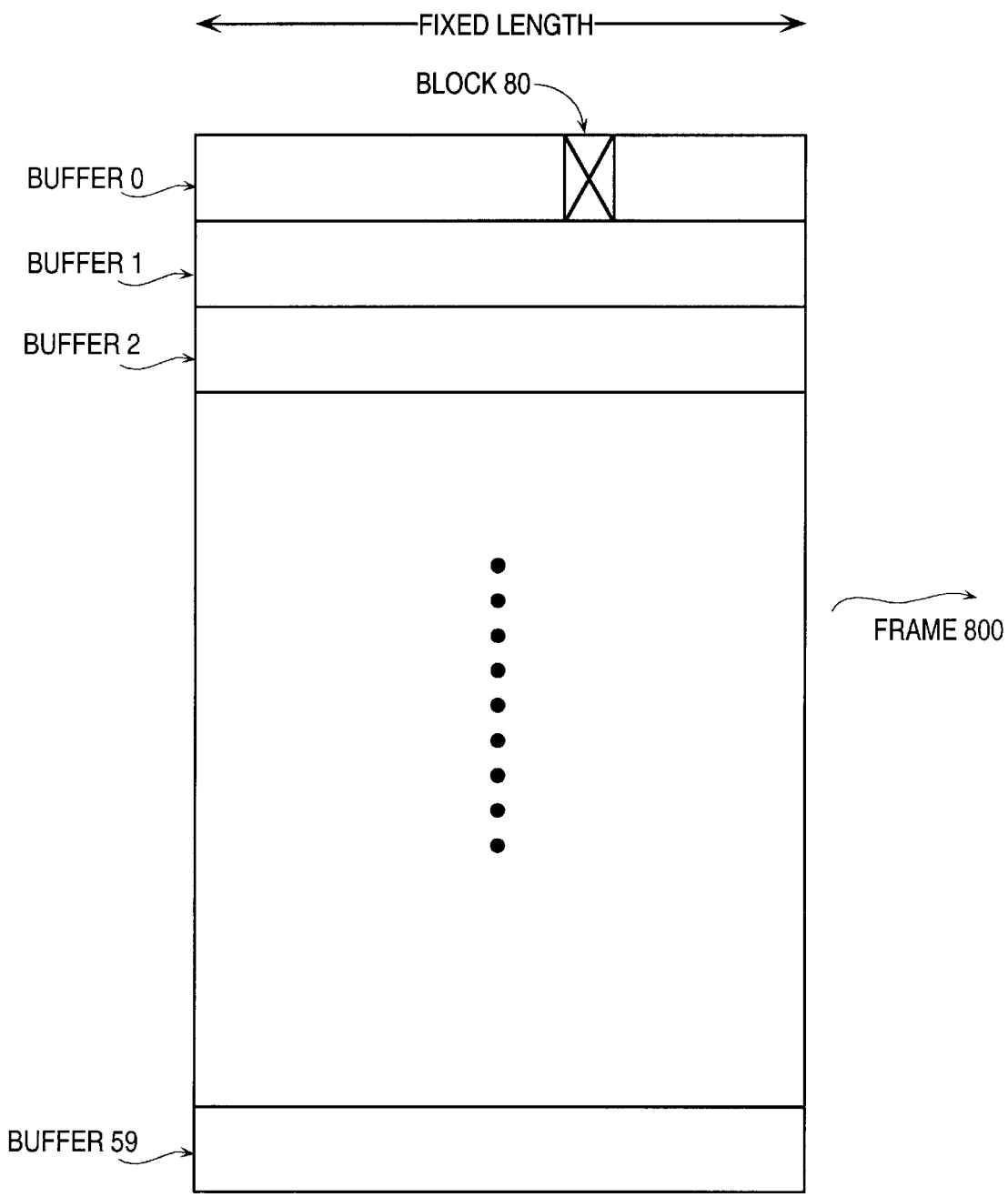
FIG. 8a is an illustration of one embodiment of a partial buffering process in accordance with the teachings of the present invention.

FIG. 8a illustrates the use of partial buffering in one embodiment. Frame 800 is encoded and stored in Buffers 0–59. Provided a transmission error inhibits data recovery, the decoding process is stalled for Frame 800 until error recovery is performed on the lost data. However, partial buffering restricts the error propagation within a buffer, thus allowing decoding of the remaining buffers. In one embodiment, a transmission error inhibits the Qbit and Motion Flag recovery for Block 80 in Buffer 0. Partial buffering limits the error propagation to the remaining blocks within Buffer 0. Error propagation is limited to Buffer 0 because the end of Buffer 0 and the beginning of Buffer 1 are known due to the fixed buffer length. Accordingly, Decoder 120 can begin processing of blocks within Buffer 1 without delay. Additionally, the use of different threshold sets to encode different buffers allows Encoder 110 to maximize/control the number of Q codes bits included in a given buffer, thus allowing a higher compression ratio. Furthermore, the partial buffering process allows for a constant transmission rate because Buffers 0–59 consist of a fixed length.

In one embodiment, a buffer's variable space is not completely filled with Q code bits because a limited number of threshold sets exist. Accordingly, the remaining bits in the fixed length buffer are filled with a predetermined bitstream pattern referred to as a post-amble. As will be described subsequently, the post-amble enables bidirectional data recovery because the post-amble delineates the end of the VL-data prior to the end of the buffer.

Intra Buffer YUV Block Shuffling

Y, U, and V, signals each have unique statistical properties. To improve the Qbit and Motion Flag recovery process (described below) the Y, U, and V signals are multiplexed within a buffer. Accordingly, transmission loss does not have a substantial effect on a specific signal.

Figure 9:
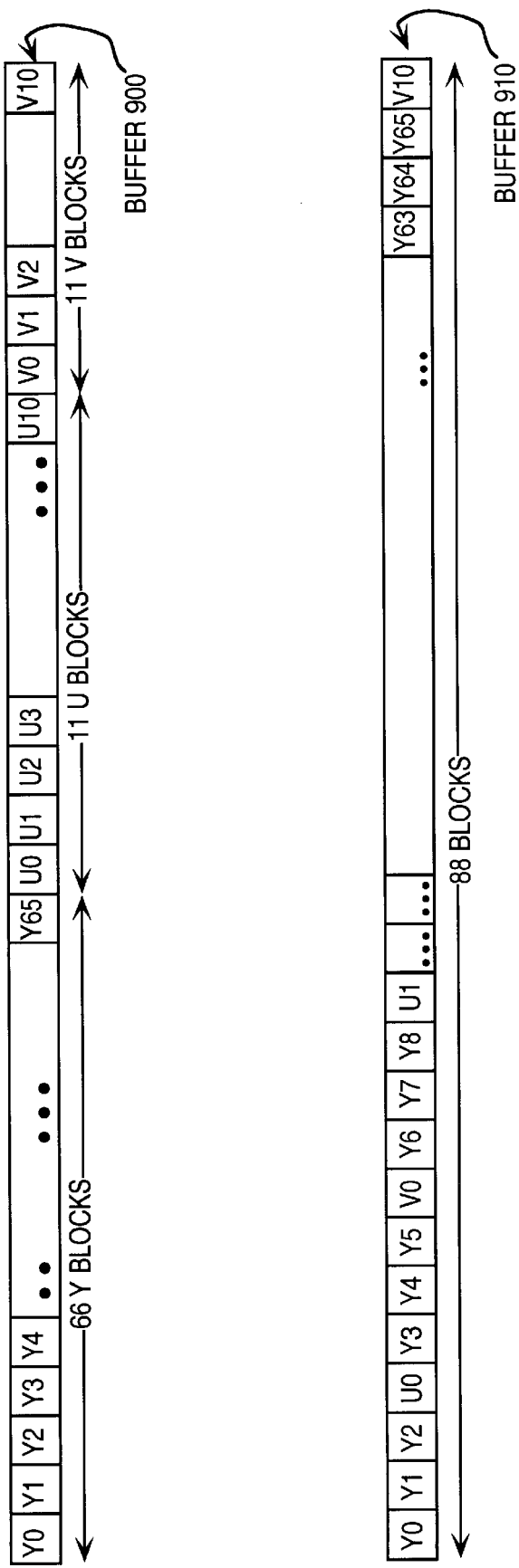
FIG. 9 illustrates one embodiment of the intra buffer YUV block shuffling process in accordance with the teachings of the present invention.

FIG. 9 illustrates one embodiment of the intra buffer YUV block shuffling process in which YUV ADRC blocks are derived from the Y, U, and V signals respectively. Buffer 900 illustrates the ADRC block assignments after intra frame set block shuffling. Buffer 900 comprises 66 Y-ADRC blocks followed by 11 U-ADRC blocks which are in turn followed by 11 V-ADRC blocks. Buffer 910 shows the YUV ADRC block organization after intra buffer YUV block shuffling. As illustrated, three Y-ADRC blocks are followed by a U-ADRC block or three Y-ADRC blocks are followed by a V-ADRC block. Intra buffer YUV block shuffling reduces similarity between adjacent block's bitstreams within the buffer. Alternative embodiments of intra buffer YUV block shuffling with a different signal, i.e., YUV ratios or other color spaces are possible dependent on the initial image format.

Intra Group VL-Data Shuffling

Figure 10:
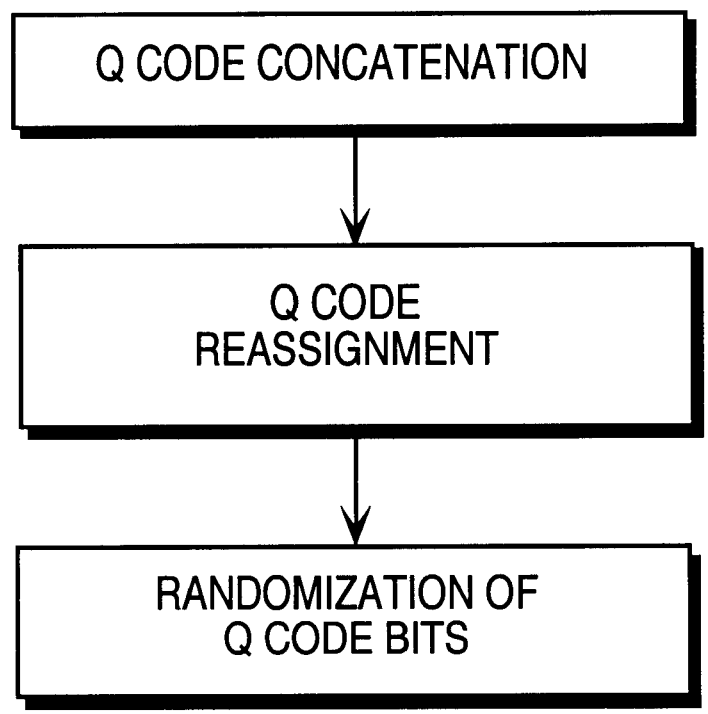
FIG. 10 illustrates one embodiment of the intra group VL-data shuffling process in accordance with the teachings of the present invention.

Intra group VL-data shuffling comprises three processing steps. The three processing steps include Q code concatenation, Q code reassignment, and randomizing concatenated Q codes. FIG. 10 illustrates one embodiment of intra group VL-data shuffling wherein three processing steps are applied consecutively to Q codes stored in a buffer. In alternative embodiments, a subset of the processing step is applied in intra group VL-data shuffling. Each processing step independently assists in the error recovery of data lost during transmission. Accordingly, each processing step is described independently. A detailed description of error recovery is provided below in the discussion of data recovery.

1. Q Code Concatenation

Figure 11:
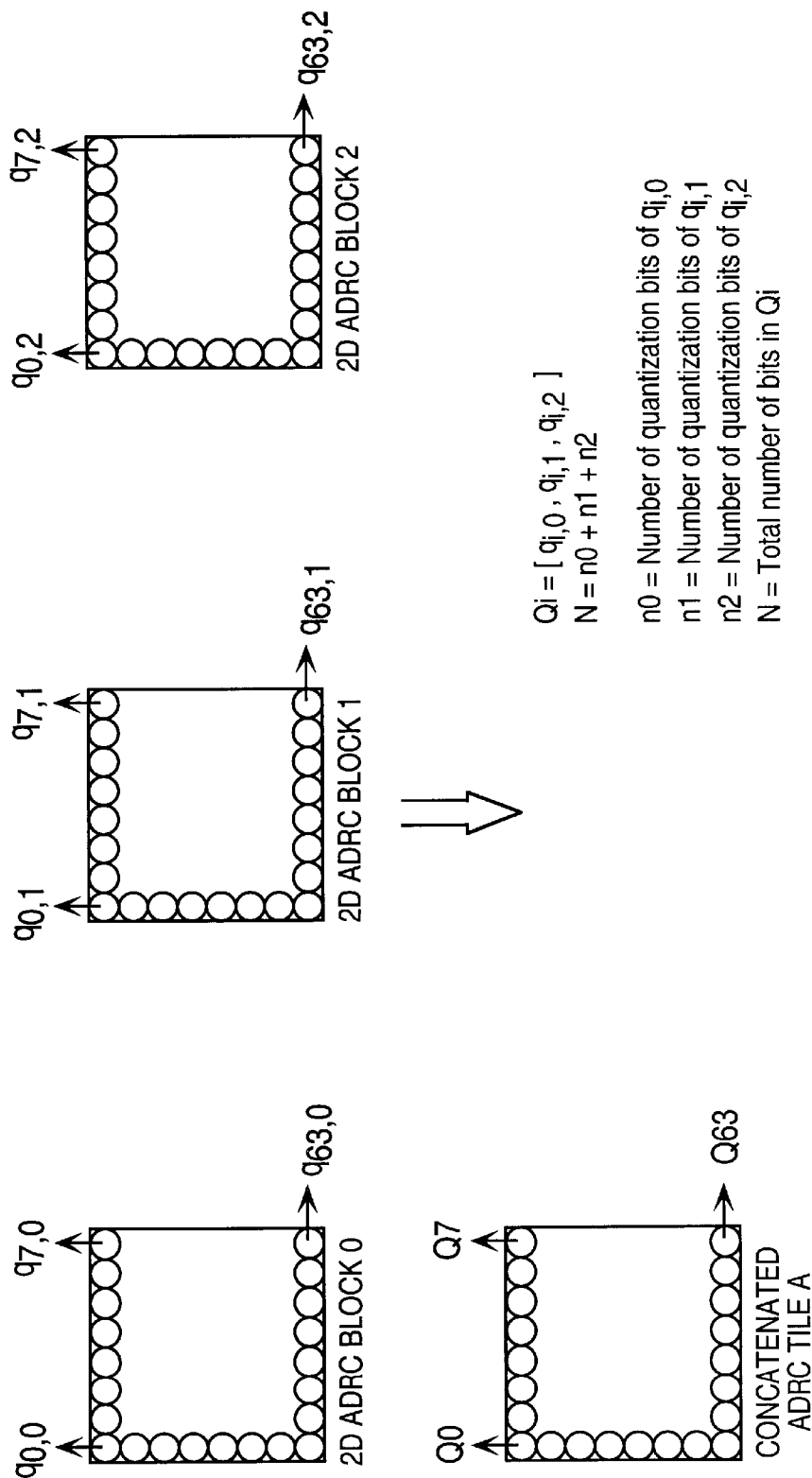
FIG. 11 illustrates one embodiment of Q code concatenation within a 3-block group in accordance with the teachings of the present invention.
Figure 11A:
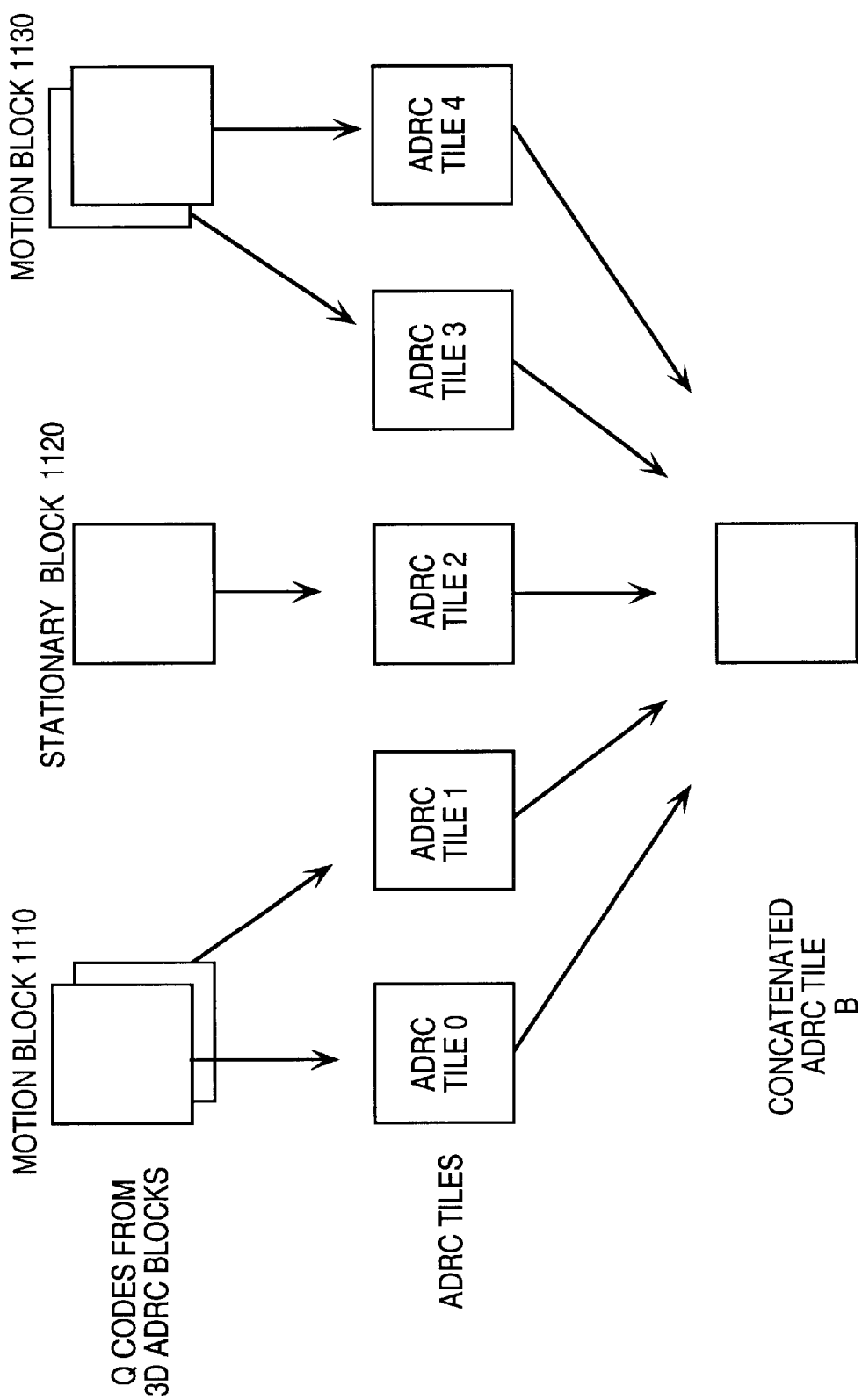
FIG. 11a illustrates one embodiment of Q code concatenation for frame pairs including motion blocks in accordance with the teachings of the present invention.

Q code concatenation ensures that groups of ADRC blocks are decoded together. Group decoding facilitates error recovery because additional information is available from neighboring blocks during the data recovery process detailed below. For one embodiment, Q code concatenation is applied independently to each group of three ADRC blocks stored in a buffer. In an alternative embodiment, a group includes ADRC block(s) from different buffers. The concatenation of Q codes across three ADRC blocks is described as generating one concatenated ADRC tile. FIG. 11 and FIG. 11a illustrate one embodiment of generating concatenated ADRC tiles.

FIG. 11 illustrates one embodiment of generating a concatenated ADRC tile from 2D ADRC blocks. Specifically, the concatenation is performed for each Q code ($q_0$–$q_{63}$) included in 2D ADRC Blocks 0, 1, and 2 resulting in the sixty four Q codes of Concatenated ADRC Tile A. For example, the first Q code $q_{0,0}$ (0th quantized value) of 2D ADRC Block 0 is concatenated to the first Q code $q_{0,1}$ of 2D ADRC Block 1. The two concatenated Q codes are in turn concatenated to the first Q code $q_{0,2}$ of 2D ADRC Block 2, thus resulting in $Q_0$ of Concatenated ADRC Tile A. The processes is repeated until $Q_{63}$ is generated. Alternatively, the generation of $Q_i$ in Concatenated ADRC Tile A is described by the equation $$Q_i = [q_{i,0}, q_{i,1}, q_{i,2}] \ i=0, 1, 2, \ldots 63$$

Additionally, associated with each $Q_i$ in Concatenated ADRC Tile A there is a corresponding number of N bits that represents the total number of bits concatenated to generate a single $Q_i$.

FIG. 11a illustrates one embodiment of generating a concatenated ADRC tile from frame pairs including motion blocks. A motion block is a 3D ADRC block with a set Motion Flag. The Motion Flag is set when a predetermined number of pixels within two 2D blocks structure created by image-to-block mapping process described earlier, change in value between a first frame and a subsequent frame. In an alternative embodiment, the Motion Flag is set when the maximum value of each pixel change between the 2D block of a first frame and a subsequent frame exceeds a predetermined value. In contrast, non-motion (i.e., stationary) block includes a 3D ADRC block with a Motion Flag that is not set. The Motion Flag remains un-set when a predetermined number of pixels within the two 2D blocks of a first frame and a subsequent frame do not change in value. In an alternative embodiment, the Motion Flag remains un-set when the maximum value of each pixel change between a first frame and a subsequent frame does not exceed a predetermined value.

A motion block includes Q codes from an encoded 2D block in a first frame and an encoded 2D block in a subsequent frame. The collection of Q codes corresponding to a single encoded 2D block are referred to as an ADRC tile. Accordingly, a motion block generates two ADRC tiles. However, due to the lack of motion, a stationary block need only include one-half of the number of Q codes of a motion block, thus generating only one ADRC tile. In the present embodiment, the Q codes of a stationary block are generated by averaging corresponding pixels values between a 2D block in a first frame and a corresponding 2D block in a subsequent frame. Each averaged pixel value is subsequently encoded resulting in the collection of Q codes forming a single ADRC tile. Accordingly, Motion Blocks 1110 and 1130 generate ADRC Tiles 0, 1, 3, and 4. Stationary Block 1120 generates ADRC Tile 2.

The concatenated ADRC tile generation of FIG. 11a concatenates the Q codes for ADRC Tiles 0–4 into Concatenated ADRC Tile B. Specifically, the concatenation is performed for each Q code ($q_0$–$q_{63}$) included in ADRC Tiles 0, 1, 2, 3 and 4 resulting in the sixty four Q codes of Concatenated ADRC Tile B. Alternatively, the generation of each Q code, $Q_i$, in Concatenated ADRC Tile B is described by the mathematical equation $$Q_i = [q_{i,0}, q_{i,1}, q_{i,2}, q_{i,3}, q_{i,4}] \ i=0, 1, 2, \ldots 63$$

2. Q Code Reassignment

Q code reassignment ensures that bit errors caused by transmission losses are localized within spatially disjointed pixels. In particular, during Q code reassignment, Q codes are redistributed and the bits of the redistributed Q codes are shuffled. Accordingly, Q code reassignment facilitates error recovery because undamaged pixels surround each damaged pixel.

Furthermore, DR and MIN recovery is aided because pixel damage is distributed evenly throughout an ADRC block, DR and MIN recovery is detailed below in the data recovery discussion.

Figure 12:
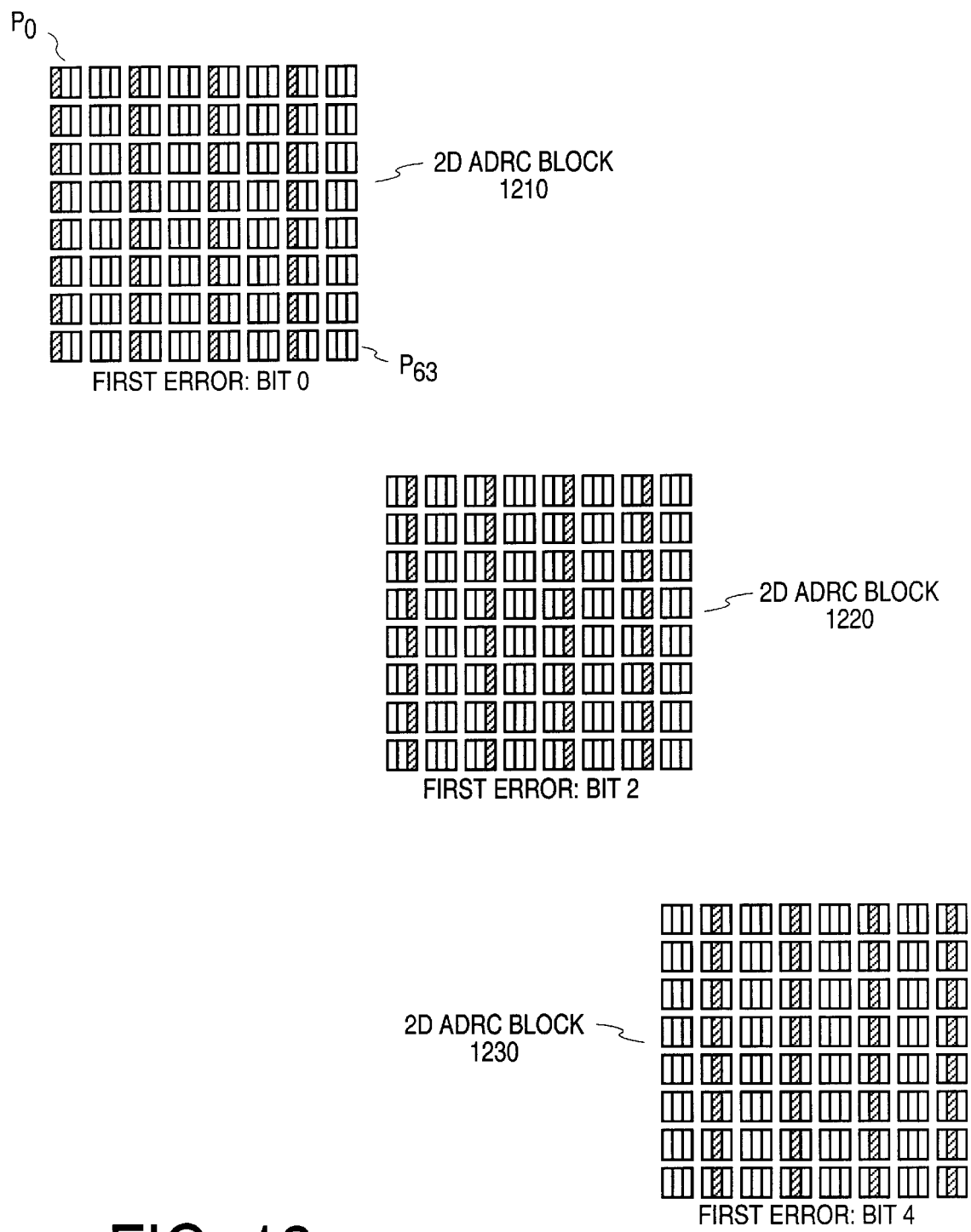
FIG. 12 illustrates one embodiment of pixel data error caused by a 1/6 burst error loss.

FIG. 12 illustrates one embodiment of pixel corruption during the transmission loss of a ⅙ burst error loss. In particular, 2D ADRC Blocks 1210, 1220, and 1230 each include sixty four pixels encoded using three bits.

Accordingly, each pixel, $P_0$ through $P_{63}$, of a 2D ADRC block is represented by three bits. 2D ADRC Block 1210 shows the bit loss pattern, indicated by a darkened square, of bits when the first bit of every six bits are lost. Similarly, the bit loss pattern when the second bit or fourth bit of every six bits are lost are shown in 2D ADRC Blocks 1220 and 1230, respectively. FIG. 12 illustrates that without Q code reassignment one-half of all the pixels 2D ADRC Blocks 1210, 1220, and 1230 are corrupted for a ⅙ burst error loss.

For one embodiment, Q code reassignment is applied independently to each concatenated ADRC tile stored in a buffer, thus ensuring that bit errors are localized within spatially disjointed pixels upon deshuffling. In an alternative embodiment, Q code reassignment is applied to each ADRC block stored in a buffer.

Figure 12A:
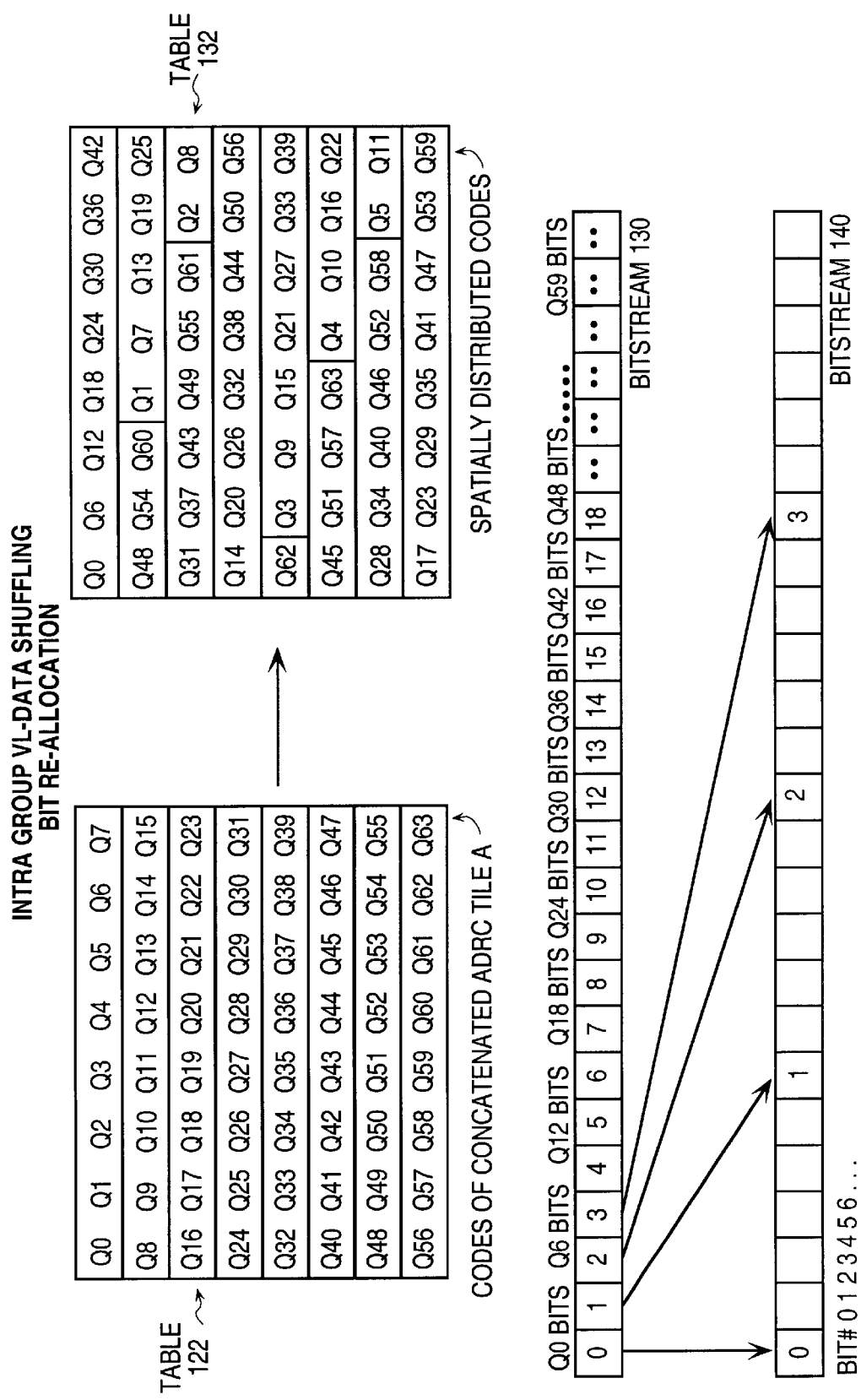
FIG. 12a illustrates one embodiment of shuffling Q codes and distributing Q code bits in accordance with the teachings of the present invention.

FIG. 12a illustrates one embodiment of Q code reassignment that generates a bitstream of shuffled Q code bits from a concatenated ADRC tile. Table 122 and Table 132 illustrate the Q code redistribution. Bitstreams 130 and 140 illustrate the shuffling of Q code bits.

Table 122 shows the concatenated Q codes for Concatenated ADRC Tile A. $Q_0$ is the first concatenated Q code and $Q_{63}$ is the final concatenated Q code. Table 132 illustrates the redistribution of Q codes. For one embodiment $Q_0$, $Q_6$, $Q_{12}$, $Q_{18}$, $Q_{24}$, $Q_{30}$, $Q_{36}$, $Q_{42}$, $Q_{48}$, $Q_{54}$, and $Q_{60}$ are included in a first set, partition 0. Following Table 132, the following eleven concatenated Q codes are included in partition 1. The steps are repeated for partitions 2–5. The boundary of a partition is delineated by a vertical line in Table 132. This disjointed spatial assignment of concatenated Q codes to six partitions ensures that a ⅙ burst error loss results in a bit loss pattern distributed across a group of consecutive pixels.

Figure 12B:
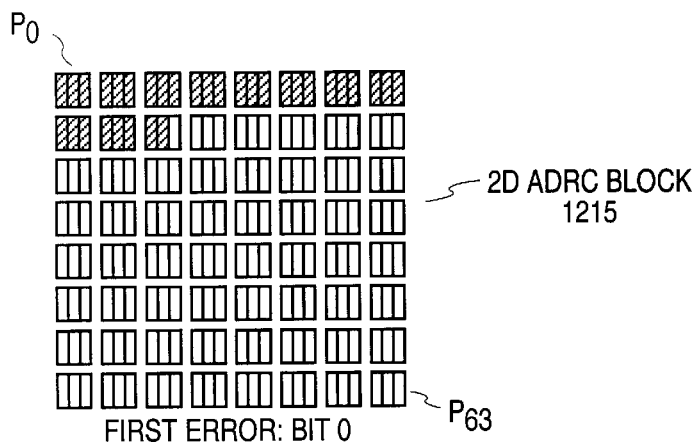
FIG. 12b illustrates one embodiment of pixel data error caused by a 1/6 burst error loss of redistributed Q codes.
Figure 12B:
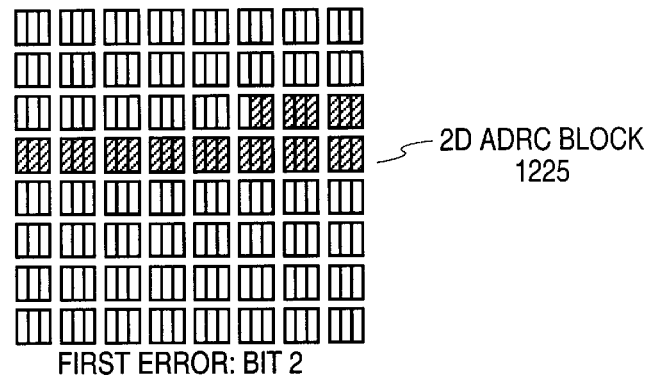
Figure 12B:
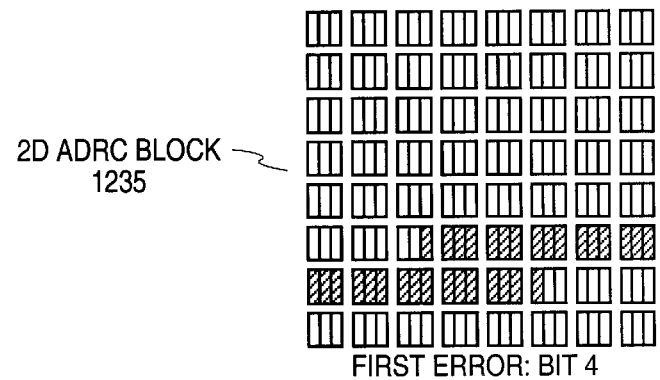

FIG. 12b illustrates one embodiment of the bit pattern loss created by the ⅙ burst error loss of redistributed Q codes. In particular, 2D ADRC blocks 1215, 1225, and 1235 each include sixty four pixels encoded using three bits. Accordingly, each pixel $P_0$ through $P_{63}$, of each 2D ADRC block, is represented by three bits. In 2D ADRC Blocks 1215, 1225, and 1235 the bit loss pattern, indicated by a darkened square, is localized across a group of consecutive pixels. Accordingly, only eleven consecutive pixels within each 2D ADRC Block 1215, 1225, and 1235 are corrupted for a given segment loss. In an alternative embodiment, Q code assignment to partitions include Q codes from different motion blocks, thus providing both a disjointed spatial and temporal assignment of Q codes to six segments. This results in additional undamaged spatial-temporal pixels during a ⅙ burst error loss and further facilitates a more robust error recovery.

Referring to FIG. 12a, the bits of the redistributed Q codes in Table 132 are shuffled across a generated bitstream so that adjacent bits in the bitstream are from adjacent partitions. The Q code bits for all the partitions in Table 132 are concatenated into Bitstream 130. For a given partition adjacent bits in Bitstream 130 are scattered to every sixth bit location in the generated Bitstream 140. Accordingly, bits number zero through five, of Bitstream 140, include the first bit from the first Q code in each partition. Similarly, bits number six through eleven, of Bitstream 140, include the second bit from the first Q code in each partition. The process is repeated for all Q code bits. Accordingly, a ⅙ burst error loss will result in a spatially disjointed pixel loss.

Figure 12C:
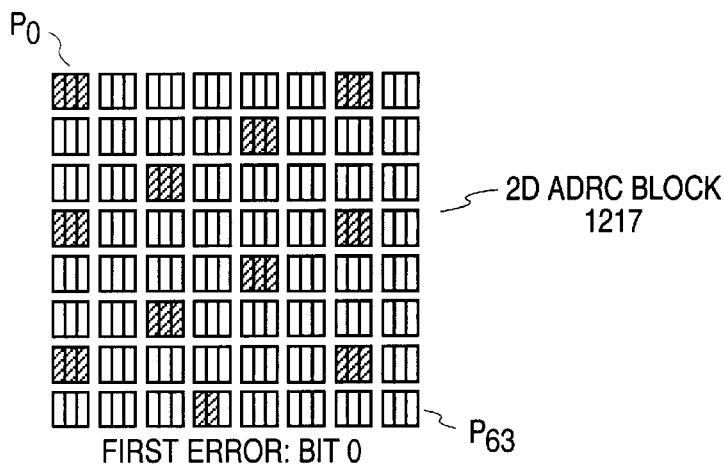
FIG. 12c illustrates one embodiment of pixel data error caused by a 1/6 burst error loss of reassigned Q codes.
Figure 12C:
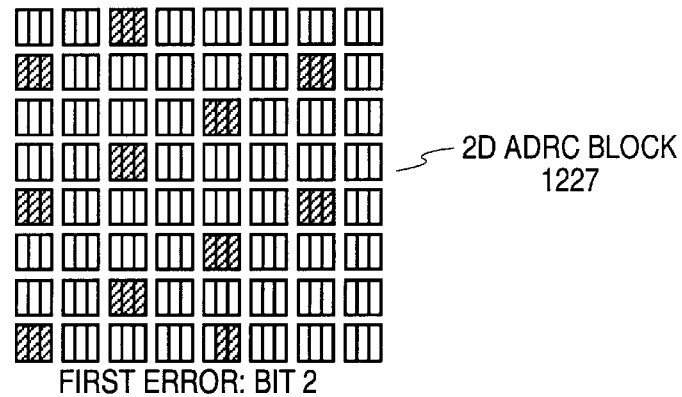
Figure 12C:
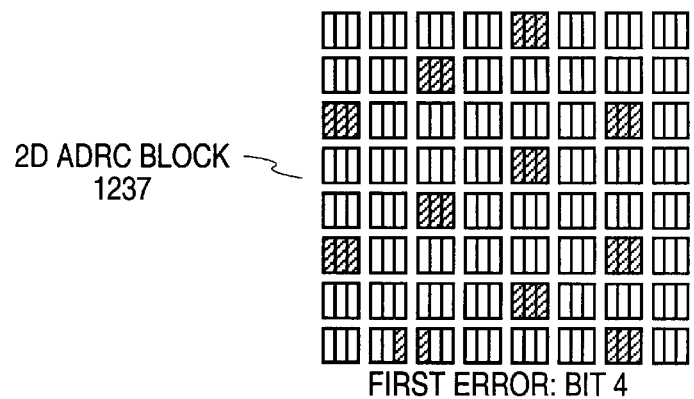

FIG. 12c illustrates one embodiment of the bit pattern loss created by the ⅙ burst error loss of reassigned (i.e. redistributed and shuffled) Q codes. In particular, 2D ADRC Blocks 1217, 1227, and 1237 each include sixty four pixels encoded using three bits. Accordingly, each pixel $P_0$ through $P_{63}$, of each 2D ADRC Block, is represented by three bits. In 2D ADRC Blocks 1217, 1227, and 1237, the bit loss pattern, indicated by a darkened square, is distributed across spatially disjointed pixels, thus facilitating pixel error recovery.

3. Randomization of Q Codes Bits

The Q code bits are randomized using a masking key to assist the decoder in recovering lost and damaged data. In particular, during encoding a key, denoted by KEY, is used to mask a bitstream of Q codes. Accordingly, the decoder must discern the correct values of KEY to unmask the bitstream of Q codes.

In one embodiment, KEY is used to mask a bitstream of Q codes generated by the Q code reassignment of three ADRC blocks. As previously described, an ADRC block includes FL-data and Q codes. Each key element ("$d_i$") of the masking key is generated by the combination of the FL-data values and the number of quantization bits ("$q_i$") associated with a corresponding ADRC block. In one embodiment, Motion Flags and Qbits are used to define a key. Accordingly, in this embodiment, the value of a key element is generated from the mathematical equation $$d_i = 5 \cdot m_i + q_i \text{ where } i=0, 1, 2 \text{ and } q_i = 0, 1, 2, 3, 4$$

The variable $m_i$ equals the Motion Flag. Accordingly, when the corresponding ADRC block is a stationary block, $m_i$ equals 0 and when the corresponding ADRC block is a motion block, $m_i$ equals 1. Furthermore, the variable $q_i$ represents the quantization bits used to encode the corresponding ADRC block. Accordingly, $q_i$ has a value of 0, 1, 2, 3, or 4 for a four bit ADRC encoding technique. In one embodiment, KEY for a group of three ADRC blocks is defined with three key elements ("$d_i$") according to the following equation:

$$KEY = d_0 + 10 \cdot d_1 + 100 \cdot d_2$$

Thus, during the recovery of Motion Flag or Qbit data possible key values are regenerated depending on the values used to create the masking keys. The regenerated key values are used to unmask the received bitstream of Q codes resulting in candidate decodings. A detailed description of regenerating key values and the selection of a specific candidate decoding is provided below in the discussion of data recovery.

In an alternative embodiments, the masking key is generated form a variety of elements. Thus, providing the decoder with the specific information relating to an element without having to transmit the element across a transmission media. In one embodiment, DR or MIN values corresponding to an ADRC block are used to generate a masking key to mask the bitstream representing the ADRC block.

FIGS. 10–12 illustrate intra group VL-data shuffling tolerated up to ⅙ packet data loss during transmission. It will be appreciated by one skilled in the art, that the number of total partitions and bit separation can be varied to ensure against 1/n burst error loss.

Inter Segment FL-Data Shuffling

Inter segment FL-data shuffling describes rearranging block attributes among different segments. Rearranging block attributes provides for a distributed loss of data. In particular, when FL-data from a segment is lost during transmission the DR value, MIN value, and Motion Flag value lost do not belong to the same block. FIGS. 13 and 14 illustrate one embodiment of inter segment FL-data shuffling.

FIG. 13 illustrates the contents of Segments 0 to 5. For one embodiment, each segment comprises 880 DRs, 880 MINs, 880 Motion Flags, and VL-data corresponding to 660 Y-blocks, 110 U-blocks, and 110 V-blocks. As illustrated in graph MIN Shuffling 1300, the MIN values for Segment 0 are moved to Segment 2, the MIN values for Segment 2 are moved to Segment 4, and the MIN values for Segment 4 are moved to Segment 0. Additionally, the MIN values for Segment 1 are moved to Segment 3, the MIN values for Segment 3 are moved to Segment 5, and the Motion Flag values for Segment 5 are moved to Segment 1.

Figure 13A:
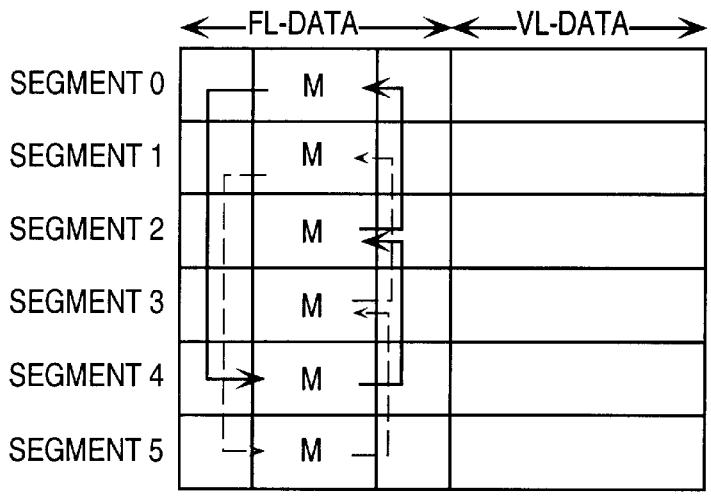
FIG. 13a illustrates one embodiment of Motion Flag shuffling and of a fixed length data loss in one frame pair.

FIG. 13a illustrates Motion Flag shuffling. As illustrated, in graph Motion Flag Shuffling 1305, the Motion Flag values for Segment 0 are moved to Segment 4, the Motion Flag values for Segment 2 are moved to Segment 0, and the Motion Flag values for Segment 4 are moved to Segment 2. Additionally, the Motion Flag values for Segment 1 are moved to Segment 5, the Motion Flag values for Segment 3 are moved to Segment 1, and the Motion Flag values for Segment 5 are moved to Segment 3. Loss pattern 1310 illustrates the FL-data loss after Segment 0 is lost during transmission.

For a specific block attribute, both FIG. 13 and FIG. 13a illustrate shuffling all instances of the specific block attribute between segments. For example, in FIG. 13 the 880 MIN values from Segment 0 are collectively exchanged with the 880 MIN values in Segment 2. Similarly, in FIG. 13a the 880 Motion Flags for Segment 0 are collectively exchanged with the 880 Motion Flags in Segment 4. During a transmission loss of consecutive packets, this collective shuffling of block attributes results in a disproportionate loss of a specific block attributes for a block group. In one embodiment, a block group includes three ADRC blocks.

FIG. 14 illustrates one embodiment of a modular three shuffling process for DR, MIN, and Motion Flag values. A modular three shuffling describes a shuffling pattern shared across three blocks (i.e., a block group) in three different segments. The shuffling pattern is repeated for all block groups within the three different segments. However, a different shuffling pattern is used for different block attributes. Accordingly, the modular three shuffling process distributes block attributes over all three segments. In particular, for a given block group a modular three shuffling ensures that only one instance of a specific block attribute is lost during the transmission loss of a segment. Thus, during the data recovery process, described below, a reduced number of candidate decodings are generated to recover data loss within a block.

As illustrated in DR Modular Shuffle 1410, a segment stores 880 DR values. Accordingly, the DR values are numbered 0–879 dependent on the block from which a given DR value is derived. In a modular three shuffling the FL-data contents of three segments are shuffled. A count of 0–2 is used to identify each DR value in the three segments identified for a modular shuffling. Accordingly, DR's belonging to blocks numbered 0, 3, 6, 9 . . . belong to Count 0. Similarly, DR's belonging to blocks numbered 1, 4, 7, 10, . . . belong to Count 1 and DR's belonging to blocks numbered 2, 5, 8, 11 . . . belong to Count 2. Thus, for a given count the DR values associated with that count are shuffled across Segment 0, 2, and 4. Similarly, the DR values associated with the same count are shuffled across Segments 1, 3, and 5.

In DR Modular Shuffle 1410, the DR values belonging to Count 0 are left un-shuffled. The DR values belonging to Count 1 are shuffled. In particular, the Count 1 DR values in Segment A are moved to Segment B, the Count 1 DR values in Segment B are moved to Segment C, and the Count 1 DR values in Segment C are moved to Segment A.

The DR values belonging to Count 2 are also shuffled. In particular, the Count 2 DR values in Segment A are moved to Segment C, the Count 2 DR values in Segment B are moved to Segment A, and the Count 2 DR values in Segment C are moved to Segment B.

MIN Modular Shuffle 1420 illustrates one embodiment of a modular three block attribute shuffling process for MIN values. A segment includes 880 MIN values. In MIN Modular Shuffle 1420, the shuffling pattern used for Count 1 and Count 2 in DR Modular Shuffle 1410 are shifted to Count 0 and Count 1. In particular, the shuffling pattern used for Count 1 in DR Modular Shuffle 1410 is applied to Count 0. The shuffling pattern used for Count 2 in DR Modular Shuffle 1410 is applied to Count 1 and the MIN values belonging to Count 2 are left un-shuffled.

Motion Flag Modular Shuffle 1430 illustrates one embodiment of a modular three block attribute shuffling process for Motion Flag values. A segment includes 880 Motion Flag values. In Motion Flag Modular Shuffle 1430, the shuffling pattern used for Count 1 and Count 2 in DR Modular Shuffle 1410 are shifted to Count 2 and Count 0 respectively. In particular, the shuffling pattern used for Count 2 in DR Modular Shuffle 1410 is applied to Count 0. The shuffling pattern used for Count 1 in DR Modular Shuffle 1410 is applied to Count 2 and the Motion Flag values belonging to Count 1 are left un-shuffled.

FIG. 14a illustrates the modular shuffling result of Modular Shuffles 1410, 1420, and 1430. Modular Shuffle Result 1416 shows each attribute destination of blocks belonging to Segment 0. In this example, Segment 0 corresponds to Segment A of FIG. 14. This destination is defined according to Modular Shuffles 1410, 1420, and 1430 of FIG. 14. FIG. 14a also illustrates the distribution loss of block attributes after Segment 0 is lost during transmission. In particular, Loss Pattern 1415 shows the DR, Motion Flag, and MIN values loss across six segments after a subsequent deshuffling is applied to the received data that was initially shuffled using Modular Shuffles 1410, 1420, and 1430. As illustrated in FIG. 14a, the block attribute loss is distributed periodically across Segments 0, 2, and 4 while Segments 1, 3, and 5 have no block attribute loss. Additionally, Spatial Loss Pattern 1417 illustrates the deshuffled spatial distribution of damaged FL-data after Segment 0 is lost during transmission. Spatial Loss Pattern 1417 shows the DR, Motion Flag, and MIN value loss after a subsequent deshuffling is applied to the received data. In Spatial Loss Pattern 1417, a damaged block is surrounded by undamaged blocks and damaged block attributes can be recovered with surrounding undamaged blocks.

FIG. 14 and FIG. 14a illustrate a modular three shuffling pattern and the distribution loss of block attributes after a segment is lost during transmission. In alternative embodiments, the count variables or the number of segments are varied to alternate the distribution of lost block attributes. FIG. 14b illustrates Modular Shuffle Result 1421 and Loss Pattern 1420. Similarly, FIG. 14c illustrates Modular Shuffle Result 1426 and Loss Pattern 1425. Both Loss Pattern 1420 and Loss Pattern 1425 illustrate the distribution loss of block attributes across six segments, as opposed to three segments as previously described.

It is contemplated that in alternate embodiments various combinations of block attributes will be distributed to perform the shuffling process.

Inter Segment VL-Data Shuffling

Figure 15:
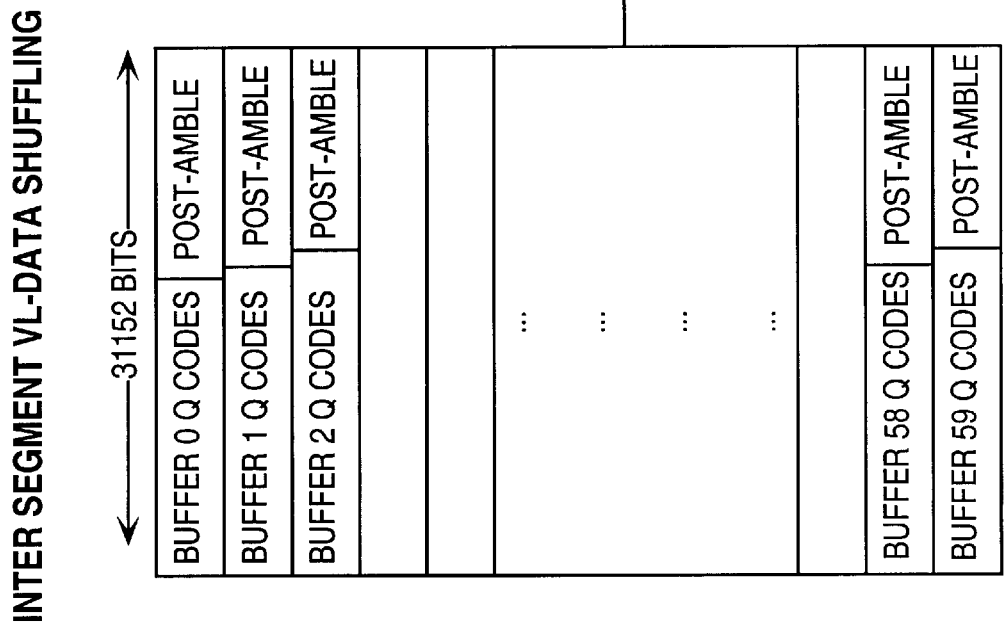
FIG. 15 illustrates one embodiment of variable length data buffering in a frame set.
Figure 16:
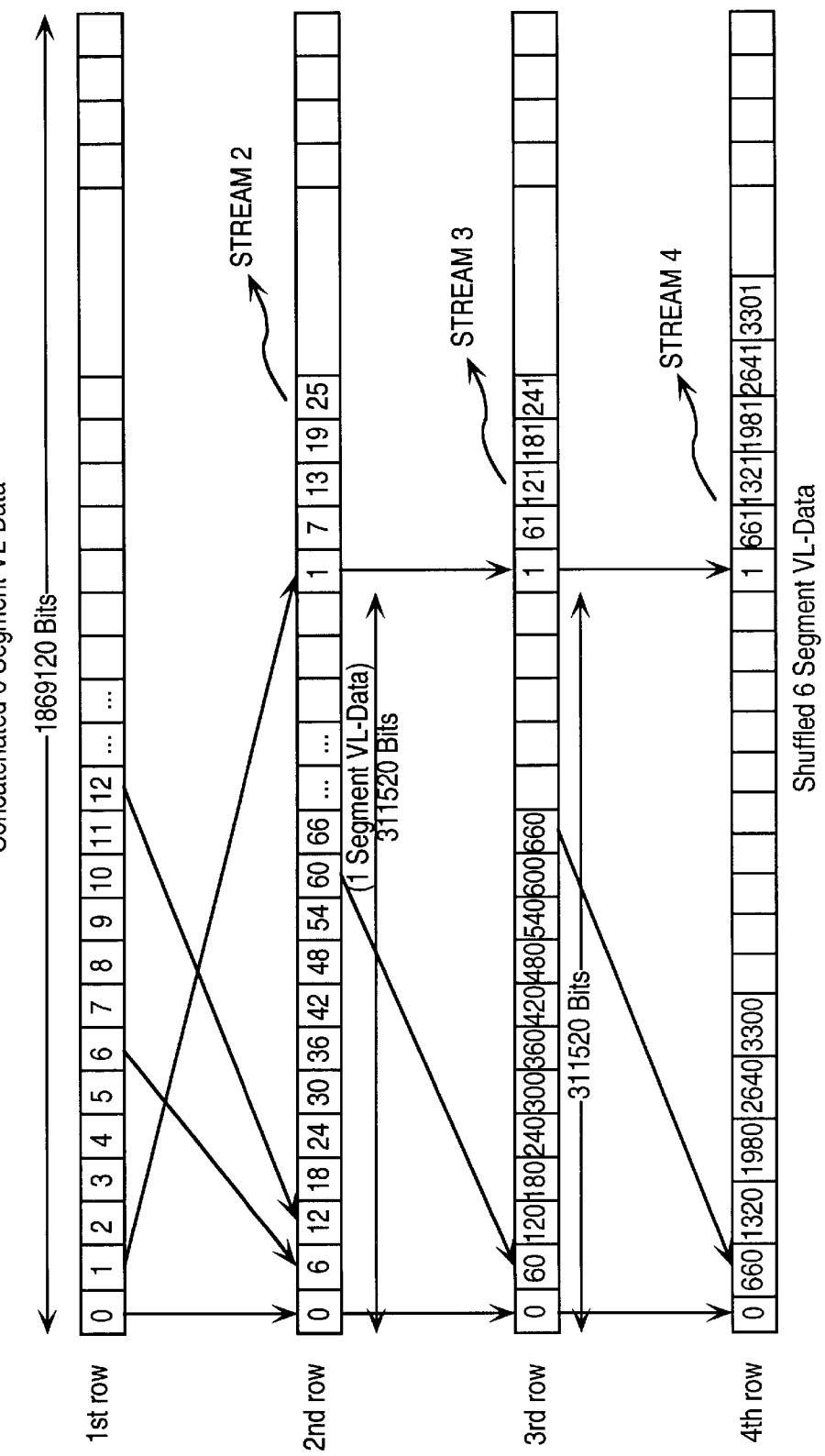
FIG. 16 illustrates one embodiment of inter segment VL-data shuffling in accordance with the teachings of the present invention.

In the inter segment VL-data shuffling process, bits between a predetermined number of segments, for example, 6 segments, are arranged to ensure a spatially separated and periodic VL-data loss during an up to 1/6 packet transmission loss. FIG. 15 and 16 illustrate one embodiment of the inter segment VL-data shuffling process.

In the present embodiment, a transmission rate approaching 30 Mbps is desired. Accordingly, the desired transmission rate results in 31,152 bits available for the VL-data in each of the 60 buffers. The remaining space is used by FL-data for the eighty eight blocks included in a buffer. FIG. 15 includes the VL-data buffer organization within a frame set for a transmission rate approaching 30 Mbps. As previously described, partial buffering is used to maximize the usage of available VL-data space within each buffer, and the unused VL-data space is filled with a post-amble.

FIG. 16 illustrates one embodiment of the shuffling process to ensure a spatially separated and periodic VL-data loss. The first row illustrates the VL-data from the 60 buffers in FIG. 15 rearranged into a concatenated stream of 1,869,120 bits. The second row illustrates the collection of every sixth bit into a new stream of bits. Thus, when the decoder subsequently reverses the process, a burst loss of up to 1/6 of the data transmitted is transformed into a periodic loss where at least 5 undamaged bits separate every set of two damaged bits.

The third row illustrates grouping every 10 bits of Stream 2 into a new stream of bits, Stream 3. The boundary of a grouping is also defined by the number of bits in a segment. Grouping of Stream 2 for every tenth bit ensures that a 1/60 data loss results in fifty-nine undamaged bits between every set of two damaged bits. This provides for a spatially separated and periodic VL-data loss in the event that 88 consecutive packets of data are lost.

The fourth row illustrates grouping every 11 bits of Stream 3 into Stream 4. The boundary of a grouping is also defined by the number of bits in a segment. Grouping of Stream 3 for every eleventh bit ensures that 1/660 data loss results in 659 undamaged bits between to damaged bits, resulting in a spatially separated and periodic VL-data loss during a transmission loss of 8 consecutive packets.

Each group of 31,152 bits within Stream 4 is consecutively re-stored in Buffers 0–59, with the first group of bits stored in Buffer 0 and the last group of bits stored in Buffer 59.

It will be appreciated by one skilled in the art that the grouping requirements of FIG. 16 are variable to ensure a spatially separated and periodic VL-data loss tolerance up to a 1/n transmission loss.

Transmission

The previously described shuffling process creates buffers with intermixed FL-data and VL-data. For one embodiment, packets are generated from each buffer, according to packet structure 200, and transmitted across Transmission media 135.

Data Recovery

As noted earlier, the innovative method for encoding the bitstream of data enables robust recovery of data that typically occurs due to lost packets of data. The general overview of the decoding process has been shown in FIG. 4.

Referring to FIG. 4, the data received in packets is processed through the multiple level deshuffling process, steps 425, 430, 435, and 440 wherein different levels or portions of the bitstream received via packets are deshuffled to retrieve data. ADRC decoding is then applied to the data, step 445, in accordance with the teaching known in the art (e.g., Kondo, Fujimori, Nakaya, "Adaptive Dynamic Coding Scheme for Future HDTV Digital VTR", Fourth International Workshop on HDTV and Beyond, Sep. 4–6, 1991, Turin, Italy).

Intra frame set block deshuffling is then performed and block-to-image mapping is subsequently executed, steps 450, 455. Steps 425, 430, 435, 440, 445, 450, and 455 are inverse processes of the earlier process steps performed to encode the data and will not be discussed in detail herein. However, it should be noted that in one embodiment, deshuffling levels represented by steps 425, 430 and 440 are data independent. For example, the deshuffling process performed is predetermined or specified by an address mapping or table lookup. Since deshuffling steps 425, 430 and 440 are independent of data contents, data loss due to, for example, packet loss, does not prevent the deshuffling steps from being performed. Similarly, steps 450 and 455 are data independent. The intra group VL-data deshuffling process, however, is dependent on the contents of data. More particularly, the intra group VL-data deshuffling process is used to determine the quantization codes for the blocks of the groups. Thus, at step 435, if packets are lost, the affected groups cannot be processed.

After execution of the deshuffling, decoding and mapping (steps 425, 430, 435, 440, 445, 450 and 455), a recovery process is performed to recover the Qbit and Motion Flag values that were located in lost packets. The Qbit value is lost typically due to DR loss (due to lost packets). When the Qbit or Motion Flag value is unknown, the Q code bits of a pixel cannot be determined from the data bitstream. If a Qbit or Motion Flag value is improperly determined then this error will propagate as the starting point of subsequent blocks in that data in the buffer will be incorrectly identified.

Figure 17:
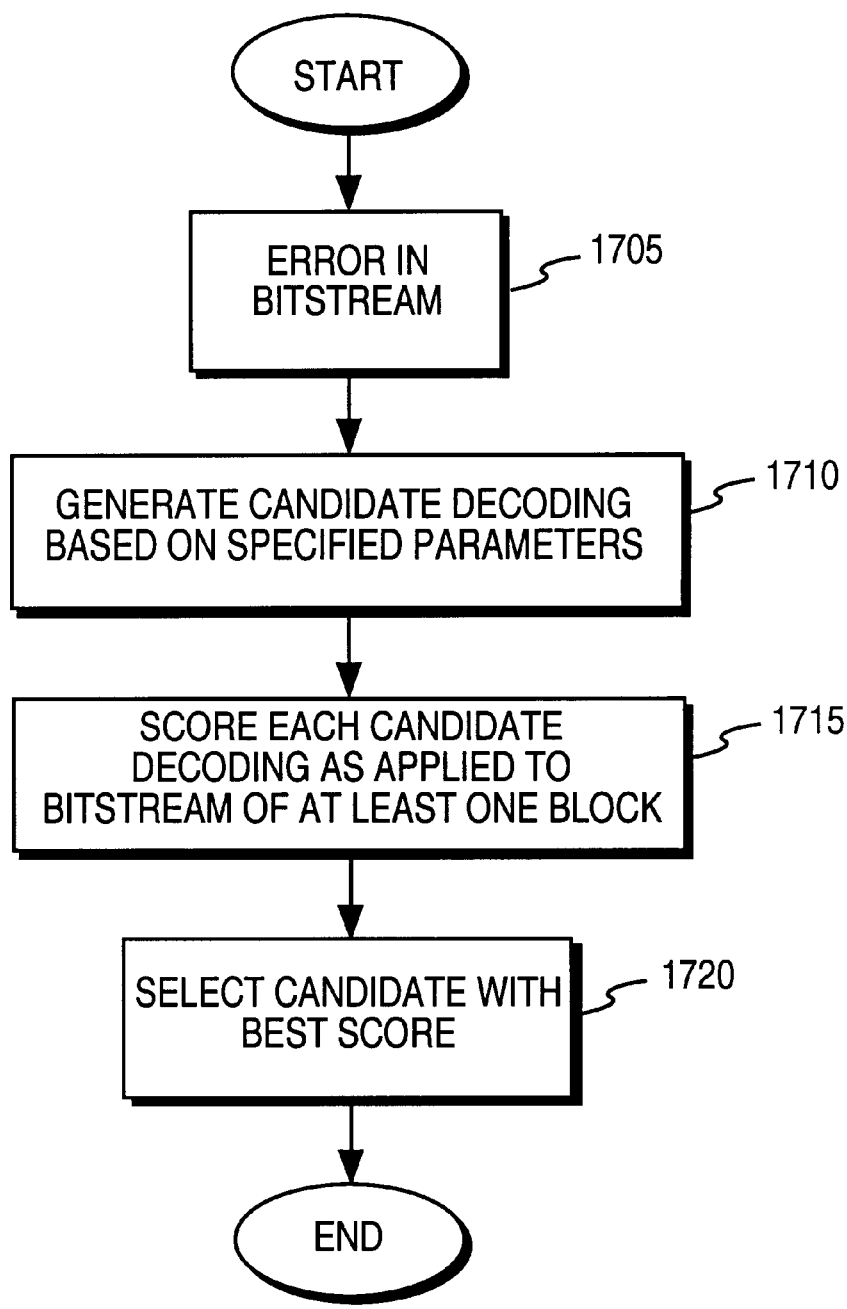
FIG. 17 is a flow diagram generally illustrating one embodiment of the data recovery process of the present invention.

FIG. 17 describes the general process for recovering the Qbit and Motion Flag values. This particular embodiment describes the process using multiple blocks of data to recover the Qbit and Motion Flag values; however, it is contemplated that the particular number of blocks is not limited by the discussion herein and could be one or more blocks. Referring to FIG. 17, based on the detection of an error in the bitstream, step 1705, candidate decodings based on specified parameters are generated for the three blocks examined. At step 1715, each candidate decoding is scored on the likelihood that it is an accurate decoding and at step 1720, the candidate decoding with the best score is used, the decoding identifying the Qbit and Motion Flag values which enable the subsequent decoding of pixels of the affected blocks.

Referring back to the decoding process of FIG. 4, once the best decoding is selected, any DR or MIN values that were lost due to lost packets are recovered, step 465. A variety of recovery processes known to one skilled in the art can be applied to recover DR and MIN, including least squares or the averaging of values of adjacent blocks. For one example, see, Kondo, Fujimori, Nakaya, "Adaptive Dynamic Coding Scheme for Future HDTV Digital VTR", Fourth International Workshop on HDTV and Beyond, Sep. 4–6, 1991 Turin, Italy. In the present embodiment, the innovative image-to-block mapping processes and data structures created therefrom increase the number of neighboring blocks, thus providing additional data and facilitating more accurate DR or MIN recovery. In particular, in one embodiment, DR and MIN are recovered as follows:

$$DR' = \frac{m \cdot \sum_i (y_i - \text{MIN}) \cdot q_i}{\sum_i q_i^2}$$

where DR' corresponds to the recovered DR, $q_i$ is the i-th value in an ADRC block and $q_i \in \{0, 1, \ldots 2^Q - 1\}$; $m = 2^Q - 1$ for Edge-matching ADRC and $m = 2^Q$ for Non-edge-matching ADRC; $y_i$ is a decoded value of an adjacent block pixel; and Q is the Qbit value; and $$\text{MIN}' = \frac{\sum_i \left(y_i - \frac{DR}{m} \cdot q_i\right)}{N}$$

where MIN' corresponds to the recovered MIN and N is the number of terms used in the summation (e.g., N=32 when i=0–31). In another embodiment, if DR and MIN of the same block are damaged at the same time, DR and MIN are recovered according to the following equations:

$$DR' = \frac{m \cdot \left[N \cdot \sum_i q_i \cdot y_i - \sum_i q_i \cdot \sum_i y_i\right]}{N \cdot \sum_i q_i^2 - \left[\sum_i q_i\right]^2}$$

$$\text{MIN}' = \frac{\sum_i \left(y_i - \frac{DR'}{m} \cdot q_i\right)}{N}$$

At step 470, ADRC decoding is applied to those blocks not previously decoded prior to Qbit and Motion Flag recovery and a pixel recovery process is executed, step 475, to recover any erroneous pixel data that may have occurred due to lost packets or random errors. In addition a 3:1:0→4:2:2 back conversion is performed, step 480, to place the image in the desired format for display.

Figure 18:
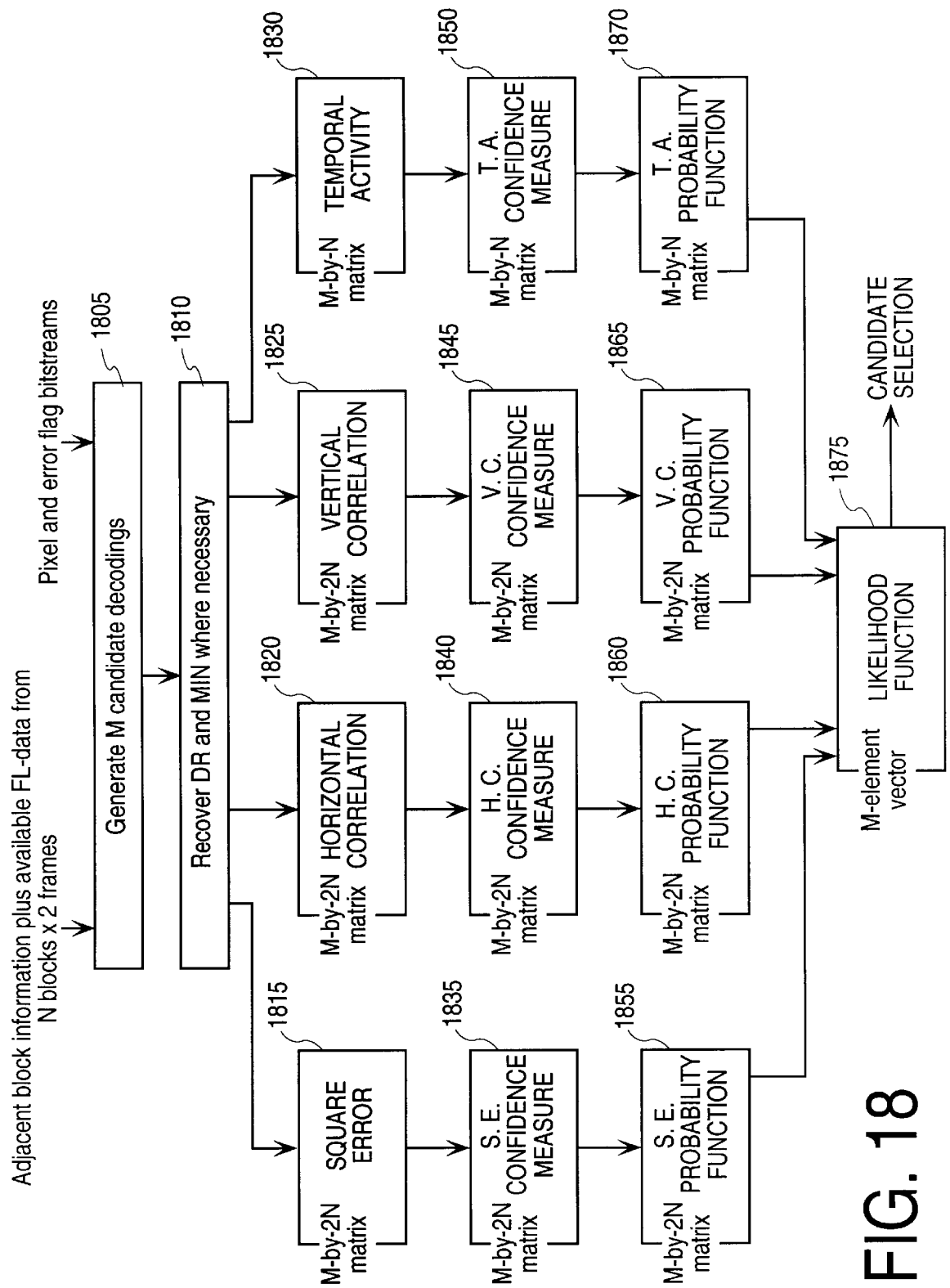
FIG. 18 is a flow diagram of one embodiment of the Qbit and Motion Flag recovery process of the present invention.

FIG. 18 illustrates one particular embodiment of the Qbit and Motion Flag recovery process of the decoding process of the present invention. In this particular embodiment, the inputs to the process are adjacent block information, and the block attributes and pixel data for the three blocks to be processed. Error flags indicating the location of the lost data are also input. The error flags can be generated in a variety of ways known to one skilled in the art and will not be discussed further herein except to say that the flags indicate which bits were transmitted by damaged or lost packets.

At step 1805, the candidate decodings are generated. The candidate decodings can be generated a variety of ways. For example, although the processing burden would be quite significant, the candidate decodings can include all possible decodings. Alternately, the candidate decodings can be generated based on pre-specified parameters to narrow the number of candidate decodings to be evaluated.

In the present embodiment, the candidate decodings are determined based on the possible key values used to randomize a bitstream of the intra group VL-data shuffling process earlier described. In addition, it should be noted that candidate decodings are further limited by the length of the bits remaining to be decoded and knowledge of how many blocks remain. For example, as will be discussed, if processing the last block typically the decoding length of that block is known.

Continuing with the present example, FIG. 19 illustrates possible cases for the present embodiment where the value x indicates an unknown value (which may be due to packet loss). This is further explained by example. $m_i$ is defined as the Motion Flag of the i-th block, $q_i$ is the number of the quantization bits of the i-th block, $n_i$ is the number of possible candidates of the i-th block and $d_i$ is the value of a key element of the i-th block described previously in intra group VL-data shuffling. The i-th block is defined within each group. In this example, the number of blocks within each group is three. A key for the three block group is generated as, $d_0+10\cdot d_1+100\cdot d_2$. Assuming that in the first block the Motion Flag is unknown and the number of quantization bits is 2, $m_0$ equals x and $q_0$ equals 2. Following the equation described above to generate the key element, $d_i=5\cdot m_i+q_i$, the set of possible digits for $d_0$ consists of {2 and 7}. Thus, the number of possible values ($n_0$) is 2. Assuming the second block to have a Motion Flag value of 1 and one quantization bit, and the value for $d_1$ is $5\cdot 1+1=6$ and $n_1=1$. The third block has a Motion Flag value of 1 and an unknown number of quantization bits. Thus, the digit $d_2$ includes a set consisting of {6, 7, 8, 9} and $n_2=4$. Thus, the number of possible candidates of this group, M, is $2\cdot 1\cdot 4=8$, and the keys used to generate the candidate decodings are the variations of 662, 667, 762, 767, 862, 867, 962, 967. This process is preferably used for each group which was affected by data loss.

Referring back to FIG. 17, at step 1715, once the data has been decoded in accordance with the key data, the candidate decodings generated are evaluated or scored on the likelihood that it is a correct decoding of the data. At step 1720, the candidate decoding with the best score is selected to be used.

A variety of techniques can be used to score the candidate decodings. For example, the score may be derived from an analysis of how pixels of blocks of a particular candidate decoding fit in with other pixels of the image. Preferably the score is derived based upon a criteria indicative of error, such as a square error and correlation. For example, with respect to correlation, it is a fairly safe assumption that the adjacent pixels will be somewhat closely correlated. Thus, a significant or a lack of correlation is indicative that the candidate decoding is or is not the correct decoding.

As is shown in FIG. 18, four different criteria are analyzed to select the best candidate decoding. However, it is contemplated that one, two, three or more different criteria can be analyzed to select the best candidate decoding.

Referring to FIG. 18, the present embodiment utilizes four subscoring criteria which are subsequently combined into a final score. In particular, in step 1815, the square error measure is generated, step 1820, horizontal correlation is determined, step 1825, vertical correlation is determined, and at step 1830 temporal activity is measured (each an M-by-2·N matrix in accordance with M candidates, N blocks and 2 frames/block of data). Although horizontal and vertical correlation is used, it should be recognized that a variety of correlation measurements, including diagonal correlation, can be examined. At steps 1835, 1840, 1845, 1850, a confidence measure is generated for each criterion to normalize the measurements generated, and at steps 1855, 1860, 1865 and 1870, a probability function for each of the different criteria is generated. These probability functions are then combined, for example, by multiplying the probability values to generate a score, for example, the likelihood function shown in FIG. 18, step 1875. The score for the candidate decoding is subsequently compared against all candidate decoding scores to determine the likely candidate.

It should be recognized that a variety of techniques can be used to evaluate the candidate decodings and generate the "scorings" for each candidate. For example, confidence measures are one way of normalizing the criteria. Furthermore, a variety of confidence measures, besides the ones described below, can be used. Similarly, multiplying the probability values based on each criterion to generate a total likelihood function is just one way of combining the variety of criteria examined.

The encoding processes facilitate the determination of the best candidate decoding because typically the candidate decodings which are not the likely candidate, will have a relatively poor score, while decodings that are quite likely candidates will have a significantly better score. In particular, the Q code randomization process described previously in the intra group VL-data shuffling process assists in this regard.

Figure 20C:
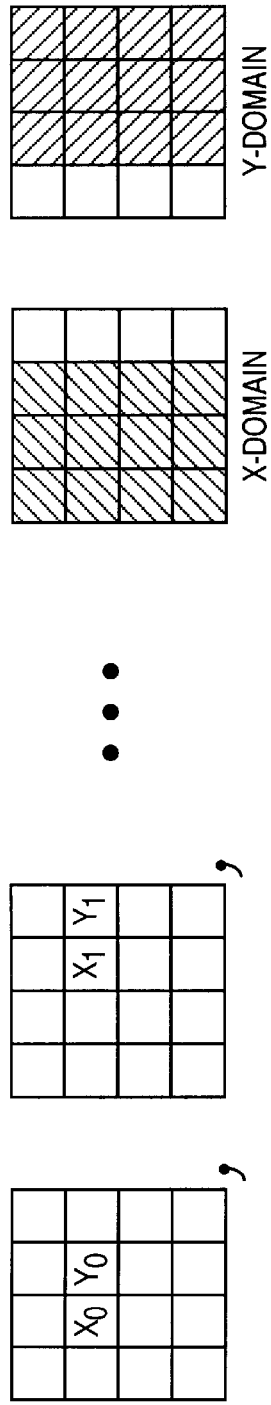
Figure 20D:
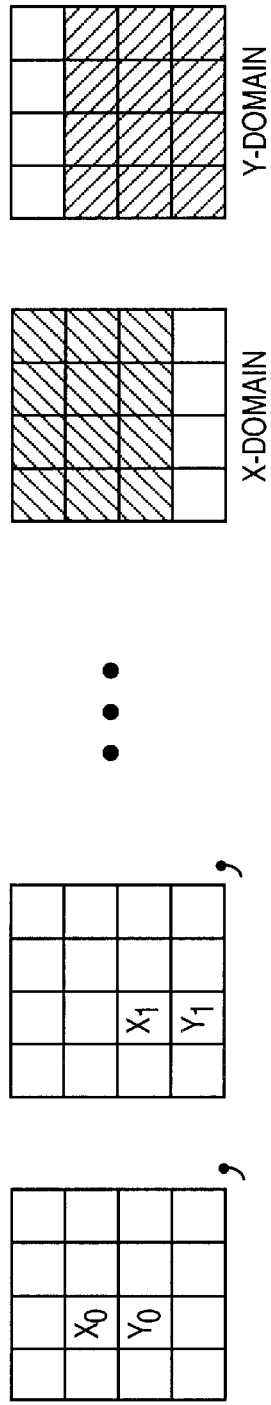

FIGS. 20a 20b, 20c and 20d provide illustrations of the different measurements performed at steps 1815, 1820, 1825 and 1830 of FIG. 18 to generate the scoring and total score for a particular candidate decoding. FIG. 20a illustrates the square error to evaluate a candidate decoded pixel $x_i$ as compared to its decoded neighbors $y_{i,j}$, wherein the suffix "i,j" is corresponding to the neighboring address of "i". It is preferred that some of the largest terms are removed to remove any influences due to spikes, that is the terms that arise due to legitimate edges in the image. Preferably, the three largest terms of $(x_i-y_{i,j})^2$ are discarded to remove spikes that may occurred. FIG. 20b illustrates the temporal activity criteria. This is applicable only when it is or is assumed to be a motion block. The temporal activity criteria assumes that the better the candidate decoding, the smaller the differences between blocks. Thus the worse the candidate decoding, the larger the differences between blocks. Spatial correlation assumes that the more likely candidate decodings will result in heavy correlations as real images tend to change in a slow consistent way. The horizontal correlation process illustrated in FIG. 20c and vertical correlation process illustrated by FIG. 20d utilize that assumption.

The confidence measures, steps 1835, 1840, 1845, and 1850 of FIG. 18, provide a process for normalizing the criteria determined in the previous steps (steps 1815, 1820, 1825 and 1830). In one embodiment, for example, the confidence measure for the square error takes values from the interval [0,1], and confidence is equal to 0 if the errors are equal and equal to 1 if one error is 0. Other measures or methods to normalize are also contemplated.

Similarly, the confidence measure for the spatial correlation is:

$$\text{maximum}(Y,0)-\text{maximum}(X,0)$$

where Y is the best correlation value and X is the correlation for the current candidate decoding. The temporal activity confidence measure is determined according to the following equation:

$$\text{conf}=(a-b)/(a+b)$$

where $a=\max(X, M\_TH)$ and $b=\max(Y,M\_TH)$ where M_TH is the motion threshold for the candidate block and Y is the best measurement, that is the smallest temporal activity, and X equals the current candidate measurement of temporal activity.

At steps 1855, 1860, 1865 and 1870, FIG. 18, the probability function is generated for each of the different criteria. A variety of methods can be used to generate the probability measure. For example, a score can be prescribed to a confidence measure. If the confidence measure is greater than a predetermined value, e.g., 0.8, the base score is decreased by 10; if between 0.5 and 0.8, the base score decreased by 5. FIG. 21 illustrates one embodiment in which a table used to generate the probability function for the square error measurement criteria. The table includes empirically determined based data arbitrarily binned containing confidence and square error measures and known candidate decodings. More particularly, the table can be generated by using undamaged data and assuming that the DR was corrupted or lost. Keys and confidence measures for correct and incorrect decodings are then generated. The table reflects the probability ratio of correct to incorrect decodings. Using this table, for a particular squared error value (row) and confidence value (column), the probability can be determined. For example, it can therefore be seen that for a variety of square error measures at a confidence measure of zero, there is approximately a 40% to 50% probability that the candidate is correct. If the confidence is not 0, but small, the probability drops significantly. Similar probability tables are generated for the correlation and temporal measurements based on corresponding empirically determined criteria measurements and confidence measurements.

The probabilities generated are considered data to generate "scores" in the present embodiment and as noted earlier, other techniques to score candidate decodings may be used. At step 1875, the different probabilities are combined into a likelihood function $L_i = j \cdot P_{i,j}$, where j is a multiplication function of probability functions $P_{i,j}$, and $P_{i,j}$ is the probability function for candidate i, block j. The candidate is therefore selected as the one that maximizes the function $L_i$.

Referring back to FIG. 18, it may be necessary to recover certain block attributes that were transmitted in lost packets. Therefore, at step 1810, DR and MIN values are recovered where necessary. A variety of techniques, from default values, averaging, squared error functions to more sophisticated techniques, including those discussed in Kondo, Fujimori and Nakaya, "Adaptive Dynamic Range Coding Scheme for Future HDTV Digital VTR", and Kondo, Fujimori, Nakaya and Uchida, "A New Concealment Method for Digital VCRs", IEEE Visual Signal Processing and Communications, Sep. 20–22, 1993, Melbourne Australia, may be used. The recovered values are utilized to generate the candidate decodings as discussed above.

Figure 22:
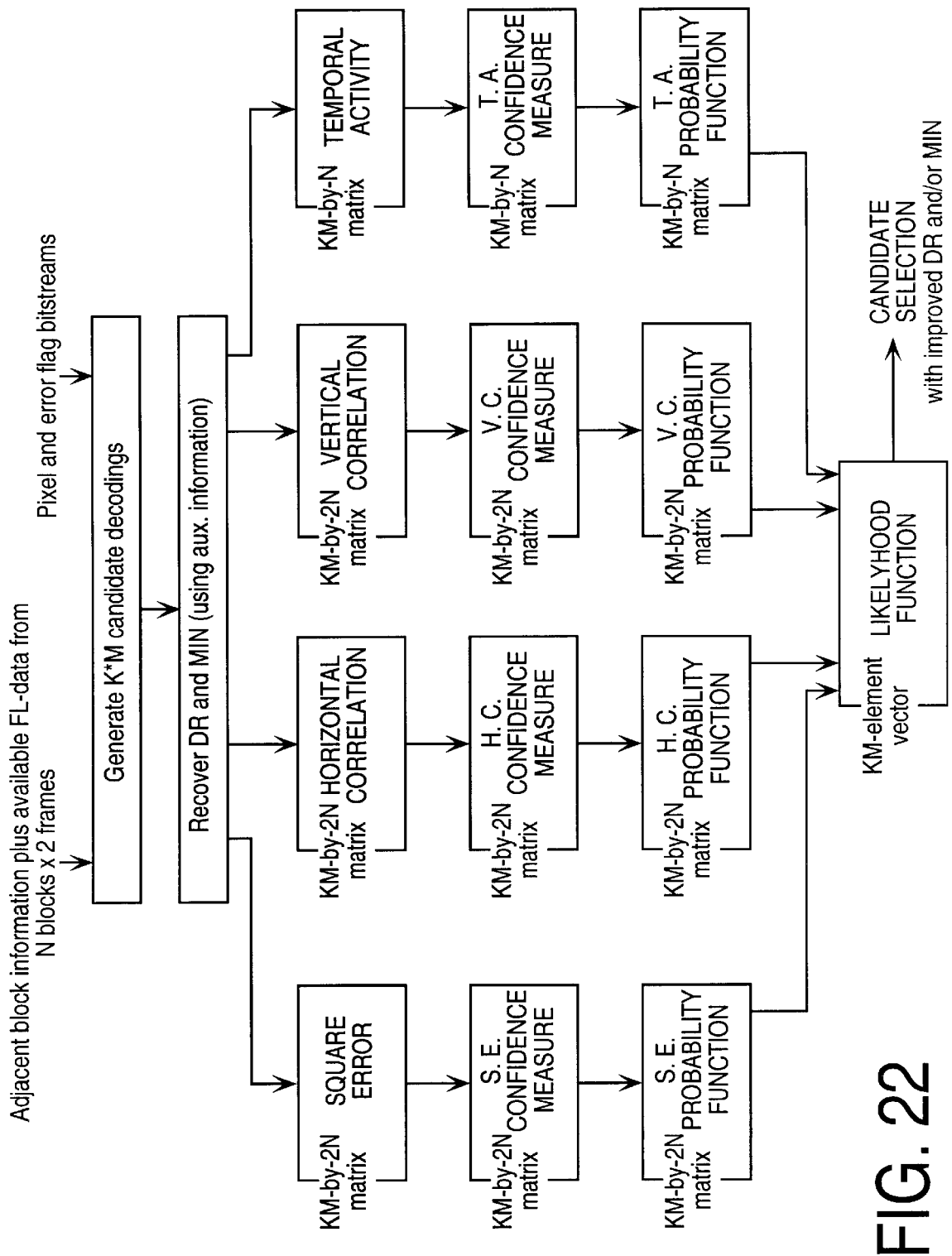
FIG. 22 illustrates one embodiment of a Qbit, Motion Flag and auxiliary information recovery process in accordance with the teachings of the present invention.

Alternately, the DR and MIN values are determined during the Qbit determination process. This is illustrated in FIG. 22. In particular, as noted above, in the present embodiment, the Motion Flag and number of quantization bits are used in the encoding process and later used during the recovery process to narrow the number of possible candidate decodings. As noted earlier, other information can also be used. Thus the value of DR and/or value of MIN may also be used to encode the data. Alternately, a portion of bits of DR are used for encoding (e.g., the two least significant bits of DR). Although the DR data is encoded, the number of possible candidate decodings is increased significantly as variables are added. Referring to FIG. 22, K·M candidate decodings are therefore generated, where K is the number of candidate values for the unknown data, e.g. K=4 if two bits of the sum of $DR_1$, $DR_2$ and $DR_3$ is encoded ($DR_1$, $DR_2$ and $DR_3$ represent the DR values of the blocks of the group). The DR and MIN are therefore recovered using the auxiliary information provided, e.g., the encoded two bits of the sum of $DR_1$, $DR_2$ and $DR_3$. This improves the process of candidate selection at the cost of additional overhead to examine the larger number of candidate decodings.

It should be noted that generally, the more neighboring blocks that are decoded, the better the Qbit and Motion Flag recovery process. Furthermore, in some embodiments the process is applied to each subsequent block of a buffer; if all or some of the FL-data is available, the number of candidate decodings can be reduced, possibly to one candidate decoding given all the FL-data for a block is available. However, it is desirable that the Qbit and Motion Flag recovery process be avoided altogether as the process is a relatively time consuming one. Furthermore, it is desirable to use as much information as possible to perform Qbit and Motion Flag recovery. In one embodiment, blocks are processed from the beginning of a buffer until a block with lost Qbit/Motion Flag information is reached. This is defined as forward Qbit and Motion Flag recovery. In another embodiment, the end of the buffer is referenced to determine the location of the end of the last block of the buffer and the data is recovered from the end of the buffer until a block with lost Qbit/Motion Flag data is reached. This is defined as backward Qbit and Motion Flag recovery.

As noted earlier, the blocks are variable in length, due the length of the VL-data; therefore there is a need to determine the number of bits forming the VL-data of a block so that the position of subsequent blocks in the buffer can be accurately located. During the encoding process, a post-amble of a predetermined and preferably easily recognizable pattern is placed in the buffer to fill the unused bit locations. During the decoding process, the post-amble will be located between the block and the end of the buffer. As the pattern is one that is easily recognizable, review of patterns of bits enables the system to locate the beginning of the post-amble and therefore the end of the last block in the buffer. This information can be used in two ways. If the last block contains damaged Qbit/Motion Flag data and the beginning of the last block is known (e.g., the preceding blocks have been successfully decoded), the difference between the end of the immediate preceding block and the beginning of the post-amble corresponds to the length of the block. This information can be used to calculate the Qbit and/or Motion Flag of the block. The starting location of the post-amble can also be used to perform Qbit and Motion Flag recovery starting at the last block and proceeding towards the beginning of the buffer. Thus, the Qbit and Motion Flag recovery process can be implemented bidirectionally.

Figure 23:
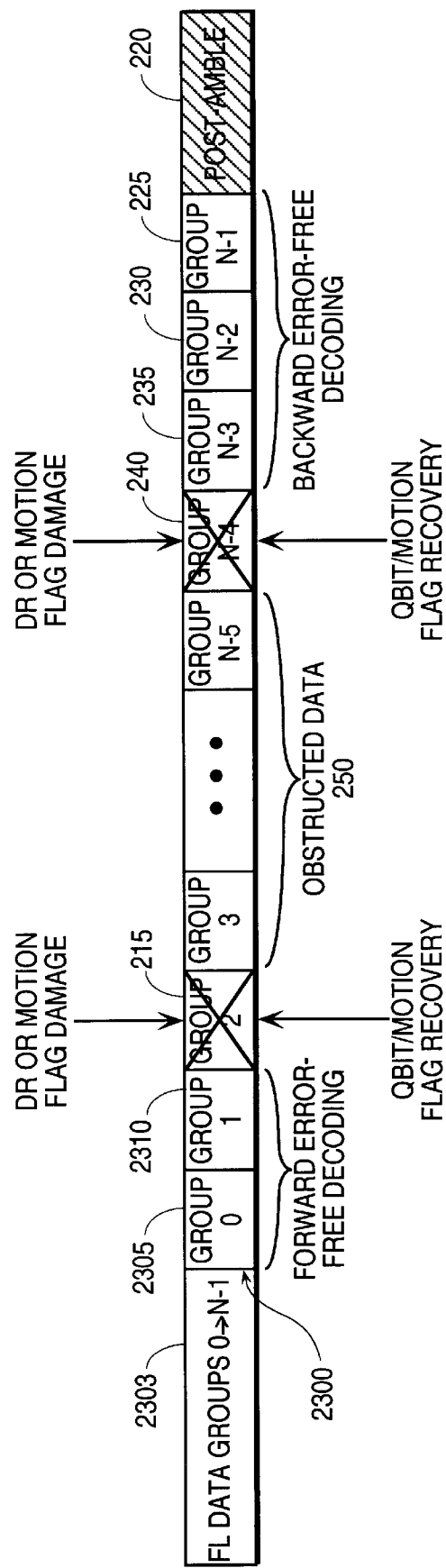
FIG. 23 illustrates the use of a post-amble in one embodiment of a bidirectional Qbit and Motion Flag recovery process.

FIG. 23 illustrates the use of a post-amble in the bidirectional Qbit and Motion Flag recovery process. Referring to FIG. 23, the buffer 2300 includes FL-data 2303 for the N groups of blocks of VL-data. Each group consists of a plurality of blocks (e.g., 3 blocks). In the present example, the first two groups 2305, 2310 are decoded and the third group 215 cannot immediately be decoded due to damaged DR/Motion Flag data. At this point, the Qbit/Motion Flag recovery process is required in order to recover the damaged data. Rather than continue processing groups in the forward direction, the process refers to the end of the buffer, determined by looking for the post-amble pattern 220. The beginning of the post-amble and therefore the end of the last group of blocks are determined. As the DR/Motion Flag data is indicative of the length of the VL-data, the beginning of the VL data of the last block, and therefore the end of the immediate preceding block, is determined. Therefore, the blocks can be decoded, e.g., blocks 225, 230, 235 until a block 240 with damaged data is reached. The damaged 215, 240 and obstructed blocks 250 are then recovered, preferably using the Qbit/Motion Flag recovery process described above.

It should be noted that the bidirectional process is not limited to a sequence of forward and reverse processing; processing can occur in either or both directions. Furthermore, in some embodiments, it may be desirable to perform such processing in parallel to improve efficiency. Finally, it is contemplated that undamaged obstructed blocks may be recovered by directly accessing the Qbit/Motion Flag information without executing the Qbit/Motion Flag recovery process described above.

As noted earlier, a variety of scoring techniques may be used to determine the best candidate decoding to select as the decoding. In an alternate embodiment, the smoothness of the image using each candidate decoding is evaluated. In one embodiment, the Laplacian measurement is performed. The Laplacian measurement measures a second-order image surface property, e.g., surface curvature. For a linear image surface, i.e., smooth surface, the Laplacian measurement will result in a value that is approximately zero.

Figures 24A, 24B:
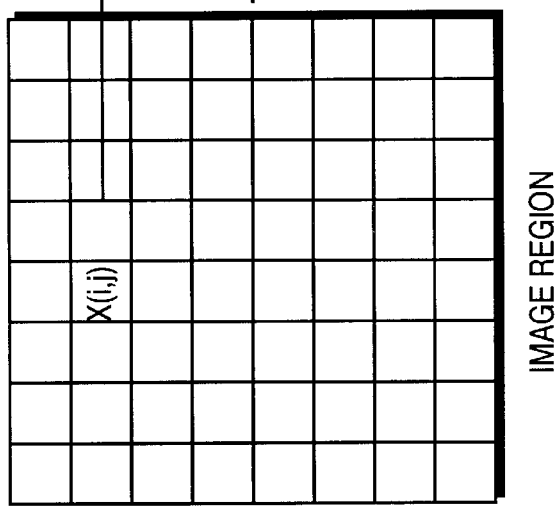
FIGS. 24a, 24b and 24c illustrate an alternate embodiment for evaluating candidate decodings.
Figure 24C:
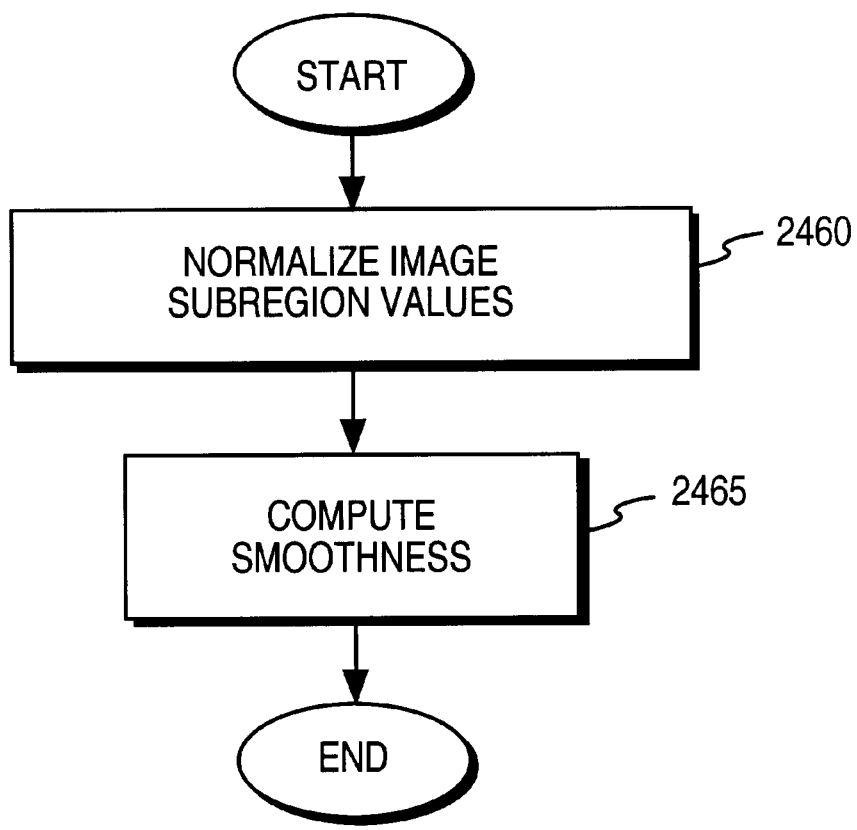

The process will be explained with reference to FIGS. 24a, 24b, and 24c. FIG. 24a illustrates one embodiment of the Laplacian kernel. It is contemplated that other embodiments may also be used. The kernel "L" represents a 3×3 region. To measure smoothness of the image region, 3×3 subregions of the image (FIG. 24b) are convolved with the kernel and the convolved values are averaged. The size of the region and subregion (and therefore kernel size) can be varied according to application.

One embodiment of the process is described with reference to FIG. 24c. This embodiment utilizes a kernel and subregion size of 3×3 and a region size of 8×8, the individual elements identified by indices i,j. At step 2460, the candidate decoded values x[i][j] are normalized. For example, the values can be normalized according to the following equation:

$$\tilde{x}[i][j] = \frac{x[i][j]}{\sqrt{\sum_{i,j}(x[i][j]-X_{mean})^2}}, \quad 0 \le i, j < 8$$

where, $$X_{mean} = \frac{\sum_{i,j} x[i][j]}{64}, \quad 0 \le i, j < 8$$

At step 2465, the normalized values are used to compute a block Laplacian value $L_X$ indicative of smoothness according to the following:

$$l[i][j] = \sum_{m=-1}^{1}\sum_{n=-1}^{1} L[m][n] \cdot \tilde{x}[i+m][j+n], \quad 0 \le i, j < 8$$

$$L_X = \frac{\sum_{i,j} |l[i][j]|}{64}$$

The closer the block Laplacian value is to zero, the smoother the image portion. Thus a score can be measured based upon the block Laplacian value, and the decoding with the least Laplacian value is the correct one.

The Laplacian evaluation can also be achieved using candidate encoded values q[i][j]. The basic process is the same as the candidate decoded value case of FIG. 24c. This embodiment utilizes a kernel and subregion size of 3×3 and a region size 8×8, the individual elements identifies by the indices i,j. At step 2460, the candidate encoded values q[i][j] are normalized. For example, the values can be normalized according to the following equation:

$$q'[i][j] = \frac{q[i][j]}{\sqrt{\sum_{i,j}(q[i][j]-Q_{mean})^2}}, \quad 0 \le i, j < 8$$

where, $$Q_{mean} = \frac{\sum_{i,j} q[i][j]}{64}$$

At step 2465, the normalized values are used to compute the block Laplacian value $L_q$ indicative of smoothness according to the following equation:

$$l[i][j] = \sum_{m=-1}^{1}\sum_{n=-1}^{1} L[m][n] \cdot q'[i+m][j+n], \quad 1 \le i, j < 7$$

$$L_q = \frac{\sum_{i,j} |l[i][j]|}{36}$$

The closer the block Laplacian value is to zero, the smoother the image portion. Thus a score can be measured based upon the block Laplacian value and the candidate with the smallest Laplacian value is the correct one.

Other variations are also contemplated. In alternative embodiments, higher order image surface properties can be used as a smoothness measure. In those cases, higher order kernels would be used. For example, a fourth order block Laplacian measurement may be performed using a fourth order kernel. Such a fourth order kernel can be realized using two second order Laplacian computations in cascade.

Figure 25:
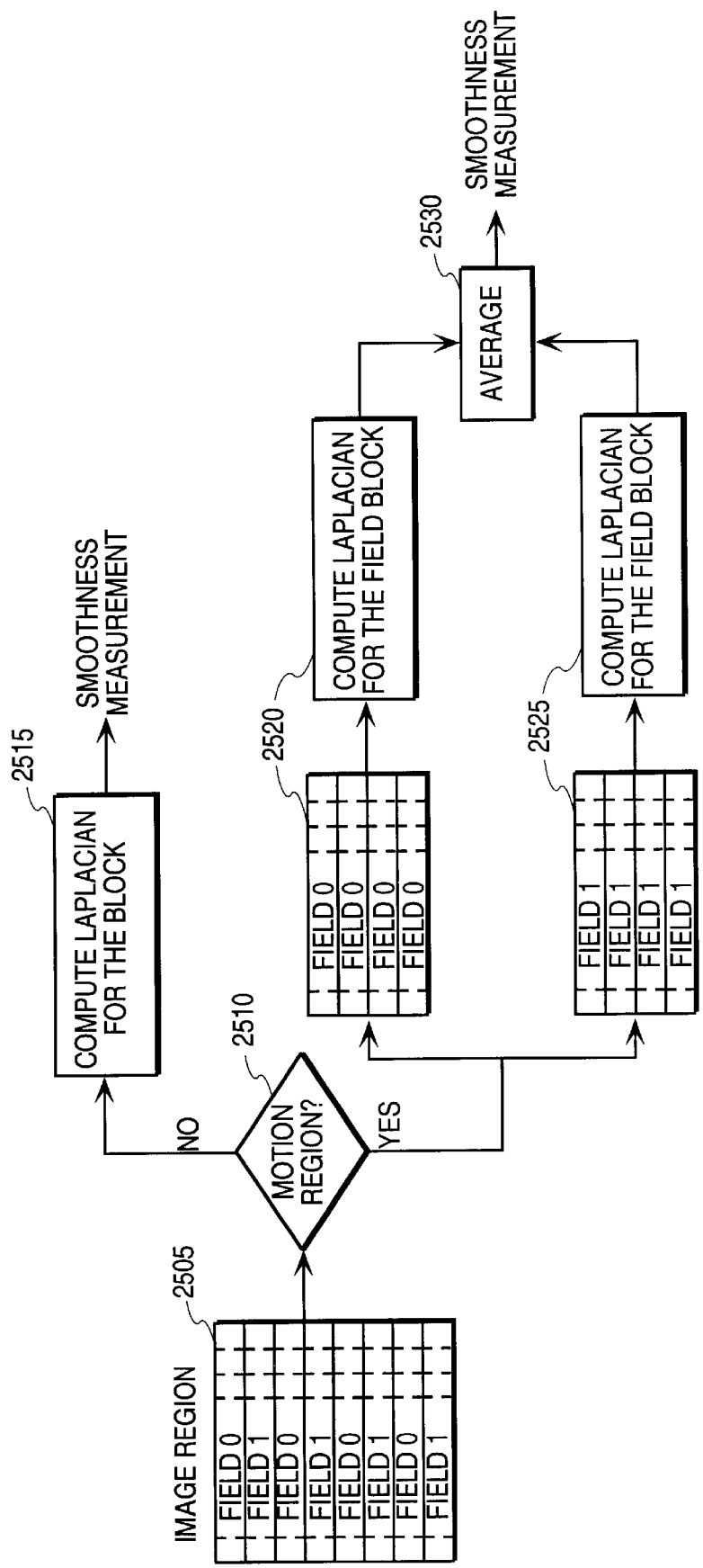
FIG. 25 illustrates the use of smoothness measures in accordance with the teachings of one embodiment of the present invention.

It is further contemplated that the evaluation process is dependent upon whether the image has an activity or motion larger than a predetermined level. If the image portion is evaluated to have larger motion than a predetermined level, then it is preferable to perform the measurements on a field basis as opposed to on a frame basis. This is explained with reference to FIG. 25. FIG. 25 explains the process using smoothness measures; however, it is contemplated that this process can be implemented using a variety of types of measures.

Frame 2505 of an image region is composed of field 0 and field 1. If motion is not detected, step 2510, the smoothness measurement is computed by computing the block Laplacian value for the block within each frame, step 2515. If larger motion than a predetermined level is detected, block Laplacian measurements are performed on each field, steps 2520, 2525 and the two measurements are combined, step 2530, , e.g., averaged to generate the smoothness measurement.

Motion can be detected/measured a variety of ways. In one embodiment, the extent of change between fields is evaluated and motion is detected if it exceeds a predetermined threshold.

Motion detection and the use of frame information and field information to generate recovered values (typically to replace lost or damaged values) can be applied to any portion of the process that requires a recovered value to be generated. For example, motion detection and the selective use of frame information and field information to generate recovered values can be applied to DR/MIN recovery, pixel recovery as well as Qbit and Motion Flag recovery processes. Thus, based on the level of motion detected, the recovery process will utilize existing information on a field basis or frame basis. Furthermore, this process can be combined with the application of weighting values that are selected based upon levels of correlation in particular directions (e.g., horizontal or vertical).

Figure 26B:
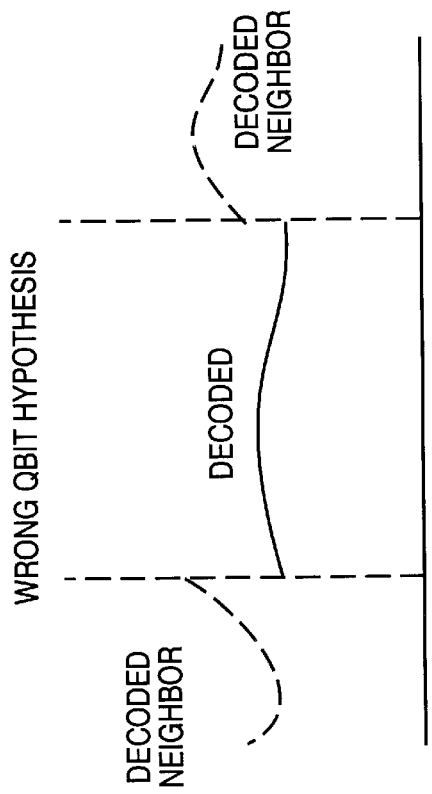
FIGS. 26a, 26b, 26c, 26d and 26e illustrate an alternate embodiment of a process for evaluating candidate decodings.
Figure 26A:
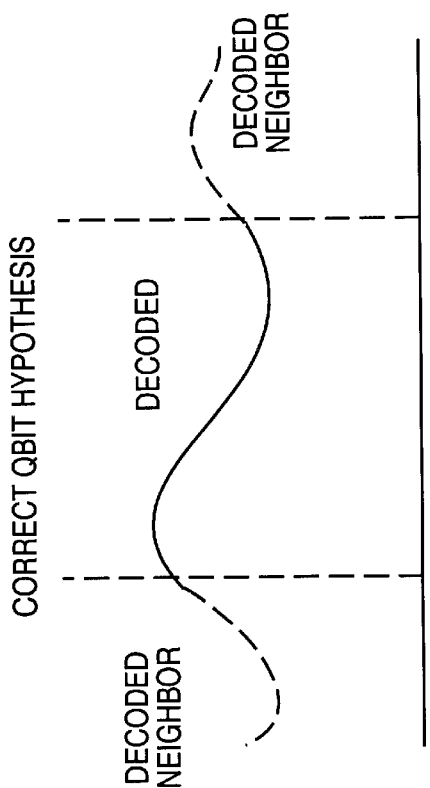

In another embodiment of the Qbit and Motion Flag recovery process, candidate decodings are evaluated based upon intra block and inter block measurements. In the following discussion, the term "block" refers to a portion of a frame or field. The intra block measurement evaluates the candidate decoded image portion, e.g., the smoothness of the image portion. The inter block measurement measures how well the candidate decoding fits with the neighboring image portions. FIGS. 26a and 26b illustrate the combined inter block and intra block evaluation. In particular, FIG. 26a shows an acceptable candidate decoding as both the inter block and intra block measurements are good, whereas in FIG. 26b the inter block measurement is poor, even though the intra block measurement is quite good.

Examples of intra block measurements include the smoothness measurement described above. Examples of inter block measurements include the square error measurements described earlier. An alternative inter block measurement is the ratio of compatible boundary pixels and the total number of boundary pixels at the candidate ADRC block.

Figure 26C:
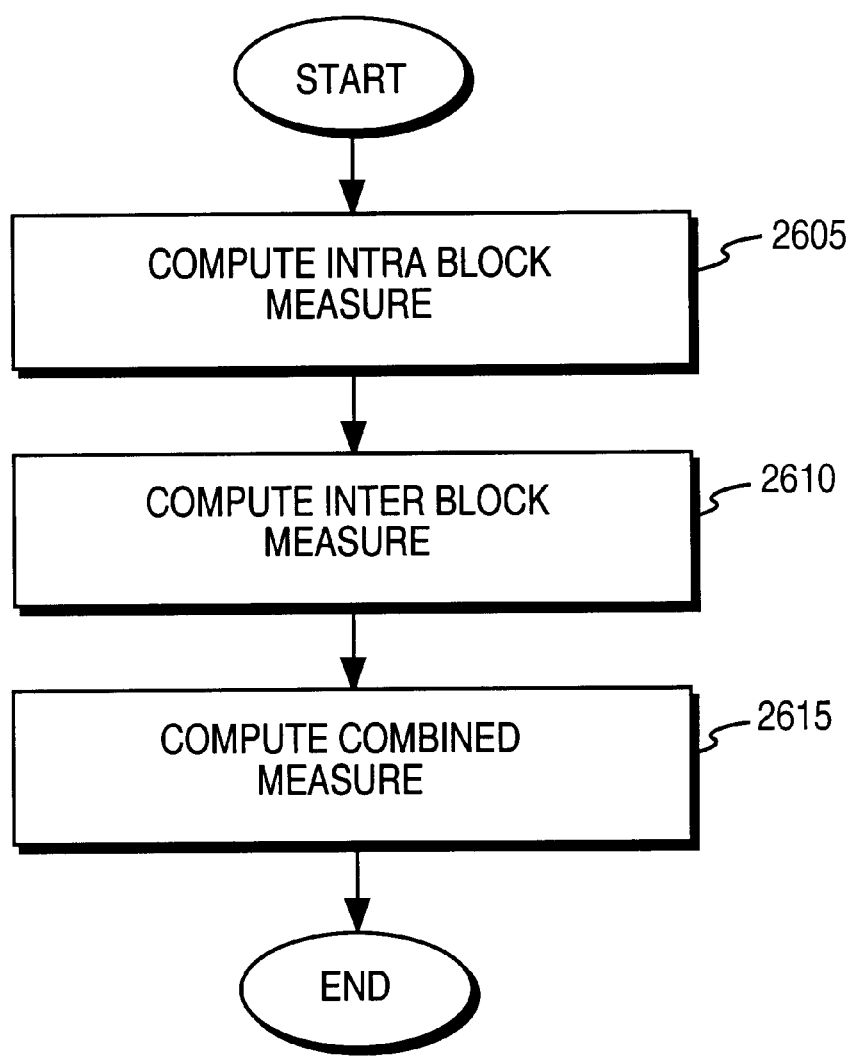
Figures 26D, 26E:
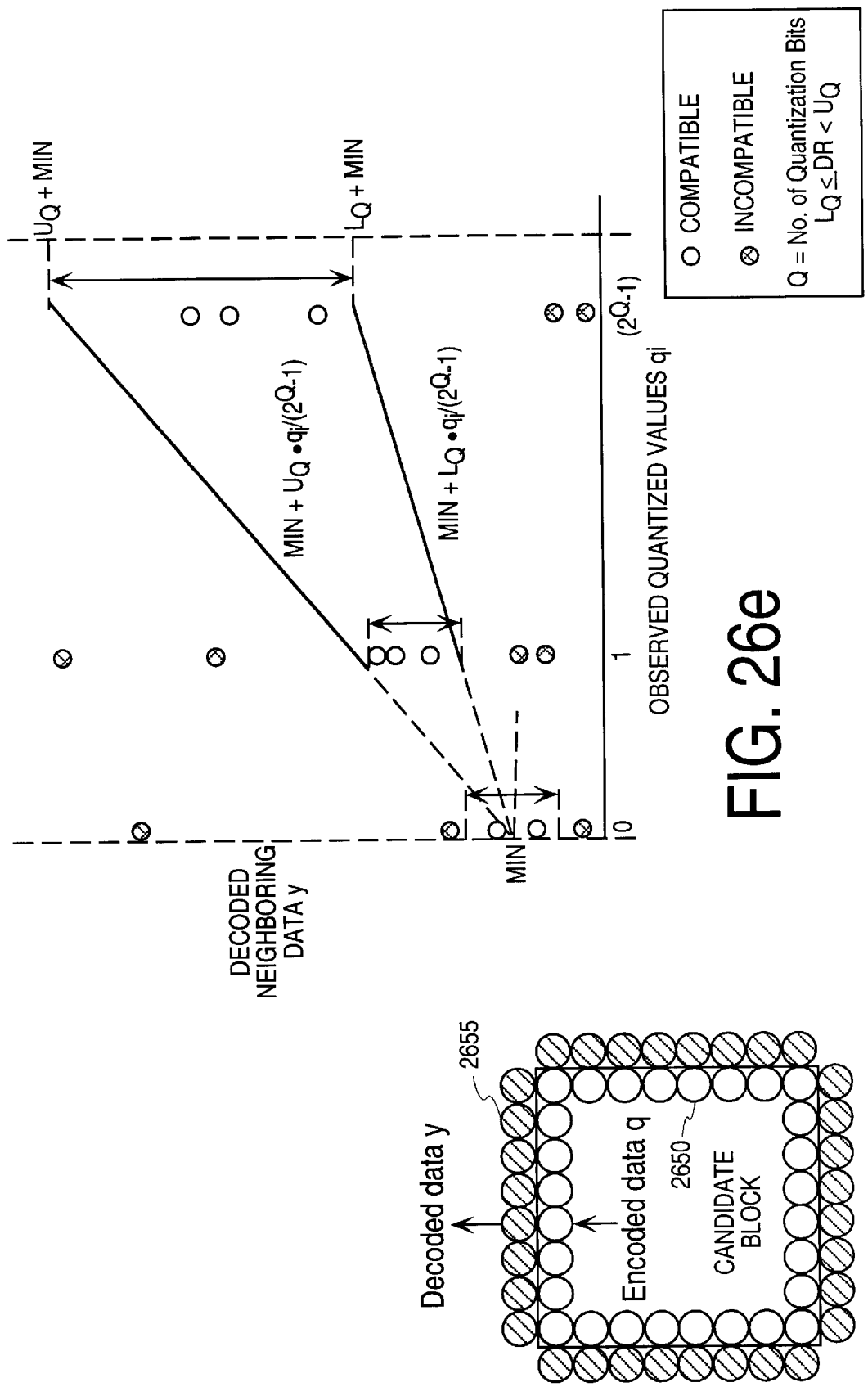

An example of an inter block and intra block evaluation of an 8×8 block that is ADRC encoded will be explained with respect to FIGS. 26c, 26d and 26e. FIG. 26d illustrates an image portion (block) of data of a encoded values 2650 consisting of q values from which candidate decoded values x are generated and neighboring decoded data 2655 consisting of y values. As set forth in the flow chart of FIG. 26c, at step 2605, the intra block measure is computed to generate a measure, e.g., block Laplacian $L_x$. At step 2610, the inter block measure $S_x$ is computed to generate a measure of compatibility between adjacent blocks. At step 2615, the combined measure $M_x$ is generated. The combined measure provides the information used to select a candidate decoding.

In the present embodiment, $S_x$ is computed as the number of neighboring data that lies in a valid range for each boundary pixel of candidate decoding (see FIG. 26e). FIG. 26e is a chart illustrating a valid range for one embodiment which shows a valid range of each observed quantized value $q_i$. Thus $L_Q$ DR<$U_Q$, where $L_Q$, $U_Q$ respectively represent the lower and upper bounds of DR corresponding to the number of quantization bits=Q. Preferably $S_x$ is normalized according to the following: $S_x$=$S_x$/number of boundary pixels.

In the present embodiment the combined measure $M_x$ is computed according to the following equation: $M_x$=$S_x$+(1-$L_x$). Alternatively, the combined measure may be weighted such that the following equation would be used: $M_x$=w·$S_x$+(1-w)·(1-$L_x$), where w is the weighting value, typically an empirically determined weighting value.

Other embodiments for determining DR and MIN values that have been lost/damaged are also contemplated. For example, the earlier described equations can be modified to recover DR and MIN values with higher accuracy. In an alternate embodiment, a median technique is applied. In one embodiment of the median technique, the value of MIN is recovered as the median of all $MIN_i$ values computed as:

$$MIN_i = y_i - q_i \cdot s$$

where $q_i$ represents the encoded pixel value and $y_i$ represents the decoded pixel neighboring $q_i$. For edge-matching ADRC, s=DR/($2^Q$-1). For non-edge-matching ADRC, s=DR/$2^Q$, where Q represents the number of quantization bits per pixel (Qbit value).

The values used may be temporally proximate or spatially proximate. The values of $y_i$ may be the decoded value of the neighboring pixel in an adjacent frame/field or the same field. The values of $y_i$ may be the decoded value of the pixel from the same location as $q_i$ in an adjacent frame/field or the same field.

In addition, any DR and/or MIN recovery technique may be combined with a clipping process to improve recovery accuracy and prevent data overflow during the recovery process. The clipping process restricts the recovered data to a predetermined range of values; thus those values outside the range are clipped to the closest range bound. In one embodiment, the clipping process restricts values in the range [$L_Q$, $U_Q$], where $L_Q$, $U_Q$ respectively represent the lower and upper bounds of the range of pixel values represented by the number of quantization bits=Q. quantization bits, and further restricts values to: MIN+DR Num, where Num represents the maximum pixel value; in the present embodiment, Num is 255. In the present embodiment, where applicable, $U_Q$+1=$L_{Q+1}$ Combining the criteria into a single equation results for an unbounded recovered value (val') for the DR, the final clipped recovered value (val) is obtained from the following equation:

$$val=max(min(val, min(U_Q, 255-MIN)), L_Q)$$

where min and max respectively represent minimum and maximum functions.

In an alternate embodiment, the boundary pixels $y_i$ used to generate an recovered DR and/or MIN can be filtered to only use those that appear to correlate best, thereby better recovering DR and MIN. Those boundary pixels not meeting the criteria are not used. In one embodiment, a boundary pixel $y_i$ is considered valid for DR calculations if there exists a value of DR such that $L_Q$ DR<$U_Q$ and an original pixel $y_i$ would have been encoded as $q_i$. Thus, a pixel is valid if the following equations are satisfied:

$$\frac{(y_i - MIN)m}{\max(q_i - 0.5, 0)} \geq L_Q$$

$$\frac{(y_i - MIN)m}{\min(q_i - 0.5, m)} < U_Q$$

where m represents the maximum quantization level =$2^Q$-1. A DR recovered value (val') can then be computed according to the following equation:

$$val' = \frac{m \cdot \sum_i (y_i - MIN)q_i}{\sum_i q_i^2}$$

The value can then be clipped into the valid range. Thus this process forces the DR recovered value into the interior of the valid region as defined by the threshold table, reducing the accuracy for points whose true DR lies near the threshold table boundary.

It has been noted that due to quantization noise, the DR of stationary ADRC blocks varies slightly from frame to frame. If this variance crosses an ADRC encoding boundary, and if the DR is recovered on several consecutive frames, then the DR recovered value with valid pixel selection tends to overshoot at each crossing, resulting in a noticeable blinking effect in the display. In an attempt to reduce the occurrence of this effect, in one embodiment, the valid pixel selection process is modified to relax the upper and lower bounds, allowing border pixels that encroach into the neighboring valid region. By including points just outside the boundary, it is more likely that the recovered value will take on a value near that of the upper or lower bound. The relaxed bounds $L'_Q$ and $U'_Q$ are computed by means of a relaxation constant r. In one embodiment, r is set to a value of 0.5. Other values can be used:

$$L'_Q = rL_{Q-1} + (1-r) L_Q$$

$$U'_Q = (1-r)U_Q + rU_{Q+1}$$

The discussion above sets forth a number of ways to recover DR and MIN when the values have been damaged or lost. Further enhancements can be realized by examining the correlation between data temporally and/or spatially, and weighting corresponding calculated recovered values accordingly. More particularly, if there is a large correlation in a particular direction or across time, e.g., horizontal correlation, there is a strong likelihood that the image features continue smoothly in that direction that has a large correlation and therefore an recovered value using highly correlated data typically generates a better estimate. To take advantage of this, boundary data is broken down into corresponding directions (e.g., vertical, horizontal, field-to-field) and weighted according to the correlation measurement to generate a final recovered value.

Figure 27A:
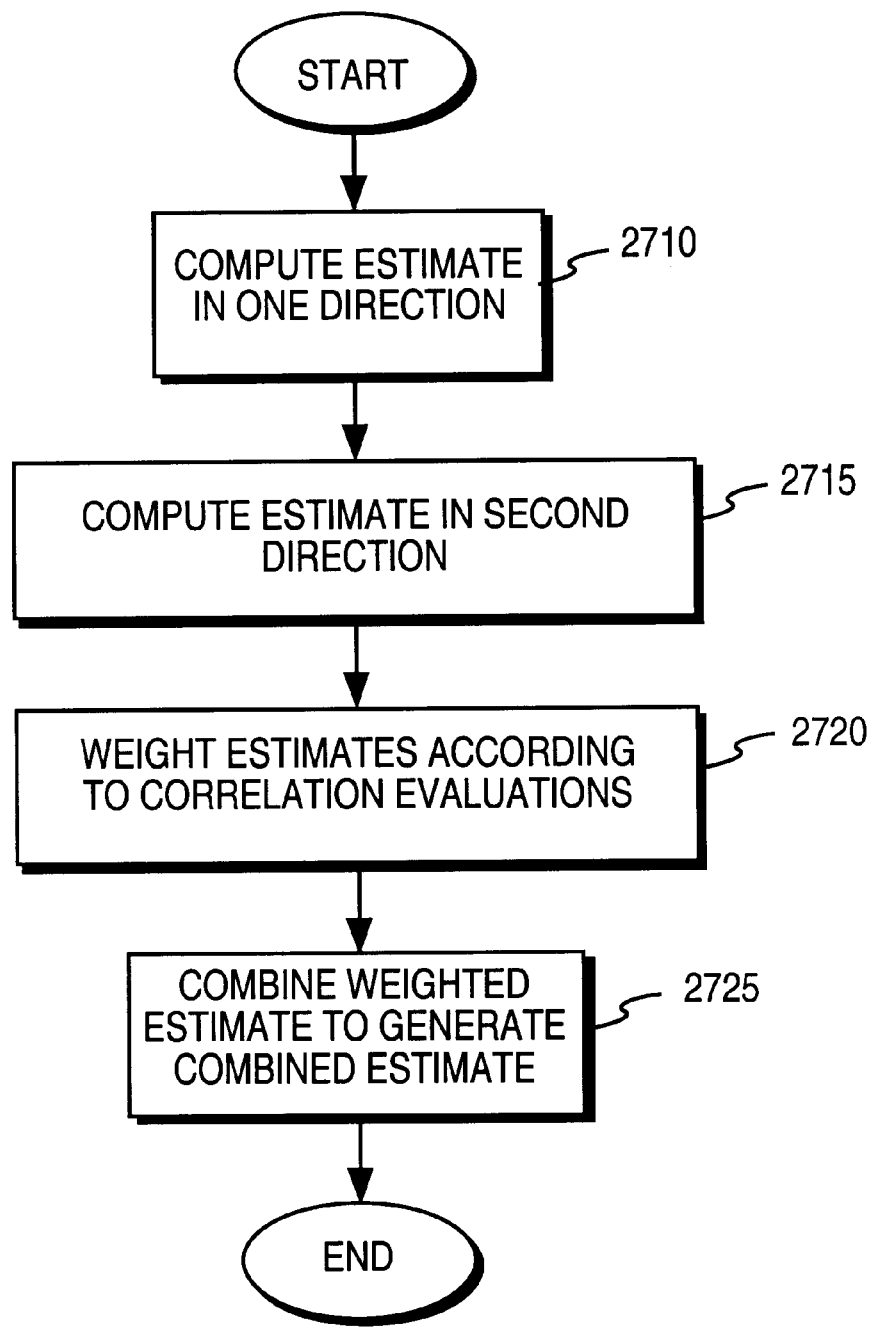
FIG. 27a illustrates an alternate process for evaluating candidate decodings and FIG. 27b illustrates one embodiment for determining weighting values.

One embodiment of the process is described with reference to FIG. 27a. At step 2710, a recovered value of the DR or MIN value to be recovered is generated in one direction and at step 2715, a recovered value is generated in another direction. For example, if the process is spatially adaptive, then boundary pixels along horizontal borders are used to generate a first recovered value, "hest", and boundary pixels along vertical borders are used to generated a second recovered value, "vest". Alternately, if the process is temporally adaptive, then boundary pixels between adjacent fields are used to generate a first recovered value and boundary pixels between adjacent frames are used to generate a second recovered value.

Figure 27B:
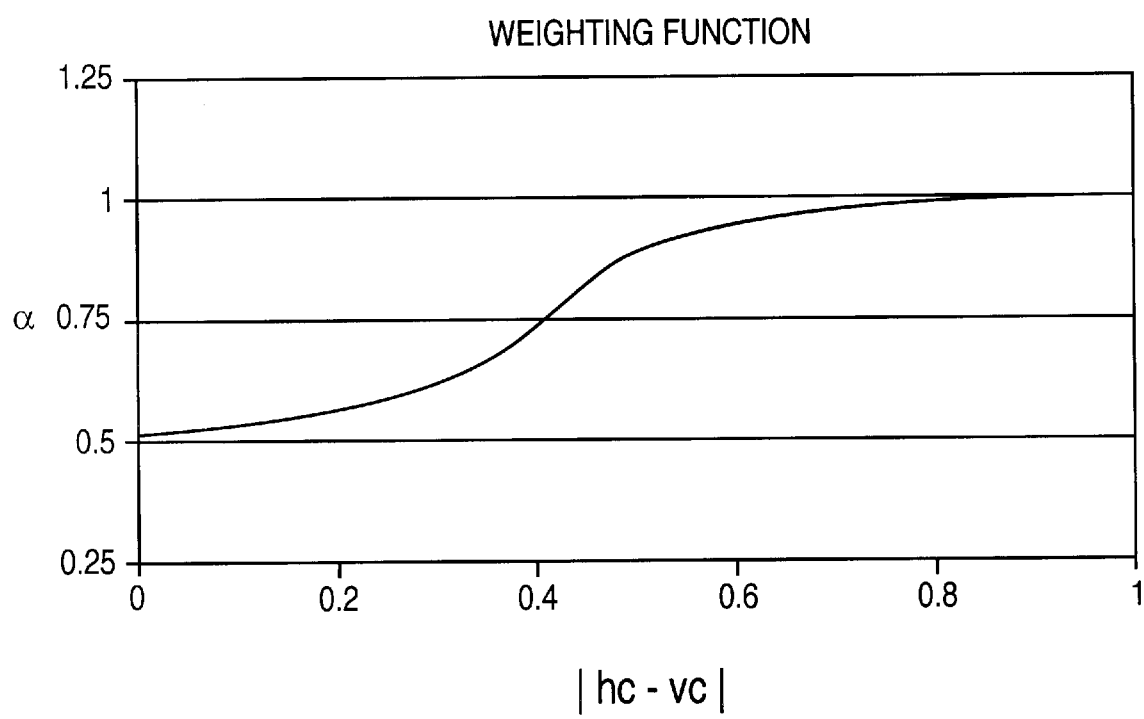

At step 2720, the recovered values are weighted according to correlation calculations indicative of the level of correlation in each direction. The weighted first and second recovered values are combined to generate a combined recovered value, step 2725. It should be noted that the process is not limited to generated weighted recovered values in only two directions; it is readily apparent that the number of recovered values that are weighted and combined can be varied according to application. A variety of known techniques can be used to generate a correlation value indicative of the level of correlation in a particular direction. Furthermore, a variety of criteria can be used to select the weighting factor in view of the levels of correlation. Typically, if one correlation is much larger than the other, the combined recovered value should be based primarily on the corresponding recovered value. In one embodiment, the combined recovered value is computed as follows:

$$val' = \begin{cases} \alpha hest + (1-\alpha)vest & : hc \geq vc \\ (1-\alpha)hest + \alpha vest & : hc < vc \end{cases}$$

where hc represents the horizontal correlation, vc represents the vertical correlation, hest represents a DR recovered value based only on left and right boundary information, and vest represents a DR recovered value based only on top and bottom boundary information, and a represents the weighting value. The weighting value can be determined a variety of ways. FIG. 27b illustrates one embodiment for determining weighting values as a function of the difference between the horizontal correlation and vertical correlation. More particularly, a was chosen to be:

$$\alpha(|hc - vc|) = \begin{cases} 0.5 + 0.25 \cdot e^{-8(0.35 - |hc - vc|)} & : |hc - vc| < 0.35 \\ 1 - 0.25 \cdot e^{-8(|hc - vc| - 0.35)} & : |hc - vc| \geq 0.35 \end{cases}$$

As noted above, the adaptive correlation process is applicable to both DR and MIN recovery. It is preferred, however, that the MIN recovery is clipped to insure that MIN+DR 255, therefore the function val=max(min(val', 255−MIN), 0) can be used. Furthermore, as noted above, the temporal correlation can be evaluated and used to weight recovered values. In addition, a combination of temporal and spatial correlation can be performed. For example, one recovered value is generated between fields as a temporal recovered value. Another recovered value is generated within one field as a spatial recovered value. The final recovered value is computed as the combination value with a combination of temporal and spatial correlation. The correlation combination can be replaced with a motion quantity. Other variations are also contemplated. The method can also be applied to audio data.

In an alternate embodiment, a low complexity modification to the least squares technique is used. Using this embodiment, the blinking experienced due to recovered DR values is reduced. For purposes of the following discussion, QV represents a list of encoded values from the image section or ADRC block whose DR is being recovered having a set of points $q_i$ and Y is a list of decoded values taken from the vertical or horizontal neighbors of the points in QV, where $y_i$ represents a vertical or horizontal neighbor of $q_i$. As each point $q_i$ may have up to four decoded neighbors, one pixel or point may give rise to as many as four $(q_i, y_i)$ pairings. The unconstrained least squares estimate of DR $(DR_{uls})$ is thus:

$$(DR)_{uls} = \frac{2^Q \cdot \sum_i (y_i - MIN) \cdot (0.5 + q_i)}{\sum_i (0.5 + q_i)^2}$$

where Q is the number of quantization bits, MIN is the minimum value transmitted as a block attribute. The above equation assumes non-edge-matching ADRC; for edge-matching ADRC, $2^Q$ is replaced with $2^Q - 1$ and $(0.5 + q_i)$ is replaced with $q_i$.

The unconstrained least squares estimate is preferably clipped to assure consistency with the threshold table and the equation MIN+DR 255 which is enforced during encoding (Typically, for non-edge-matching ADRC, permissible DR values are in the range of 1–256). Thus, the least squares estimate is clipped $(DR_{lsc})$ by:

$$(DR)_{lsc} = \max(\min(UB, DR_{uls}), LB)$$

where UB represents the upper bound and LB represents the lower bound and min and max respectively represent minimum and maximum functions.

In an alternate embodiment, the estimation can be enhanced by selecting the pixels that are more suitable for DR estimation to calculate the estimate of DR. For example, flat regions in an image provide pixels which are more suitable for DR estimation than those regions in which high activity occurs. In particular, a sharp edge in the edge may decrease the accuracy of the estimate. The following embodiment provides a computationally light method for selecting the pixels to use to calculate an estimate of DR. In one embodiment, the least squares estimate ($DR_{lse}$), e.g., $DR_{uls}$ or $DR_{lsc}$, is computed. Using this estimate, the list of encoded values QV is transformed into candidate decoded values X, where $x_i$ are members of X derived from $q_i$. The $x_i$ value is a recovered decoded value formed using the first estimate of DR. The $x_i$ value is defined according to the following equation:

$$x_i = MIN + \left(0.5 + \frac{q_i \cdot DR_{lse}}{2^Q - 1}\right)$$

Non-edge-matching ADRC:

$$x_i = MIN + \left(\frac{(q_i + 0.5) \cdot DR_{lse}}{2^Q}\right)$$

Non-edge-matching ARDC:
Assuming $DR_{lse}$ is a reasonable estimate of the true DR, then anywhere that $x_i$ is relatively close to $y_i$, may be judged to be a low activity area and thus a desirable matching. New X and Y lists may then be formed by considering only the matches where $x_i$ and $y_i$ are close and the least squares estimate recomputed to generate an updated estimate.

The criteria for determining what is considered "close" can be determined a number of ways. In one embodiment, an ADRC encoding of the error function is used. This approach is desirable as it is computationally inexpensive. For the process, a list E, consisting of the points $e_i = |y_i - x_i|$ is defined. Defining emin and emax as respectively the smallest and largest values from the list, then eDR=emax—emin. An encoded error value can then defined as:

$$g_i = (e_i - emin) n1/eDR$$

where n1 represents the number of quantization levels for requantizing $e_i$ in a similar manner to the ADRC process described above.

Thus, new lists X and Y are generated by selecting only those matches where $g_i$ is less than some threshold. If the new lists are sufficiently long, these lists may be used to generate a refined least squares estimate $DR_{rls}$. The threshold for $g_i$ and the number of matches needed before refining the least squares estimation is preferably empirically determined. For example, in one embodiment for an process involving 8×8×2 horizontally subsampled blocks and n1 is 10, only matches corresponding to $g_i = 0$ are used, and the estimate is refined only when the new lists contain at least 30 matches.

In an alternate embodiment, DR estimation can be improved by clipping potential DR values and recomputing a DR estimate. In particular, in one embodiment, a list D is composed of member $d_i$ which contains the DR value that would cause $x_i$ to equal $y_i$. More precisely:

$$d_i = 2^Q(y_i - MIN)/(0.5 + q_i)$$

Improvement is seen by clipping each $d_i$. That is, $$d_i' = max(min(UB, d_i), LB)$$

where $DR_{cls}$ is then computed to be the average of $d_i'$. The clipped method ($DR_{cls}$) may be combined with other DR estimates, e.g., $DR_{lse}$ in a weighted average to produce a final DR value. For example, the weighted average $DR_{est}$ is determined according to the following:

$$DR_{est} = w_1(DR_{cls}) + w_2(DR_{lse}).$$

The weights $w_1$ and $w_2$ are preferably empirically determined by examining resultant estimations and images generated therefrom from particular weightings. In one embodiment $w_1 = 0.22513$ and $w_2 = 0.80739$.

The invention has been described in conjunction with the preferred embodiment. It is evident that numerous alternatives, modifications, variations and uses will be apparent to those skilled in the art in light of the foregoing description.

What is claimed is:

1. A method for receiving lost/damaged data in a bitstream of encoded data comprising the steps of:

generating a plurality of candidate decodings for a group of related blocks within the bit stream;

generating at least one internal correlation measure for each block based upon at least an image portion of the candidate decodings to determine the intra-block correlation of adjacent pixels within the block;

determining an external measure compatibility between adjacent blocks of each block from the group of blocks to determine the inter-block compatibility;

combining the internal correlation measure of the block and the external compatibility measure of related blocks to generate a combined measure of the intra-block correlation and the inter-block compatibility; and selecting a candidate decoding from the plurality of candidate decodings based upon the combined measure.

2. The method as set forth in claim 1, wherein the measure is a probability measure.

3. The method as set forth in claim 1, wherein the measure is a square error measure.

4. The method as set forth in claim 1, wherein the measure is a spatial correlation measure.

5. The method as set forth in claim 1, wherein the measure is a horizontal correlation measure.

6. The method as set forth in claim 1, wherein the measure is a vertical correlation measure.

7. The method as set forth in claim 1, wherein the measure is a diagonal correlation measure.

8. The method as set forth in claim 1, wherein the measure is a temporal activity measure.

9. A method for receiving lost/damaged data in a bitstream of encoded data comprising the steps of:

generating a plurality of candidate decodings for a plurality of blocks;

measuring for each block an internal smoothness measure of at least an image portion of the candidate decodings;

determining an external compatibility between adjacent blocks of the plurality of blocks;

combining the internal smoothness measure and the external compatibility measure of adjacent blocks to generate a combined measure; and selecting a candidate decoding from the plurality of candidate decodings based upon the combined measure.

10. The method as set forth in claim 9, wherein measuring the smoothness comprises a Laplacian measurement.

11. The method as set forth in claim 9, wherein measuring smoothness further comprises:

normalizing x[i][j] that is defined as x̃[i][b] where x[j][j] is the decoded value at location [i,j]; and computing smoothness using the x[i][j], Laplacian kernel L[m][n], and a block Laplacian value $L_x$, where $L_x$ is determined according to the following:

$$l[i][j] = \sum_{m=-1}^{l} \sum_{n=-1}^{l} L[m][n]\tilde{x}[i+m][j+n], \quad 0 \le i, j < K$$

$$L_X = \frac{\sum_{ij} |l[i][j]|}{K \cdot K}, \quad 0 \le i, j < K.$$

12. The method as set forth in claim 11 where the $\tilde{x}[i][j]$ is computed according to the following equation:

$$\tilde{x}[i][j] = \frac{x[i][j]}{\sqrt{\sum_{i,j}(x[i][j]-X_{mean})^2}}, \quad 0 \le i, j < K$$

where, $$X_{mean} = \frac{\sum_{i,j} x[i][j]}{K \cdot K}, \quad 0 \le i, j < K.$$

13. The method as set forth in claim 11, wherein K is 8.

14. The method as set forth in claim 9, wherein measuring smoothness further comprises:
   normalizing q[i][j], wherein q[i][j] is the Q code value at location [i,j] in an encoded image and q'[i][j] is the normalized value of q[i][j];
   computing smoothness using q'[i][j], Laplacian kernel L[m][n], and a block Laplacian value $L_q$, where $L_q$ equals $$l[i][j] = \sum_{m=-1}^{l} \sum_{n=-1}^{l} L[m][n]q'[i+m][j+n], \quad 1 \le i, j < (K-1)$$

$$L_q = \frac{\sum_{ij} |l[i][j]|}{(K-2) \cdot (K-2)}, \quad 1 \le i, j < (K-1).$$

15. The method as set forth in claim 14, wherein q'[i][j] is computed according to the following equation:

$$q'[i][j] = \frac{q[i][j]}{\sqrt{\sum_{i,j}(q[i][j]-Q_{mean})^2}}, \quad 1 \le i, j < (K-1)$$

where, $$Q_{mean} = \frac{\sum_{ij} q[i][j]}{(K-2) \cdot (K-2)}, \quad 1 \le i, j < (K-1).$$

16. The method as set forth in claim 14, wherein K is 8.

17. The method as set forth in claim 9, wherein the smoothness measure comprises a second order image surface property.

18. The method as set forth in claim 9, wherein the smoothness measure comprises an N order image surface property, where N>1.

19. The method as set forth in claim 9, wherein measuring the smoothness further comprises:
   determining if the image portion includes motion;
   if the image portion includes motion,
      computing a smoothness measurement for a first field of the image portion and a second field of the image portion, and
      averaging the smoothness measurements together to generate the smoothness measure; and
   if the image portion does not include motion, generating the smoothness measure for the image portion.

20. The method as set forth in claim 9, wherein determining further comprises evaluating spatial correlation to determine motion.

21. The method as set forth in claim 9, wherein determining a measure of compatibility between adjacent blocks further comprises determining the ratio between adjacent blocks and the total number of boundary pixels at the candidate block.

22. The method as set forth in claim 21, wherein a boundary pixel identified as compatible if it lies within a determined valid range of compatible boundary pixels.

23. The method as set forth in claim 9, further comprising generating a combined measure used to select a candidate decoding.

24. The method as set forth in claim 23, wherein the combined measure is determined according the following equation:

$$M_X = S_X + (1 - L_X)$$

where $M_X$ represents the combined measure, $S_X$ represents the compatibility measure, and $L_X$ represents the smoothness measure.

25. The method as set forth in claim 23, wherein the combined measure is determined according the following equation:

$$M_x = w \cdot S_x + (1-w) \cdot (1-L_x), 0 < w < 1$$

where $M_X$ represents the combined measure, $S_x$ represents the compatibility measure, w represents an empirically determined weight, and $L_x$ represents the smoothness measure.

26. A processing system configured to receive lost/damaged data in a bitstream of encoded data comprising:
   circuitry configured to generate a plurality of candidate decodings for a plurality of blocks;
   circuitry configured to generate an internal correlation measure for each block based upon at least an image portion of the candidate decodings;
   circuitry configured to determine an external compatibility measure between adjacent blocks of the plurality of blocks;
   circuitry configured to combine the internal correlation measure and the external compatibility measure of adjacent blocks to generate a combined measure; and
   circuitry configured to select a candidate decoding from the plurality of candidate decodings based upon the combined measure.

27. The processing system as set forth in claim 26, wherein the measure is a probability measure.

28. The processing system as set forth in claim 26, wherein the measure is a square error measure.

29. The processing system as set forth in claim 26, wherein the measure is a spatial correlation measure.

30. The processing system as set forth in claim 26, wherein the measure is a horizontal correlation measure.

31. The processing system as set forth in claim 26, wherein the measure is a vertical correlation measure.

32. The processing system as set forth in claim 26, wherein the measure is a diagonal correlation measure.

33. The processing system as set forth in claim 26, wherein the measure is a temporal activity measure.

34. A processing system for receiving lost/damaged data in a bitstream of encoded data comprising:

circuitry configured to generate a plurality of candidate decodings for a plurality of blocks;

circuitry configured to measure for each block the internal smoothness of at least an image portion of the candidate decodings;

circuitry configured to determine external compatibility measure between adjacent blocks of the plurality of blocks;

circuitry configured to combine the internal smoothness measure and the external compatibility measure of adjacent blocks to generate a combined measure; and circuitry configured to select a candidate decoding from the plurality of candidate decodings based upon the combined measure.

35. The processing system as set forth in claim 34, wherein measuring the smoothness comprises a Laplacian measurement.

36. The processing system as set forth in claim 34, wherein measuring smoothness further comprises:

normalizing x[i][j] that is defined as $\tilde{x}[i][j]$ where x[i][j] is the decoded value at location [i,j]; and computing smoothness using the x[i][j], Laplacian kernel L[m][n], and a block Laplacian value $L_x$, where $L_x$ is determined according to the following:

$$l[i][j] = \sum_{m=-1}^{l} \sum_{n=-1}^{l} L[m][n]\tilde{x}[i+m][j+n], \quad 0 \le i, j < K$$

$$L_X = \frac{\sum_{ij} |l[i][j]|}{K \cdot K}, \quad 0 \le i, j < K.$$

37. The processing system as set forth in claim 36, where the $\tilde{x}[i][j]$ is computed according to the following equation:

$$\tilde{x}[i][j] = \frac{x[i][j]}{\sqrt{\sum_{i,j}(x[i][j] - X_{mean})^2}}, \quad 0 \le i, j < K$$

where, $$X_{mean} = \frac{\sum_{i,j} x[i][j]}{K \cdot K}, \quad 0 \le i, j < K.$$

38. The processing system as set forth in claim 36, wherein K is 8.

39. The processing system as set forth in claim 34, wherein measuring smoothness further comprises:

normalizing q[i][j], wherein q[i][j] is the Q code value at location [i,j] in an encoded image and q'[i][j] is the normalized value of q[i][j];

computing smoothness using q'[i][j], Laplacian kernel L[m][n], and a block Laplacian value $L_q$, where $L_q$ equals $$l[i][j] = \sum_{m=-1}^{l} \sum_{n=-1}^{l} L[m][n]q'[i+m][j+n], \quad 1 \le i, j < (K-1)$$

$$L_q = \frac{\sum_{ij} |l[i][j]|}{(K-2) \cdot (K-2)}, \quad 1 \le i, j < (K-1).$$

40. The processing system as set forth in claim 39, wherein q'[i][j] is computed according to the following equation:

$$q'[i][j] = \frac{q[i][j]}{\sqrt{\sum_{i,j}(q[i][j] - Q_{mean})^2}}, \quad 1 \le i, j < (K-1)$$

where, $$Q_{mean} = \frac{\sum_{ij} q[i][j]}{(K-2) \cdot (K-2)}, \quad 1 \le i, j < (K-1).$$

41. The processing system as set forth in claim 39, wherein K is 8.

42. The processing system as set forth in claim 34, wherein the smoothness measure comprises a second order image surface property.

43. The processing system as set forth in claim 34, wherein the smoothness measure comprises an N order image surface property, where N>1.

44. The processing system as set forth in claim 34, wherein measuring the smoothness further comprises:

determining if the image portion includes motion;

if the image portion includes motion, computing a smoothness measurement for a first field of the image portion and a second field of the image portion, and averaging the smoothness measurements together to generate the smoothness measure; and if the image portion does not include motion, generating the smoothness measure for the image portion.

45. The processing system as set forth in claim 34, wherein determining further comprises evaluating spatial correlation to determine motion.

46. The processing system as set forth in claim 34, wherein determining a measure of compatibility between adjacent blocks further comprises determining the ratio between adjacent blocks and the total number of boundary pixels at the candidate block.

47. The processing system as set forth in claim 46, wherein a boundary pixel identified as compatible if it lies within a determined valid range of compatible boundary pixels.

48. The processing system as set forth in claim 34, further comprising generating a combined measure used to select a candidate decoding.

49. The processing system as set forth in claim 48, wherein the combined measure is determined according the following equation:

$$M_X = S_X + (1 - L_X)$$

where $M_X$ represents the combined measure, $S_X$ represents the compatibility measure, and $L_X$ represents the smoothness measure.

50. The processing system as set forth in claim 48, wherein the combined measure is determined according the following equation:

$$M_x = w \cdot S_x + (1-w) \cdot (1-L_x), 0 < w < 1$$

where $M_x$ represents the combined measure, $S_x$ represents the compatibility measure, w represents an empirically determined weight, and $L_x$ represents the smoothness measure.

51. A computer readable medium containing executable instructions which, when executed in a processing system, cause the system to receive lost/damaged data in a bitstream of encoded data, the system performing the steps comprising:

generating a plurality of candidate decodings for a plurality of blocks;

generating an internal correlation measure for each block based upon at least an image portion of the candidate decodings;

determining an external compatibility measure between adjacent blocks of the plurality of blocks;

combining the internal correlation measure and the external compatibility measure of adjacent blocks to generate a combined measure; and selecting a candidate decoding from the plurality of candidate decodings based upon the combined measure.

52. The computer readable medium as set forth in claim 51, wherein the measure is a probability measure.

53. The computer readable medium as set forth in claim 51, wherein the measure is a square error measure.

54. The computer readable medium as set forth in claim 51, wherein the measure is a spatial correlation measure.

55. The computer readable medium as set forth in claim 51, wherein the measure is a horizontal correlation measure.

56. The computer readable medium as set forth in claim 51, wherein the measure is a vertical correlation measure.

57. The computer readable medium as set forth in claim 51, wherein the measure is a diagonal correlation measure.

58. The computer readable medium as set forth in claim 51, wherein the measure is a temporal activity measure.

59. A computer readable medium containing executable instructions which, when executed in a processing system, cause the system to receive lost/damaged data in a bitstream of encoded data, the system performing the steps comprising:

generating a plurality of candidate decodings for a plurality of blocks;

measuring for each block the internal smoothness of at least an image portion of the candidate decodings;

determining an external compatibility measure between adjacent blocks of the plurality of blocks;

combining the internal smoothness measure and the external compatibility measure of adjacent blocks to generate a combined measure; and selecting a candidate decoding from the plurality of candidate decodings based upon the combined measure.

60. The computer readable medium as set forth in claim 59, wherein the step of measuring the smoothness comprises a Laplacian measurement.

61. The computer readable medium as set forth in claim 59, wherein the step of measuring smoothness comprises instructions, which when executed, perform the steps of:

normalizing $x[i][j]$ that is defined as $\tilde{x}[i][j]$ where $x[i][j]$ is the decoded value at location $[i,j]$; and computing smoothness using the $x[i][j]$, Laplacian kernel $L[m][n]$, and a block Laplacian value $L_x$, where $L_x$ is determined according to the following:

$$l[i][j] = \sum_{m=-1}^{l} \sum_{n=-1}^{l} L[m][n]\tilde{x}[i+m][j+n], \quad 0 \le i, j < K$$

$$L_X = \frac{\sum_{ij} |l[i][j]|}{K \cdot K}, \quad 0 \le i, j < K.$$

62. The computer readable medium as set forth in claim 61, where the $\tilde{x}[i][j]$ is computed according to the following equation:

$$\tilde{x}[i][j] = \frac{x[i][j]}{\sqrt{\sum_{i,j}(x[i][j] - X_{mean})^2}}, \quad 0 \le i, j < K$$

where, $$X_{mean} = \frac{\sum_{i,j} x[i][j]}{K \cdot K}, \quad 0 \le i, j < K.$$

63. The computer readable medium as set forth in claim 61, wherein K is 8.

64. The computer readable medium as set forth in claim 59, wherein the step of measuring smoothness comprises instructions which when executed perform the steps of:

normalizing $q[i][j]$, wherein $q[i][j]$ is the Q code value at location $[i,j]$ in an encoded image and $q'[i][j]$ is the normalized value of $q[i][j]$;

computing smoothness using $q'[i][j]$, Laplacian kernel $L[m][n]$, and a block Laplacian value $L_q$, where $L_q$ equals $$l[i][j] = \sum_{m=-1}^{l} \sum_{n=-1}^{l} L[m][n]q'[i+m][j+n], \quad 1 \le i, j < (K-1)$$

$$L_q = \frac{\sum_{ij} |l[i][j]|}{(K-2) \cdot (K-2)}, \quad 1 \le i, j < (K-1).$$

65. The computer readable medium as set forth in claim 64, wherein $q'[i][j]$ is computed according to the following equation:

$$q'[i][j] = \frac{q[i][j]}{\sqrt{\sum_{i,j}(q[i][j] - Q_{mean})^2}}, \quad 1 \le i, j < (K-1)$$

where, $$Q_{mean} = \frac{\sum_{ij} q[i][j]}{(K-2) \cdot (K-2)}, \quad 1 \le i, j < (K-1).$$

66. The computer readable medium as set forth in claim 64, wherein K is 8.

67. The computer readable medium as set forth in claim 59, wherein the smoothness measure comprises a second order image surface property.

68. The computer readable medium as set forth in claim 59, wherein the smoothness measure comprises an N order image surface property, where N>1.

69. The computer readable medium as set forth in claim 59, wherein the step of measuring the smoothness comprises instructions which when executed perform the steps of:

determining if the image portion includes motion;

if the image portion includes motion;

computing a smoothness measurement for a first field of the image portion and a second field of the image portion; and averaging the smoothness measurements together to generate the smoothness measure; and if the image portion does not include motion, generating the smoothness measure for the image portion.

70. The computer readable medium as set forth in claim 59, wherein the step of determining comprises instructions which when executed perform the step of evaluating spatial correlation to determine motion.

71. The computer readable medium as set forth in claim 59, wherein the step of determining a measure of compatibility between adjacent blocks comprises instructions which when executed perform the step of determining the ratio between adjacent blocks and the total number of boundary pixels at the candidate block.

72. The computer readable medium as set forth in claim 71, wherein a boundary pixel identified as compatible if it lies within a determined valid range of compatible boundary pixels.

73. The computer readable medium as set forth in claim 59, further comprising instructions which when executed perform the step of generating a combined measure used to select a candidate decoding.

74. The computer readable medium as set forth in claim 73, wherein the combined measure is determined according the following equation:

$$M_X = S_X + (1 - L_X)$$

where $M_X$ represents the combined measure, $S_X$ represents the compatibility measure, and $L_X$ represents the smoothness measure.

75. The computer readable medium as set forth in claim 73, wherein the combined measure is determined according the following equation:

$$M_x = w \cdot S_x + (1-w) \cdot (1-L_x), 0 < w < 1$$

where $M_X$ represents the combined measure, $S_x$ represents the compatibility measure, w represents an empirically determined weight, and $L_x$ represents the smoothness measure.

76. An apparatus for receiving lost/damaged data in a bitstream of encoded data comprising:
   means for generating a plurality of candidate decodings for a plurality of blocks;
   means for measuring for each block the internal smoothness of at least an image portion of the candidate decodings;
   means for determining an external compatibility measure between adjacent blocks of the plurality of blocks;
   means for combining the internal smoothness measure and the external compatibility measure of adjacent blocks to generate a combined measure; and
   means for selecting a candidate decoding from the plurality of candidate decodings based upon the combined measure.

77. The apparatus as set forth in claim 76, wherein the means for measuring the smoothness is configured to perform a Laplacian measurement.

78. The apparatus as set forth in claim 76, wherein the means for measuring smoothness comprises:
   means for normalizing x[i][j] that is defined as $\tilde{x}[i][j]$ where x[i][j] is the decoded value at location [i,j]; and
   means for computing smoothness using the x[i][j], Laplacian kernel L[m][n], and a block Laplacian value $L_x$, where $L_x$ is determined according to the following:

$$l[i][j] = \sum_{m=-1}^{l} \sum_{n=-1}^{l} L[m][n]\tilde{x}[i+m][j+n], \quad 0 \le i, j < K$$

$$L_X = \frac{\sum_{ij} |l[i][j]|}{K \cdot K}, \quad 0 \le i, j < K.$$

79. The apparatus as set forth in claim 78, where the $\tilde{x}[i][j]$ is computed according to the following equation:

$$\tilde{x}[i][j] = \frac{x[i][j]}{\sqrt{\sum_{i,j}(x[i][j] - X_{mean})^2}}, \quad 0 \le i, j < K$$

where, $$X_{mean} = \frac{\sum_{i,j} x[i][j]}{K \cdot K}, \quad 0 \le i, j < K.$$

80. The apparatus as set forth in claim 76, wherein the means for measuring smoothness comprises:
   means for normalizing q[i][j], wherein q[i][j] is the Q code value at location [i,j] in an encoded image and q'[i][j] is the normalized value of q[i][j];
   means for computing smoothness using q'[i][j], Laplacian kernel L[m][n], and a block Laplacian value $L_q$, where $L_q$ equals $$l[i][j] = \sum_{m=-1}^{l} \sum_{n=-1}^{l} L[m][n]q'[i+m][j+n], \quad 1 \le i, j < (K-1)$$

$$L_q = \frac{\sum_{ij} |l[i][j]|}{(K-2) \cdot (K-2)}, \quad 1 \le i, j < (K-1).$$

81. The apparatus as set forth in claim 80, wherein q'[i][j] is computed according to the following equation:

$$q'[i][j] = \frac{q[i][j]}{\sqrt{\sum_{i,j}(q[i][j] - Q_{mean})^2}}, \quad 1 \le i, j < (K-1)$$

where, $$Q_{mean} = \frac{\sum_{ij} q[i][j]}{(K-2) \cdot (K-2)}, \quad 1 \le i, j < (K-1).$$

82. The apparatus as set forth in claim 80, wherein K is 8.

* * * * *